(12) United States Patent
Hinrichs et al.

(10) Patent No.: US 12,534,508 B2
(45) Date of Patent: *Jan. 27, 2026

(54) ANTI-HUMAN PAPILLOMAVIRUS 16 E7 T CELL RECEPTORS

(71) Applicant: The United States of America, as represented by the Secretary, Department of Health and Human Services, Bethesda, MD (US)

(72) Inventors: Christian S. Hinrichs, Bethesda, MD (US); Steven A. Rosenberg, Potomac, MD (US)

(73) Assignee: The United States of America, as represented by the Secretary, Department of Health and Human Services, Bethesda, MD (US)

( * ) Notice: Subject to any disclaimer, the term of this patent is extended or adjusted under 35 U.S.C. 154(b) by 783 days.

This patent is subject to a terminal disclaimer.

(21) Appl. No.: 17/816,496

(22) Filed: Aug. 1, 2022

(65) Prior Publication Data

US 2022/0372103 A1 Nov. 24, 2022

Related U.S. Application Data

(60) Continuation of application No. 17/101,360, filed on Nov. 23, 2020, now Pat. No. 11,434,272, which is a continuation of application No. 16/205,631, filed on Nov. 30, 2018, now Pat. No. 10,870,687, which is a division of application No. 15/313,673, filed as application No. PCT/US2015/033129 on May 29, 2015, now Pat. No. 10,174,098.

(60) Provisional application No. 62/004,335, filed on May 29, 2014.

(51) Int. Cl.
| | |
|---|---|
| C07K 14/725 | (2006.01) |
| A61K 38/00 | (2006.01) |
| A61K 38/17 | (2006.01) |
| C07K 16/28 | (2006.01) |
| G01N 33/569 | (2006.01) |
| G01N 33/574 | (2006.01) |

(52) U.S. Cl.
CPC ...... C07K 14/7051 (2013.01); A61K 38/1774 (2013.01); C07K 16/2809 (2013.01); G01N 33/56983 (2013.01); G01N 33/57484 (2013.01); *A61K 38/00* (2013.01); *C07K 2319/00* (2013.01); *C07K 2319/32* (2013.01); *G01N 2333/025* (2013.01)

(58) Field of Classification Search
CPC ............... A61K 40/32; C07K 2319/32; C07K 14/7051; A61P 31/20
See application file for complete search history.

(56) References Cited

U.S. PATENT DOCUMENTS

| | | | |
|---|---|---|---|
| 5,087,616 A | 2/1992 | Myers et al. | |
| 5,225,539 A | 7/1993 | Winter | |
| 5,449,752 A | 9/1995 | Fujii et al. | |
| 5,545,806 A | 8/1996 | Lonberg et al. | |
| 5,569,825 A | 10/1996 | Lonberg et al. | |
| 5,585,089 A | 12/1996 | Queen et al. | |
| 5,639,641 A | 6/1997 | Pedersen et al. | |
| 5,693,761 A | 12/1997 | Queen et al. | |
| 5,714,352 A | 2/1998 | Jakobovits et al. | |
| 6,265,150 B1 | 7/2001 | Terstappen et al. | |
| 8,034,334 B2 | 10/2011 | Dudley et al. | |
| 8,383,099 B2 | 2/2013 | Dudley et al. | |
| 10,174,098 B2 | 1/2019 | Hinrichs et al. | |
| 10,870,687 B2 | 12/2020 | Hinrichs et al. | |
| 2002/0197266 A1 | 12/2002 | Debinski | |
| 2010/0189742 A1 | 7/2010 | Van Der Burg et al. | |
| 2012/0244133 A1 | 9/2012 | Rosenberg et al. | |

FOREIGN PATENT DOCUMENTS

| | | |
|---|---|---|
| EP | 0239400 B1 | 8/1994 |
| GB | 2188638 A | 10/1987 |
| JP | 2013-505734 A | 2/2013 |
| WO | WO 2006/103429 A2 | 10/2006 |
| WO | WO 2007/131092 A2 | 11/2007 |
| WO | WO 2011/039508 A2 | 4/2011 |
| WO | WO 2015/009606 A1 | 1/2015 |

OTHER PUBLICATIONS

Clambrey et al (Journal of Molecular Medicine, 2014, vol. 92, pp. 733-741) (Year: 2014).*
Tsukahara et al (Biochemical and Biophysical Research Communications, 2013, vol. 438, pp. 84-89) (Year: 2013).*
Tamada et al (Clinical Cancer Research, 2012, pp. OF1-OF10) (Year: 2012).*
Choi et al., "Synthesis and Assembly of a Cholera Toxin B Subunit-Rotavirus VP7 Fusion Protein in Transgenic Potato," *Mol. Biotechnol.*, 31: 193-202 (2005).
Cohen et al., "Enhanced Antitumor Activity of T Cells Engineered to Express T-Cell Receptors with a Second Disulfide Bond," *Cancer Res.*, 67(8): 3898-903 (2007).
Dudley et al., "Generation of Tumor-Infiltrating Lymphocyte Cultures for Use in Adoptive Transfer Therapy for Melanoma Patients," *J. Immunother.*, 26:332-42 (2003).
European Patent Office, Extended European Search Report in European Application No. 19217074.4, mailed Jul. 2, 2020.

(Continued)

*Primary Examiner* — Karen A. Canella
(74) *Attorney, Agent, or Firm* — Leydig, Voit & Mayer

(57) ABSTRACT

Disclosed is a synthetic T cell receptor (TCR) having antigenic specificity for an HLA-A2-restricted epitope of human papillomavirus (HPV) 16 E7, $E7_{11-19}$. Related polypeptides and proteins, as well as related nucleic acids, recombinant expression vectors, host cells, and populations of cells are also provided. Antibodies, or an antigen binding portion thereof, and pharmaceutical compositions relating to the TCRs of the invention are also provided. Also disclosed are methods of detecting the presence of a condition in a mammal and methods of treating or preventing a condition in a mammal, wherein the condition is cancer, HPV 16 infection, or HPV-positive premalignancy.

20 Claims, 9 Drawing Sheets

Specification includes a Sequence Listing.

(56) References Cited

OTHER PUBLICATIONS

Ferradini et al., "Studies on the human T cell receptor alpha/beta variable region genes, Part II," Eur. J. Immunol., 21: 935-942 (1991).
Haga-Friedman et al., "Incorporation of Transmembrane Hydrophobic Mutations in the TCR Enhance Its Surface Expression and T Cell Functional Avidity," J. Immunol., 188: 5538-5546 (2012).
Haskard et al., "The Production of Human Monoclonal Autoantibodies from Patients with Rheumatoid Arthritis by the EBV-Hybridoma Technique," J. Immunol. Methods, 74(2), 361-67 (1984).
Hinrichs et al., "HPV-targeted tumor-infiltrating lymphocytes for cervical cancer," Abstract, ASCO Annual Meeting May 14, 2014.
Hudecz "Synthesis of Peptide Bioconjugates," Methods Mol. Biol., 298: 209-223 (2005).
Huse et al., "Generation of a Large Combinatorial Library of the Immunoglobulin Repertoire in Phage Lambda," Science, 246: 1275-81 (1989).
International Bureau, International Search Report in International Patent Application No. PCT/US2015/033129, mailed Aug. 27, 2015.
International Bureau, Written Opinion in International Patent Application No. PCT/US2015/033129, mailed Aug. 27, 2015.
Keskin et al., "Direct identification of an HPV-16 tumor antigen from cervical cancer biopsy specimens," Frontiers in Immunology, 2 (2011).
Kirin et al., "Amino Acid and Peptide Bioconjugates of Copper(II) and Zinc(II) Complexes with a Modified N,N-Bis(2-picolyl)amine Ligand," Inorg Chem., 44(15): 5405-5415 (2005).
Köhler et al., "Derivation of specific antibody-producing tissue culture and tumor lines by cell fusion," Eur. J. Immunol., 5: 511-519 (1976).
Lyons et al., "T-cell receptor tetramer binding or the lack there of does not necessitate antigen reactivity in T-cell receptor transduced T cells," Cancer Immunol. Immunother., 55(9): 1142-50 (2006).
Meydan et al., "Prediction of peptides binding to MHC class I and II alleles by temporal motif mining," BMC Bioinformatics, 14(Suppl 2):S13 (2013).
Nilges et al., "Human Papillomavirus Type 16 E7 Peptide-Directed CD8+ T Cells from Patients with Cervical Cancer are Cross-Reactive with the Coronavirus NS2 Protein," J. Virol., 77(9): 5464-74 (2003).
Pedersen et al., "Comparison of Surface Accessible Residues in Human and Murine Immunoglobulin Fv Domains: Implication for Humanization of Munrine Antibodies," J. Mol. Biol., 235: 959-973 (1994).
Reiter et al., "Engineering interchain disulfide bonds into conserved framework regions of Fv fragments: improved biochemical characteristics of recombinant immunotoxins containing disulfide-stabilized Fv," Protein Engineering, 7: 697-704 (1994).

Riddell et al., "The use of anti-CD3 and anti-CD28 monoclonal antibodies to clone and expand human antigen-specific T cells," J. Immunol. Methods, 128:189-201 (1990).
Riemer et al., "A Conserved E7-derived Cytotoxic T Lymphocyte Epitope Expressed on Human Papillomavirus 16-transformed HLA-A2 + Epithelial Cancers," Journal of Biological Chemistry, 285(38): 29608-29622 (2010).
Roder et al., "The EBV-Hybridoma Technique," Methods Enzymol., 121: 140-67 (1986).
Roman-Roman et al., "Studies on the human T cell receptor alpha/beta variable region genes, Part I," Eur. J. Immunol., 21: 935-942 (1991).
Scholten et al., "Preservation and redirection of HPV16E7-specific T cell receptors for immunotherapy of cervical cancer," Clinical Immunology, 114(2): 119-129 (2005).
Scholten et al., "Promiscuous behavior of HPV16E6 specific T cell expression in TCR transgenic T cells, which can be restored in part by genetic modification," Cellular Oncology, 32(1-2): 43-56 (2010).
Scholten et al., "Generating HPV specific T helper cells for the treatment of HPV induced malignancies using TCR gene transfer," J. Transl. Med., 9: 147 (2011).
"TRA T-cell receptor alpha locus [Homo sapiens (human)]," Gene ID: 6955, (updated Oct. 9, 2016), Entrez Gene (ncbi.nlm.nih.gov/gene), printed on Dec. 8, 2016.
"TRB T cell receptor beta locus [Homo sapiens (human)]," Gene ID: 6957, (updated Oct. 9, 2016), Entrez Gene (ncbi.nlm.nih.gov/gene), printed on Dec. 8, 2016.
Wadwa et al., "Receptor Mediated Glycotargeting," J. Drug Targeting, 3: 111 (1995).
Youde et al., "Cross-typic specificity and immunotherapeutic potential of a human HPV16 E7-specific CTL line," International Journal of Cancer, 114(4): 606-612 (2005).
Foy et al., "Non-viral precision T cell receptor replacement for personalized cell therapy", Nature, 615: 687-696 (2023).
Jin et al., "Engineered T cells targeting E7 mediate regression of human papillomavirus cancers in a murine model", JCI Insight, 3(8): e99488, 12 pages (2018) and Supplementary Material (2 pages).
Jin et al., "Enhanced clinical-scale manufacturing of TCR transduced T-cells using closed culture system modules", J Transl Med 16: 13, 13 pages (2018).
Nagarsheth et al., "TCR-engineered T cells targeting E7 for patients with metastatic HPV-associated epithelial cancers", Nat Med, 27(3) 419-425 (2021).
Peng et al., "Efficient nonviral Sleeping Beauty transposon-based TCR gene transfer to peripheral blood lymphocytes confers antigen-specific antitumor reactivity", Gene Ther, 16(8): 1042-1049 (2009).
Ramachandran et al., "Systemic and local immunity following adoptive transfer of NY-ESO-1 Spear T cells in synovial sarcoma", Journal for ImmunoTherapy of Cancer, 7:276, 14 pages (2019).
Mensali et al., "NK cells specifically TCR-dressed to kill cancer cells", EBioMedicine, 40: 106-117 (2019).

* cited by examiner

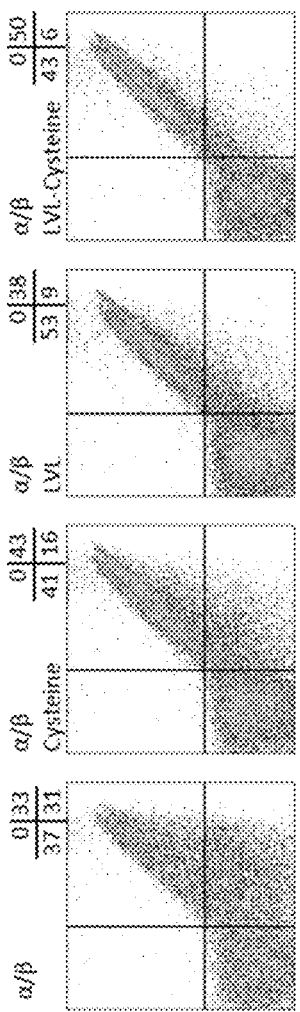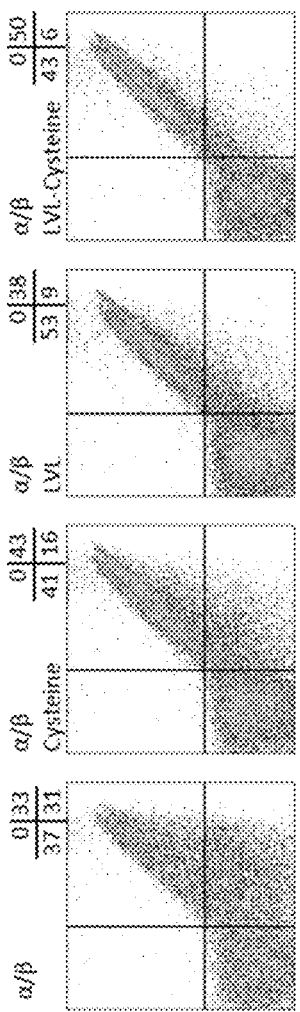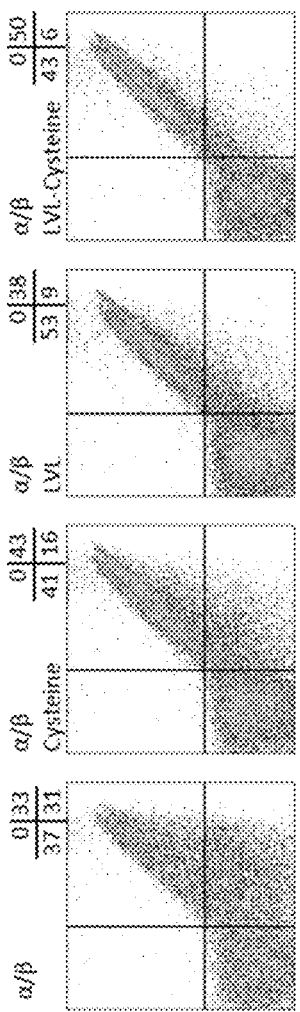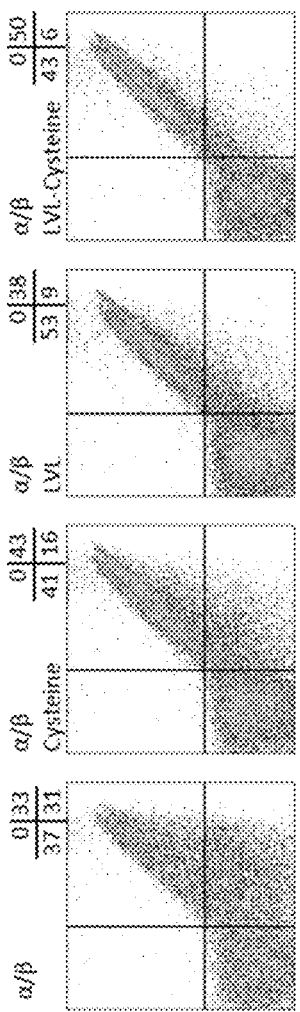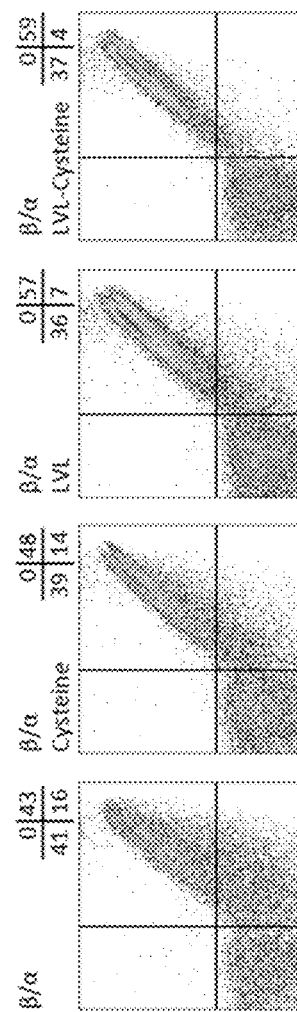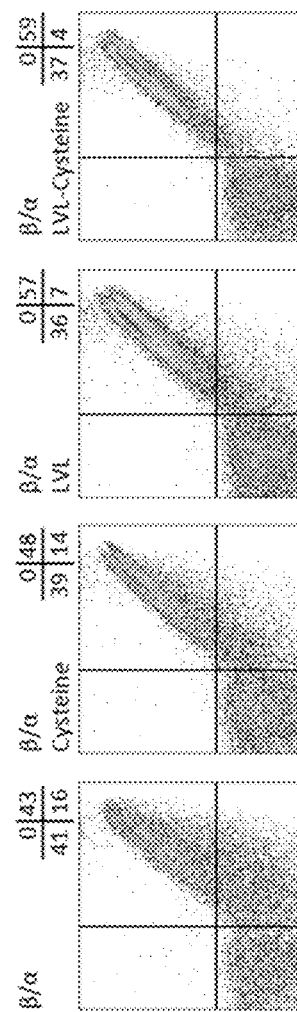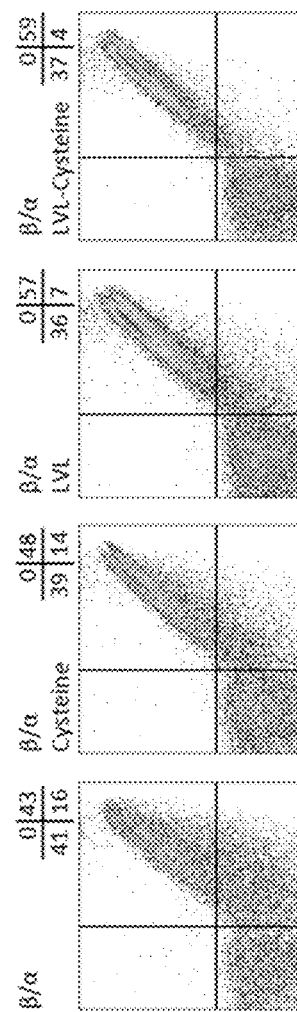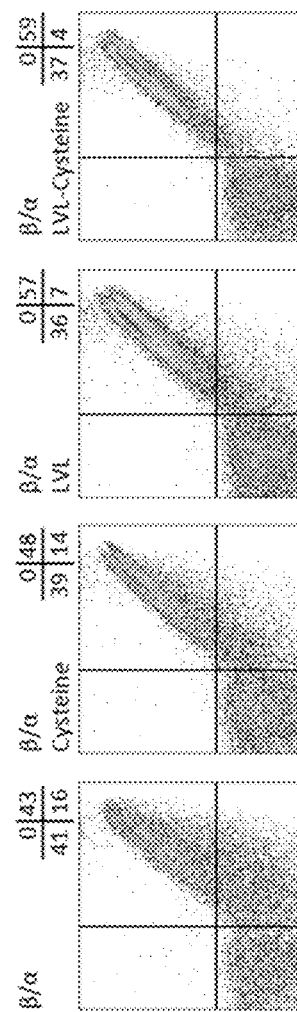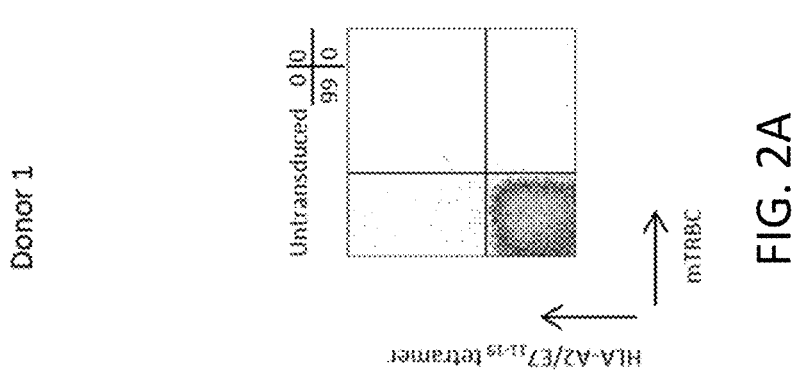

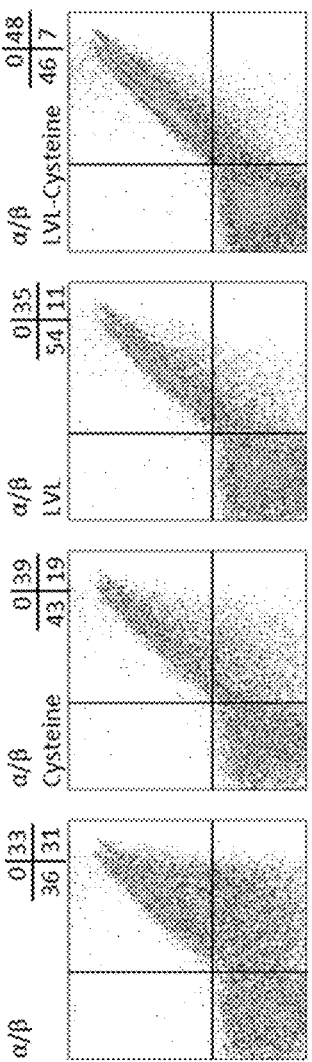
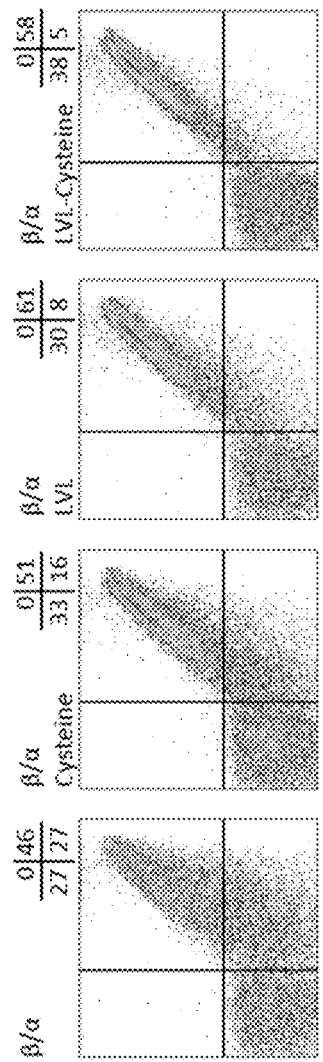
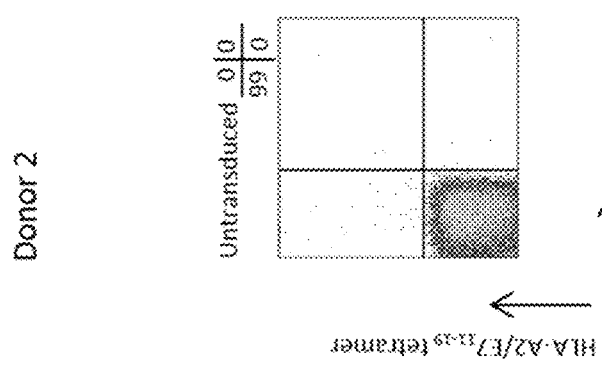
FIG. 2J — FIG. 2R

ANTI-HUMAN PAPILLOMAVIRUS 16 E7 T CELL RECEPTORS

CROSS-REFERENCE TO RELATED APPLICATIONS

This patent application is a continuation of U.S. application Ser. No. 17/101,360, filed Nov. 23, 2020, which is a continuation of U.S. application Ser. No. 16/205,631, filed Nov. 30, 2018, now U.S. Pat. No. 10,870,687, which is a divisional of U.S. application Ser. No. 15/313,673, now U.S. Pat. No. 10,174,098, which is the U.S. national stage of PCT/US2015/033129, filed May 29, 2015, which claims the benefit of U.S. Provisional Patent Application No. 62/004,335, filed May 29, 2014, each of which is incorporated by reference in its entirety herein.

STATEMENT REGARDING FEDERALLY SPONSORED RESEARCH AND DEVELOPMENT

This invention was made with Government support under project numbers ZIABC010984-5 and ZIABC011479 by the National Institutes of Health, National Cancer Institute. The Government has certain rights in this invention.

INCORPORATION-BY-REFERENCE OF MATERIAL SUBMITTED ELECTRONICALLY

Incorporated by reference in its entirety herein is a computer-readable nucleotide/amino acid sequence listing submitted concurrently herewith and identified as follows: One 80,888 Byte XML file named "764396.XML," dated Aug. 1, 2022.

BACKGROUND OF THE INVENTION

The primary cause of some cancer types such as, for example, uterine cervical cancer, is human papillomavirus (HPV) infection. Despite advances in treatments such as chemotherapy, the prognosis for many cancers, including HPV-associated cancers, may be poor. Accordingly, there exists an unmet need for additional treatments for cancer, particularly HPV-associated cancers.

BRIEF SUMMARY OF THE INVENTION

An embodiment of the invention provides an isolated or purified T cell receptor (TCR) having antigenic specificity for human papillomavirus (HPV) 16 E7.

Another embodiment of the invention provides a TCR comprising a human variable region and a murine constant region, or a functional variant of the TCR, wherein the TCR and the functional variant have antigenic specificity for human papillomavirus (HPV) 16 E7.

The invention further provides related polypeptides and proteins, as well as related nucleic acids, recombinant expression vectors, host cells, and populations of cells. Further provided by the invention are antibodies, or antigen binding portions thereof, and pharmaceutical compositions relating to the TCRs (including functional portions and functional variants thereof) of the invention.

Methods of detecting the presence of a condition in a mammal and methods of treating or preventing a condition in a mammal, wherein the condition is cancer, HPV 16 infection, or HPV-positive premalignancy, are further provided by the invention. The inventive method of detecting the presence of a condition in a mammal comprises (i) contacting a sample comprising cells of the condition with any of the inventive TCRs (including functional portions and functional variants thereof), polypeptides, proteins, nucleic acids, recombinant expression vectors, host cells, populations of host cells, antibodies, or antigen binding portions thereof, or pharmaceutical compositions described herein, thereby forming a complex, and (ii) detecting the complex, wherein detection of the complex is indicative of the presence of the condition in the mammal, wherein the condition is cancer, HPV 16 infection, or HPV-positive premalignancy.

The inventive method of treating or preventing a condition in a mammal comprises administering to the mammal any of the TCRs (including functional portions and functional variants thereof), polypeptides, or proteins described herein, any nucleic acid or recombinant expression vector comprising a nucleotide sequence encoding any of the TCRs (including functional portions and functional variants thereof), polypeptides, proteins described herein, or any host cell or population of host cells comprising a recombinant vector which encodes any of the TCRs (including functional portions and functional variants thereof), polypeptides, or proteins described herein, in an amount effective to treat or prevent the condition in the mammal, wherein the condition is cancer, HPV 16 infection, or HPV-positive premalignancy.

BRIEF DESCRIPTION OF THE SEVERAL VIEWS OF THE DRAWINGS

FIGS. 2A-2R are dot plots showing the percentage of cells from a first donor (A-I) or a second donor (J-R) that were transduced (B-I and K-R) with one of the recombinant expression vectors set forth in Table 1 which expressed the following: HLA-A2/$E7_{11\text{-}19}$ tetramer$^+$/m TRBC$^-$ (upper left quadrant), HLA-A2/$E7_{11\text{-}19}$ tetramer$^+$/m TRBC$^+$ (upper right quadrant), HLA-A2/$E7_{11\text{-}19}$ tetramer$^-$/m TRBC$^-$ (lower left quadrant), and HLA-A2/$E7_{11\text{-}19}$ tetramer$^-$/m TRBC$^+$ (lower right quadrant). The numerical percentages for each quadrant are provided above each dot plot. Untransduced cells (A and J) were used as a negative control.

DETAILED DESCRIPTION OF THE INVENTION

Figure 1:
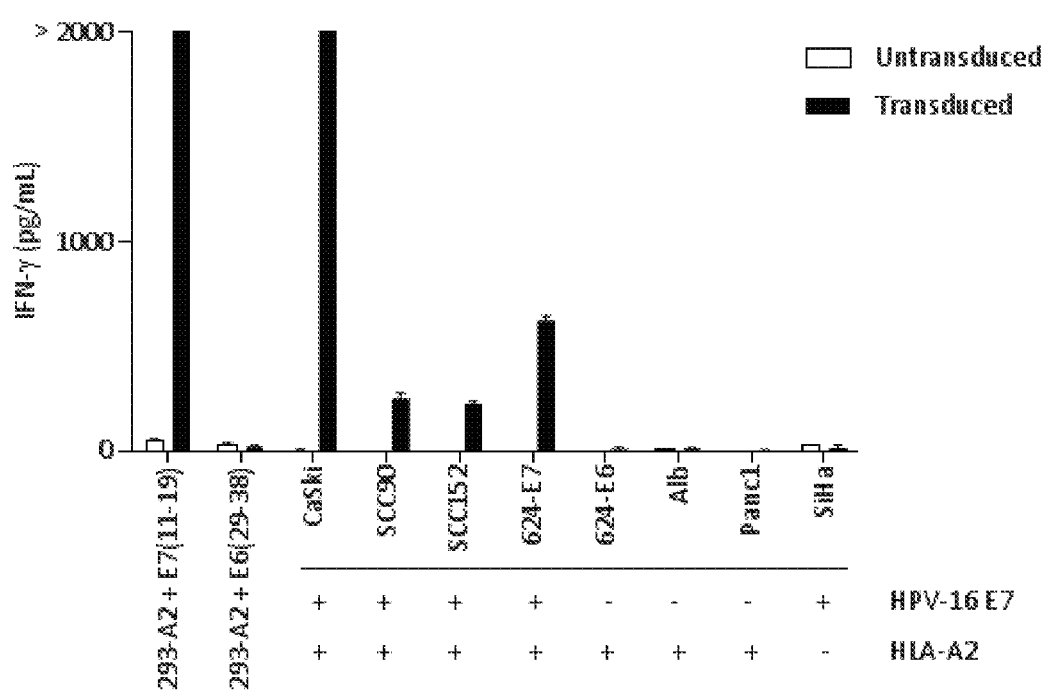
FIG. 1 is a bar graph showing interferon (IFN)-γ (pg/mL) secreted by peripheral blood lymphocytes (PBL) that were transduced with a nucleotide sequence encoding a chimeric anti-HPV 16 E7 TCR (shaded bars) upon co-culture with target 293-A2 cells pulsed with HPV 16 $E6_{29\text{-}38}$ peptide, 293-A2 cells pulsed with HPV 16 $E7_{11\text{-}19}$ peptide, 624 cells transduced with a plasmid encoding HPV 16 E6, 624 cells transduced with a plasmid encoding HPV 16 E7, SCC152 cells, SCC90 cells, CaSki cells, Alb cells, Panc1 cells, or SiHa cells. HLA-A2 and HPV-16 E7 expression by each target cell is indicated in the bottom of FIG. 1 ("+" indicates positive for expression and "−" indicates negative for expression). Untransduced cells (unshaded bars) were used as a negative control.

An embodiment of the invention provides an isolated or purified T cell receptor (TCR) having antigenic specificity for human papillomavirus (HPV) 16 E7.

HPV 16 is the subtype of HPV that is most commonly associated with malignancy. Without being bound to a particular theory or mechanism, HPV 16 is believed to cause cancer at least partly through the actions of the oncoprotein E7, which keeps cancer cells active in the cell division cycle through Rb inactivation. HPV 16 E7 is constitutively expressed in cancer cells and is not expressed by normal, uninfected human tissues. HPV 16 E7 is expressed in a variety of human cancers including, but not limited to, cancer of the uterine cervix, oropharynx, anus, anal canal, anorectum, vagina, vulva, and penis.

The inventive TCR (including functional portions and functional variants thereof) may have antigenic specificity for any HPV 16 E7 protein, polypeptide or peptide. In an embodiment of the invention, the TCR (including functional portions and functional variants thereof) has antigenic specificity for a HPV 16 E7 protein comprising, consisting of, or consisting essentially of, SEQ ID NO: 1. In a preferred embodiment of the invention, the TCR (including functional portions and functional variants thereof) has antigenic specificity for a HPV 16 E7$_{11-19}$ peptide comprising, consisting of, or consisting essentially of, YMLDLQPET (SEQ ID NO: 2).

In an embodiment of the invention, the inventive TCRs (including functional portions and functional variants thereof) are able to recognize HPV 16 E7 in a major histocompatibility complex (MHC) class I-dependent manner. "MHC class I-dependent manner," as used herein, means that the TCR (including functional portions and functional variants thereof) elicits an immune response upon binding to HPV 16 E7 within the context of an MHC class I molecule. The MHC class I molecule can be any MHC class I molecule known in the art, e.g., HLA-A molecules. In a preferred embodiment of the invention, the MHC class I molecule is an HLA-A2 molecule.

The TCRs (including functional portions and functional variants thereof) of the invention provide many advantages, including when expressed by cells used for adoptive cell transfer. Without being bound by a particular theory or mechanism, it is believed that because HPV 16 E7 is expressed by HPV 16-infected cells of multiple cancer types, the inventive TCRs (including functional portions and functional variants thereof) advantageously provide the ability to destroy cells of multiple types of HPV 16-associated cancer and, accordingly, treat or prevent multiple types of HPV 16-associated cancer. Additionally, without being bound to a particular theory or mechanism, it is believed that because the HPV 16 E7 protein is expressed only in cancer cells, the inventive TCRs (including functional portions and functional variants thereof) advantageously target the destruction of cancer cells while minimizing or eliminating the destruction of normal, non-cancerous cells, thereby reducing, for example, by minimizing or eliminating, toxicity. Moreover, the inventive TCRs (including functional portions and functional variants thereof) may, advantageously, successfully treat or prevent HPV-positive cancers that do not respond to other types of treatment such as, for example, chemotherapy alone, surgery, or radiation. Additionally, the inventive TCRs (including functional portions and functional variants thereof) provide highly avid recognition of HPV 16 E7, which may, advantageously, provide the ability to recognize unmanipulated tumor cells (e.g., tumor cells that have not been treated with interferon (IFN)-γ, transfected with a vector encoding one or both of HPV 16 E7 and HLA-A2, pulsed with the E7$_{11-19}$ peptide, or a combination thereof).

The phrase "antigenic specificity," as used herein, means that the TCR (including functional portions and functional variants thereof) can specifically bind to and immunologically recognize HPV 16 E7 with high avidity. For example, a TCR (including functional portions and functional variants thereof) may be considered to have "antigenic specificity" for HPV 16 E7 if T cells expressing the TCR (or functional portion or functional variant thereof) secrete at least about 200 pg/mL or more (e.g., 200 pg/mL or more, 300 pg/mL or more, 400 pg/mL or more, 500 pg/mL or more, 600 pg/mL or more, 700 pg/mL or more, 1000 pg/mL or more, 5,000 pg/mL or more, 7,000 pg/mL or more, 10,000 pg/mL or more, or 20,000 pg/mL or more) of IFN-γ upon co-culture with antigen-negative HLA-A2$^+$ target cells pulsed with a low concentration of HPV 16 E7 peptide (e.g., about 0.05 ng/mL to about 5 ng/mL, 0.05 ng/mL, 0.1 ng/mL, 0.5 ng/mL, 1 ng/mL, or 5 ng/mL). Alternatively or additionally, a TCR (including functional portions and functional variants thereof) may be considered to have "antigenic specificity" for HPV 16 E7 if T cells expressing the TCR (or functional portion or functional variant thereof) secrete at least twice as much IFN-γ as the untransduced peripheral blood lymphocyte (PBL) background level of IFN-γ upon co-culture with antigen-negative HLA-A2+ target cells pulsed with a low concentration of HPV 16 E7 peptide. Cells expressing the inventive TCRs (including functional portions and functional variants thereof) may also secrete IFN-γ upon co-culture with antigen-negative HLA-A2$^+$ target cells pulsed with higher concentrations of HPV 16 E7 peptide.

The invention provides a TCR comprising two polypeptides (i.e., polypeptide chains), such as an alpha (u) chain of a TCR, a beta (β) chain of a TCR, a gamma (γ) chain of a TCR, a delta (δ) chain of a TCR, or a combination thereof. The polypeptides of the inventive TCR can comprise any amino acid sequence, provided that the TCR has antigenic specificity for HPV 16 E7.

In an embodiment of the invention, the TCR comprises two polypeptide chains, each of which comprises a human variable region comprising a complementarity determining region (CDR)1, a CDR2, and a CDR3 of a TCR. In an embodiment of the invention, the TCR comprises a first polypeptide chain comprising a CDR1 comprising the amino acid sequence of SEQ ID NO: 3 (CDR1 of a chain), a CDR2 comprising the amino acid sequence of SEQ ID NO: 4 (CDR2 of a chain), and a CDR3 comprising the amino acid sequence of SEQ ID NO: 5 (CDR3 of a chain), and a second polypeptide chain comprising a CDR1 comprising the amino acid sequence of SEQ ID NO: 6 (CDR1 of β chain), a CDR2 comprising the amino acid sequence of SEQ ID NO: 7 (CDR2 of β chain), and a CDR3 comprising the amino acid sequence of SEQ ID NO: 8 (CDR3 of β chain). In this regard, the inventive TCR can comprise any one or more of the amino acid sequences selected from the group consisting of SEQ ID NOs: 3-8. Preferably, the TCR comprises SEQ ID NOs: 3-5 or SEQ ID NOs: 6-8. In an especially preferred embodiment, the TCR comprises the amino acid sequences of SEQ ID NOs: 3-8.

In an embodiment of the invention, the TCR can comprise an amino acid sequence of a variable region of a TCR comprising the CDRs set forth above. In this regard, the TCR can comprise the amino acid sequence of SEQ ID NO: 9 (the variable region of a human α chain); SEQ ID NO: 10, wherein X at position 2 of SEQ ID NO: 10 is Ala or Gly (the variable region of a β chain); both SEQ ID NOs: 9 and 10, wherein X at position 2 of SEQ ID NO: 10 is Ala or Gly; SEQ ID NO: 11 (the variable region of a human β chain); or both SEQ ID NOs: 9 and 11. SEQ ID NO: 10 corresponds to SEQ ID NO: 11 when X at position 2 of SEQ ID NO: 10 is Gly. Preferably, the inventive TCR comprises the amino acid sequences of both SEQ ID NOs: 9 and 10, wherein X at position 2 of SEQ ID NO: 10 is Ala.

The inventive TCRs may further comprise a constant region derived from any suitable species such as, e.g., human or mouse. In an embodiment of the invention, the TCRs further comprise a human constant region. In this regard, the TCR can comprise the amino acid sequence of SEQ ID NO: 14 (the constant region of a human α chain), SEQ ID NO: 15 (the constant region of a human β chain), or both SEQ ID NOs: 14 and 15.

In an embodiment of the invention, the inventive TCR may comprise a combination of a variable region and a constant region. In this regard, the TCR can comprise an alpha chain comprising the amino acid sequences of both of SEQ ID NO: 9 (the variable region of a human α chain) and SEQ ID NO: 14 (the constant region of a human α chain); a beta chain comprising the amino acid sequences of both of SEQ ID NO: 11 (the variable region of a human β chain) and SEQ ID NO: 15 (the constant region of a human β chain); a beta chain comprising the amino acid sequences of both of SEQ ID NO: 10, wherein X at position 2 of SEQ ID NO: 2 is Ala or Gly (the variable region of a β chain) and SEQ ID NO: 15 (the constant region of a human β chain); the amino acid sequences of all of SEQ ID NOs: 9, 11, 14, and 15; or the amino acid sequences of all of SEQ ID NOs: 9, 10, 14, and 15.

In an embodiment of the invention, the inventive TCR can comprise an α chain of a TCR and a β chain of a TCR. Each of the α chain and β chain of the inventive TCR can independently comprise any amino acid sequence. In this regard, the α chain of the inventive TCR can comprise the amino acid sequence of SEQ ID NO: 12. An a chain of this type can be paired with any β chain of a TCR. In this regard, the β chain of the inventive TCR can comprise the amino acid sequence of SEQ ID NO: 13. The inventive TCR, therefore, can comprise the amino acid sequence of SEQ ID NO: 12, SEQ ID NO: 13, or both SEQ ID NOs: 12 and 13. Preferably, the inventive TCR is a human TCR comprising the amino acid sequences of both SEQ ID NOs: 12 and 13.

Another embodiment of the invention provides a chimeric TCR comprising a human variable region and a murine constant region, or a functional variant of the TCR, wherein the TCR and the functional variant have antigenic specificity for human papillomavirus (HPV) 16 E7. The chimeric TCR, or functional variant thereof, may comprise any of the CDR regions as described herein with respect to other aspects of the invention. In another embodiment of the invention, the chimeric TCR, or functional variant thereof, may comprise any of the variable regions described herein with respect to other aspects of the invention.

As used herein, the term "murine" or "human," when referring to a TCR or any component of a TCR described herein (e.g., complementarity determining region (CDR), variable region, constant region, alpha chain, and/or beta chain), means a TCR (or component thereof) which is derived from a mouse or a human, respectively, i.e., a TCR (or component thereof) that originated from or was, at one time, expressed by a mouse T cell or a human T cell, respectively.

In an embodiment of the invention, the inventive chimeric TCRs comprise a murine constant region. In this regard, the TCR can comprise the amino acid sequence of SEQ ID NO: 17 (the constant region of a murine (a chain), SEQ ID NO: 19 (the constant region of a murine 3 chain), or both SEQ ID NOs: 17 and 19. In a preferred embodiment, the inventive TCRs are chimeric TCRs comprising both a human variable region and a murine constant region.

In an embodiment of the invention, the inventive chimeric TCR may comprise a combination of a variable region and a constant region. In this regard, the TCR can comprise an alpha chain comprising the amino acid sequences of both of SEQ ID NO: 9 (the variable region of a human α chain) and SEQ ID NO: 17 (the constant region of a murine α chain); a beta chain comprising the amino acid sequences of both of SEQ ID NO: 11 (the variable region of a human β chain) and SEQ ID NO: 19 (the constant region of a murine β chain); a beta chain comprising the amino acid sequences of both of SEQ ID NO: 10, wherein X at position 2 of SEQ ID NO: 10 is Ala or Gly (the variable region of a β chain) and SEQ ID NO: 19 (the constant region of a murine β chain); the amino acid sequences of all of SEQ ID NOs: 9, 11, 17, and 19; or the amino acid sequences of all of SEQ ID NOs: 9, 10, 17, and 19. In an embodiment, the inventive chimeric TCR comprises a full-length beta chain comprising SEQ ID NO: 20. In this regard, the TCR can comprise all of SEQ ID NOs: 9, 17, and 20.

Included in the scope of the invention are functional variants of the inventive TCRs described herein. The term "functional variant," as used herein, refers to a TCR, polypeptide, or protein having substantial or significant sequence identity or similarity to a parent TCR, polypeptide, or protein, which functional variant retains the biological activity of the TCR, polypeptide, or protein of which it is a variant. Functional variants encompass, for example, those variants of the TCR, polypeptide, or protein described herein (the parent TCR, polypeptide, or protein) that retain the ability to specifically bind to HPV 16 E7 for which the parent TCR has antigenic specificity or to which the parent polypeptide or protein specifically binds, to a similar extent, the same extent, or to a higher extent, as the parent TCR, polypeptide, or protein. In reference to the parent TCR, polypeptide, or protein, the functional variant can, for instance, be at least about 30%, 50%, 75%, 80%, 90%, 95%, 96%, 97%, 98%, 99% or more identical in amino acid sequence to the parent TCR, polypeptide, or protein.

The functional variant can, for example, comprise the amino acid sequence of the parent TCR, polypeptide, or protein with at least one conservative amino acid substitution. Conservative amino acid substitutions are known in the art, and include amino acid substitutions in which one amino acid having certain physical and/or chemical properties is exchanged for another amino acid that has the same chemical or physical properties. For instance, the conservative amino acid substitution can be an acidic amino acid substituted for another acidic amino acid (e.g., Asp or Glu), an amino acid with a nonpolar side chain substituted for another amino acid with a nonpolar side chain (e.g., Ala, Gly, Val, Ile, Leu, Met, Phe, Pro, Trp, Val, etc.), a basic amino acid substituted for another basic amino acid (Lys, Arg, etc.), an amino acid with a polar side chain substituted for another amino acid with a polar side chain (Asn, Cys, Gln, Ser, Thr, Tyr, etc.), etc.

Alternatively or additionally, the functional variants can comprise the amino acid sequence of the parent TCR, polypeptide, or protein with at least one non-conservative amino acid substitution. In this case, it is preferable for the non-conservative amino acid substitution to not interfere with or inhibit the biological activity of the functional variant. Preferably, the non-conservative amino acid substitution enhances the biological activity of the functional variant, such that the biological activity of the functional variant is increased as compared to the parent TCR, polypeptide, or protein.

In an embodiment of the invention, the functional variant comprises the amino acid sequence of any of the TCRs described herein with one, two, three, or four amino acid substitution(s) in the constant region of the alpha or beta chain. Preferably, the functional variant comprises the amino acid sequence of any of the murine constant regions described herein with one, two, three, or four amino acid substitution(s) in the murine constant region. In some embodiments, the TCRs (or functional portions thereof) comprising the substituted amino acid sequence(s) advantageously provide one or more of increased recognition of HPV 16 E7V targets, increased expression by a host cell, and increased anti-tumor activity as compared to the parent TCR comprising an unsubstituted amino acid sequence. In general, the substituted amino acid sequences of the murine constant regions of the TCR u and R chains, SEQ ID NOs: 16 and 18, respectively, correspond with all or portions of the unsubstituted murine constant region amino acid sequences SEQ ID NOs: 17 and 19, respectively, with SEQ ID NO: 16 having one, two, three, or four amino acid substitution(s) when compared to SEQ ID NO: 17 and SEQ ID NO: 18 having one amino acid substitution when compared to SEQ ID NO: 19. In this regard, an embodiment of the invention provides a functional variant of a TCR comprising the amino acid sequences of (a) SEQ ID NO: 16 (constant region of alpha chain), wherein (i) X at position 48 is Thr or Cys; (ii) X at position 112 is Ser, Gly, Ala, Val, Leu, Ile, Pro, Phe, Met, or Trp; (iii) X at position 114 is Met, Gly, Ala, Val, Leu, Ile, Pro, Phe, Met, or Trp; and (iv) X at position 115 is Gly, Ala, Val, Leu, Ile, Pro, Phe, Met, or Trp; and (b) SEQ ID NO: 18 (constant region of beta chain), wherein X at position 56 is Ser or Cys. In an embodiment of the invention, the functional variant of the TCR comprising SEQ ID NO: 16 does not comprise SEQ ID NO: 17 (unsubstituted murine constant region of alpha chain). In an embodiment of the invention, the functional variant of the TCR comprising SEQ ID NO: 18 does not comprise SEQ ID NO: 19 (unsubstituted murine constant region of beta chain).

In an embodiment of the invention, the substituted amino acid sequence includes cysteine substitutions in the constant region of one or both of the α and β chains to provide a cysteine-substituted TCR. Opposing cysteines in the α and the β chains provide a disulfide bond that links the constant regions of the α and the β chains of the substituted TCR to one another and which is not present in a TCR comprising the unsubstituted human constant region or the unsubstituted murine constant region. In this regard, the functional variant of the TCR is a cysteine-substituted, chimeric TCR in which one or both of the native Thr48 of SEQ ID NO: 17 and the native Ser56 of SEQ ID NO: 19 may be substituted with Cys. Preferably, both of the native Thr48 of SEQ ID NO: 17 and the native Ser56 of SEQ ID NO: 19 are substituted with Cys. In an embodiment, the cysteine-substituted, chimeric TCR comprises an alpha chain constant region comprising the amino acid sequence of SEQ ID NO: 16, wherein X at position 48 is Cys, X at position 112 is the native Ser, X at position 114 is the native Met, and X at position 115 is the native Gly, and a beta chain constant region comprising the amino acid sequence of SEQ ID NO: 18, wherein X at position 56 is Cys. Preferably, the cysteine-substituted, chimeric TCR comprises an alpha chain constant region comprising the amino acid sequence of SEQ ID NO: 24 and a beta chain constant region comprising the amino acid sequence of SEQ ID NO: 23. The cysteine-substituted, chimeric TCRs of the invention may include the substituted constant region in addition to any of the CDRs and/or variable regions described herein. In this regard, the cysteine-substituted, chimeric TCR can comprise the amino acid sequences of (i) SEQ ID NOs: 3-5 and 24; (ii) SEQ ID NO: 9 and 24; (iii) SEQ ID NOs: 6-8 and 23; (iv) SEQ ID NOs:

10 and 23, wherein X at position 2 of SEQ ID NO: 10 is Ala or Gly; (v) SEQ ID NO: 11 and 23; (vi) SEQ ID NOs: 9 and 16; (vii) SEQ ID NOs: 10 and 18; (viii) SEQ ID NOs: 11 and 18; (ix) SEQ ID NOs: 3-5 and 16; or (x) SEQ ID NOs: 6-8 and 18. Preferably, the cysteine-substituted, chimeric TCR comprises the amino acid sequences of (i) SEQ ID NOs: 3-8 and 23-24; (ii) SEQ ID NOs: 9-10 and 23-24; (iii) SEQ ID NOs: 9, 11, and 23-24; (iv) SEQ ID NOs: 3-8, 16, and 18; (v) SEQ ID NOs: 9-10, 16, and 18; or (vi) SEQ ID NOs: 9, 11, 16, and 18. In an embodiment, the Cys-substituted, chimeric TCR comprises a full-length beta chain comprising SEQ ID NO: 27. In this regard, the Cys-substituted, chimeric TCR can comprise SEQ ID NOs: 9 and 24; SEQ ID NO: 27; or all of SEQ ID NOs: 9, 24, and 27.

In an embodiment of the invention, the substituted amino acid sequence includes substitutions of one, two, or three amino acids in the transmembrane (TM) domain of the constant region of one or both of the α and β chains with a hydrophobic amino acid to provide a hydrophobic amino acid-substituted TCR (also referred to herein as an "LVL-modified TCR"). The hydrophobic amino acid substitution(s) in the TM domain of the TCR may increase the hydrophobicity of the TM domain of the TCR as compared to a TCR that lacks the hydrophobic amino acid substitution(s) in the TM domain. In this regard, the functional variant of the TCR is an LVL-modified chimeric TCR in which one, two, or three of the native Ser112, Met114, and Gly115 of SEQ ID NO: 17 may, independently, be substituted with Gly, Ala, Val, Leu, Ile, Pro, Phe, Met, or Trp; preferably with Leu, Ile, or Val. Preferably, all three of the native Ser112, Met114, and Gly115 of SEQ ID NO: 17 may, independently, be substituted with Gly, Ala, Val, Leu, Ile, Pro, Phe, Met, or Trp; preferably with Leu, Ile, or Val. In an embodiment, the LVL-modified chimeric TCR comprises an alpha chain constant region comprising the amino acid sequence of SEQ ID NO: 16, wherein X at position 48 is the native Thr, X at position 112 is Ser, Gly, Ala, Val, Leu, Ile, Pro, Phe, Met, or Trp, X at position 114 is Met, Gly, Ala, Val, Leu, Ile, Pro, Phe, Met, or Trp, and X at position 115 is Gly, Ala, Val, Leu, Ile, Pro, Phe, Met, or Trp, and a beta chain constant region comprising the amino acid sequence of SEQ ID NO: 19, wherein the LVL-modified chimeric TCR comprising SEQ ID NO: 16 does not comprise SEQ ID NO: 17 (unsubstituted murine constant region of alpha chain). Preferably, the LVL-modified, chimeric TCR comprises an alpha chain constant region comprising the amino acid sequence of SEQ ID NO: 21 and a beta chain constant region comprising the amino acid sequence of SEQ ID NO: 19. The LVL-modified, chimeric TCRs of the invention may include the substituted constant region in addition to any of the CDRs and/or variable regions described herein. In this regard, the LVL-modified, chimeric TCR can comprise (i) SEQ ID NOs: 3-5 and 21; (ii) SEQ ID NOs: 9 and 21; (iii) SEQ ID NOs: 6-8 and 19; (iv) SEQ ID NOs: 10 and 19, wherein X at position 2 of SEQ ID NOs: 10 is Ala or Gly; (v) SEQ ID NOs: 11 and 19; (vi) SEQ ID NOs: 9 and 16; (vii) SEQ ID NOs: 3-5 and 16; (x) SEQ ID NOs: 6-8 and 18; (viii) SEQ ID NO: 10 and 18; or (ix) SEQ ID NO: 11 and 18. Preferably, the cysteine-substituted, chimeric TCR comprises the amino acid sequences of (i) SEQ ID NOs: 3-8 and 19 and 21; (ii) SEQ ID NOs: 9-10 and 19 and 21; (iii) SEQ ID NOs: 9, 11, and 19 and 21; (iv) SEQ ID NOs: 3-8, 16, and 18; (v) SEQ ID NOs: 9-10, 16, and 18; or (vi) SEQ ID NOs: 9, 11, 16, and 18. In an embodiment, the LVL-modified, chimeric TCR comprises a full-length alpha chain comprising the amino acid sequence of SEQ ID NO: 22 and a full-length beta chain comprising the amino acid sequence of SEQ ID NO: 20. In this regard, the LVL-modified, chimeric TCR can comprise SEQ ID NO: 20, SEQ ID NO: 22, SEQ ID NO: 29, or both SEQ ID NOs: 20 and 22.

In an embodiment of the invention, the substituted amino acid sequence includes the cysteine substitutions in the constant region of one or both of the α and β chains in combination with the substitution(s) of one, two, or three amino acids in the transmembrane (TM) domain of the constant region of one or both of the α and β chains with a hydrophobic amino acid (also referred to herein as "cysteine-substituted, LVL-modified TCR"). In this regard, the functional variant of the TCR is a cysteine-substituted, LVL-modified, chimeric TCR in which the native Thr48 of SEQ ID NO: 17 is substituted with Cys; one, two, or three of the native Ser112, Met114, and Gly115 of SEQ ID NO: 17 are, independently, substituted with Gly, Ala, Val, Leu, Ile, Pro, Phe, Met, or Trp; preferably with Leu, Ile, or Val; and the native Ser56 of SEQ ID NO: 19 is substituted with Cys. Preferably, all three of the native Ser112, Met114, and Gly115 of SEQ ID NO: 17 may, independently, be substituted with Gly, Ala, Val, Leu, Ile, Pro, Phe, Met, or Trp; preferably with Leu, Ile, or Val. In an embodiment, the cysteine-substituted, LVL-modified, chimeric TCR comprises an alpha chain constant region comprising the amino acid sequence of SEQ ID NO: 16, wherein X at position 48 is Cys, X at position 112 is Ser, Gly, Ala, Val, Leu, Ile, Pro, Phe, Met, or Trp, X at position 114 is Met, Gly, Ala, Val, Leu, Ile, Pro, Phe, Met, or Trp, and X at position 115 is Gly, Ala, Val, Leu, Ile, Pro, Phe, Met, or Trp, and a beta chain constant region comprising the amino acid sequence of SEQ ID NO: 18, wherein X at position 56 is Cys, wherein the cysteine-substituted, LVL-modified chimeric TCR comprising SEQ ID NO: 16 does not comprise SEQ ID NO: 17 (unsubstituted murine constant region of alpha chain). Preferably, the cysteine-substituted, LVL-modified, chimeric TCR comprises an alpha chain constant region comprising the amino acid sequence of SEQ ID NO: 25 and a beta chain constant region comprising the amino acid sequence of SEQ ID NO: 23. The cysteine-substituted, LVL-modified, chimeric TCRs of the invention may include the substituted constant region in addition to any of the CDRs and/or variable regions described herein. In this regard, the cysteine-substituted, LVL-modified, chimeric TCR can comprise (i) SEQ ID NOs: 3-5 and 25; (ii) SEQ ID NO: 9 and 25; (iii) SEQ ID NOs: 6-8 and 23; (iv) SEQ ID NO: 10 and 23, wherein X at position 2 of SEQ ID NO: 10 is Ala or Gly; (v) SEQ ID NO: 11 and 23; (vi) SEQ ID NO: 3-5 and 16; (vii) SEQ ID NOs: 9 and 16; (viii) SEQ ID NOs: 6-8 and 18; (ix) SEQ ID NOs: 10 and 18; or (x) SEQ ID NOs: 11 and 18. Preferably, the cysteine-substituted, LVL-modified, chimeric TCR comprises the amino acid sequences of (i) SEQ ID NOs: 3-8 and 23 and 25; (ii) SEQ ID NOs: 9-10 and 23 and 25; (iii) SEQ ID NOs: 9, 11, and 23 and 25; (iv) SEQ ID NOs: 3-8, 16, and 18; (v) SEQ ID NOs: 9, 10, 16, and 18; or SEQ ID NOs: 9, 11, 16, and 18. In an especially preferred embodiment, the cysteine-substituted, LVL-modified, chimeric TCR comprises a full-length alpha chain comprising the amino acid sequence of SEQ ID NO: 26 and a full-length beta chain comprising the amino acid sequence of SEQ ID NO: 27. In this regard, the Cys-substituted, LVL-modified, chimeric TCR can comprise SEQ ID NO: 26, SEQ ID NO: 27, SEQ ID NO: 30, or both SEQ ID NOs: 26 and 27.

The TCR (or functional variant thereof), polypeptide, or protein can consist essentially of the specified amino acid sequence or sequences described herein, such that other components of the TCR (or functional variant thereof), polypeptide, or protein, e.g., other amino acids, do not materially change the biological activity of the TCR (or functional variant thereof), polypeptide, or protein. In this regard, the inventive TCR (or functional variant thereof), polypeptide, or protein can, for example, consist essentially of the amino acid sequence of any one of SEQ ID NOs: 12, 13, 20, 22, 26, 27, 29, and 30. Also, for instance, the inventive TCRs (including functional variants thereof), polypeptides, or proteins can consist essentially of the amino acid sequence(s) of SEQ ID NO: 9, 10, 11, 14-19, 21, 23-25, both SEQ ID NOs: 9 and 10, both SEQ ID NOs: 9 and 11, both SEQ ID NOs: 14 and 15, both SEQ ID NOs: 16 and 18, both SEQ ID NOs: 17 and 19, both SEQ ID NOs: 23 and 24, both SEQ ID NOs: 19 and 21, or both SEQ ID NOs: 23 and 25. Furthermore, the inventive TCRs (including functional variants thereof), polypeptides, or proteins can consist essentially of the amino acid sequence of SEQ ID NO: 3 (CDR1 of a chain), SEQ ID NO: 4 (CDR2 of a chain), SEQ ID NO: 5 (CDR3 of a chain), SEQ ID NO: 6 (CDR1 of β chain), SEQ ID NO: 7 (CDR2 of β chain), SEQ ID NO: 8 (CDR3 of β chain), or any combination thereof, e.g., SEQ ID NOs: 3-5; 6-8; or 3-8.

Also provided by the invention is a polypeptide comprising a functional portion of any of the TCRs (or functional variants thereof) described herein. The term "polypeptide" as used herein includes oligopeptides and refers to a single chain of amino acids connected by one or more peptide bonds.

With respect to the inventive polypeptides, the functional portion can be any portion comprising contiguous amino acids of the TCR (or functional variant thereof) of which it is a part, provided that the functional portion specifically binds to HPV 16 E7. The term "functional portion" when used in reference to a TCR (or functional variant thereof) refers to any part or fragment of the TCR (or functional variant thereof) of the invention, which part or fragment retains the biological activity of the TCR (or functional variant thereof) of which it is a part (the parent TCR or parent functional variant thereof). Functional portions encompass, for example, those parts of a TCR (or functional variant thereof) that retain the ability to specifically bind to HPV 16 E7 (e.g., in an HLA-A2-dependent manner), or detect, treat, or prevent cancer, to a similar extent, the same extent, or to a higher extent, as the parent TCR (or functional variant thereof). In reference to the parent TCR (or functional variant thereof), the functional portion can comprise, for instance, about 10%, 25%, 30%, 50%, 68%, 80%, 90%, 95%, or more, of the parent TCR (or functional variant thereof).

The functional portion can comprise additional amino acids at the amino or carboxy terminus of the portion, or at both termini, which additional amino acids are not found in the amino acid sequence of the parent TCR or functional variant thereof. Desirably, the additional amino acids do not interfere with the biological function of the functional portion, e.g., specifically binding to HPV 16 E7; and/or having the ability to detect cancer, treat or prevent cancer, etc. More desirably, the additional amino acids enhance the biological activity, as compared to the biological activity of the parent TCR or functional variant thereof.

The polypeptide can comprise a functional portion of either or both of the α and β chains of the TCRs or functional variant thereof of the invention, such as a functional portion comprising one of more of CDR1, CDR2, and CDR3 of the variable region(s) of the α chain and/or β chain of a TCR or functional variant thereof of the invention. In an embodiment of the invention, the polypeptide can comprise a functional portion comprising the amino acid sequence of SEQ ID NO: 3 (CDR1 of α chain), 4 (CDR2 of α chain), 5 (CDR3 of α chain), 6 (CDR1 of β chain), 7 (CDR2 of β chain), 8 (CDR3 of β chain), or a combination thereof. Preferably, the inventive polypeptide comprises a functional portion comprising SEQ ID NOs: 3-5; 6-8; or all of SEQ ID NOs: 3-8. More preferably, the polypeptide comprises a functional portion comprising the amino acid sequences of all of SEQ ID NOs: 3-8.

In an embodiment of the invention, the inventive polypeptide can comprise, for instance, the variable region of the inventive TCR or functional variant thereof comprising a combination of the CDR regions set forth above. In this regard, the polypeptide can comprise the amino acid sequence of SEQ ID NO: 9 (the variable region of an α chain), SEQ ID NO: 10, wherein X at position 2 of SEQ ID NO: 10 is Ala or Gly (the variable region of a R chain), SEQ ID NO: 11 (the variable region of a β chain), both SEQ ID NOs: 9 and 10, or both SEQ ID NOs: 9 and 11. Preferably, the polypeptide comprises the amino acid sequences of both SEQ ID NOs: 9 and 10, wherein X at position 2 of SEQ ID NO: 10 is Ala.

The inventive polypeptide may further comprise a constant region derived from any suitable species such as, e.g., human or mouse, described herein or any of the substituted constant regions described herein. In this regard, the polypeptide can comprise the amino acid sequence of SEQ ID NO: 14 (the constant region of a human α chain), SEQ ID NO: 15 (the constant region of a human β chain), SEQ ID NO: 16 (constant region of α chain, substituted as described herein with respect to other aspects of the invention), SEQ ID NO: 17 (the constant region of a murine α chain), SEQ ID NO: 18 (constant region of β chain, substituted as described herein with respect to other aspects of the invention), SEQ ID NO: 19 (the constant region of a murine β chain), SEQ ID NO: 21 (constant region of an LVL-modified α chain), SEQ ID NO: 23 (constant region of a Cys-substituted β chain), SEQ ID NO: 24 (constant region of a Cys-substituted α chain), SEQ ID NO: 25 (constant region of a Cys-substituted, LVL-modified α chain), both SEQ ID NOs: 14 and 15, both SEQ ID NOs: 16 and 18, both SEQ ID NOs: 17 and 19, both SEQ ID NOs: 19 and 21, both SEQ ID NOs: 23 and 24, or both SEQ ID NOs: 23 and 25. Preferably, the polypeptide comprises both SEQ ID NOs: 14 and 15, both SEQ ID NOs: 16 and 18, both SEQ ID NOs: 17 and 19, both SEQ ID NOs: 19 and 21, both SEQ ID NOs: 23 and 24, or both SEQ ID NOs: 23 and 25. In an embodiment, the polypeptide comprising the amino acid sequence of one or both of SEQ ID NOs: 9 and 11 is isolated or purified.

In an embodiment of the invention, the inventive polypeptide may comprise a combination of a variable region and a constant region. In this regard, the polypeptide can comprise both SEQ ID NOs: 9 and 14, both SEQ ID NOs: 9 and 16, both SEQ ID NOs: 9 and 17, both SEQ ID NOs: 9 and 21, both SEQ ID NOs: 9 and 24, both SEQ ID NOs: 9 and 25, both SEQ ID NOs: 10 and 15, both SEQ ID NOs: 10 and 18, both SEQ ID NOs: 10 and 19, both SEQ ID NOs: 10 and 23, both SEQ ID NOs: 11 and 15, both SEQ ID NOs: 11 and 18, both SEQ ID NOs: 11 and 19, both SEQ ID NOs: 11 and 23, all of SEQ ID NOs: 3-5 and 14, all of SEQ ID NOs: 3-5 and 16, all of SEQ ID NOs: 3-5 and 17, all of SEQ ID NOs: 3-5 and 21, all of SEQ ID NOs: 3-5 and 24, all of SEQ ID NOs: 3-5 and 25, all of SEQ ID NOs: 6-8 and 15, all of SEQ ID NOs: 6-8 and 18, all of SEQ ID NOs: 6-8 and 19, all of SEQ ID NOs: 6-8 and 23, all of SEQ ID NOs: 3-8 and 14-15, all of SEQ ID NOs: 3-8 and 16 and 18, all of SEQ ID NOs: 3-8 and 17 and 19, all of SEQ ID NOs: 3-8 and 19 and 21, all of SEQ ID NOs: 3-8 and 23 and 24, all of SEQ ID NOs: 3-8 and 23 and 25, all of SEQ ID NOs: 9-10 and 14-15, all of SEQ ID NOs: 9-10 and 16 and 18, all of SEQ ID NOs: 9-10 and 17 and 19, all of SEQ ID NOs: 9-10 and 19 and 21, all of SEQ ID NOs: 9-10 and 23 and 24, all of SEQ ID NOs: 9-10 and 23 and 25, all of SEQ ID NOs: 9, 11, and 14-15, all of SEQ ID NOs: 9, 11, and 16 and 18, all of SEQ ID NOs: 9, 11, and 17 and 19, all of SEQ ID NOs: 9, 11, and 19 and 21, all of SEQ ID NOs: 9, 11, and 23 and 24, or all of SEQ ID NOs: 9, 11, and 23 and 25. SEQ ID NOs: 16 and 18 may be substituted as described herein with respect to other aspects of the invention. In an embodiment, the polypeptide comprising the amino acid sequence of one or both of (i) SEQ ID NOs: 9 and 14 and (ii) SEQ ID NOs: 11 and 15 is isolated or purified.

In an embodiment of the invention, the inventive polypeptide can comprise the entire length of an α or β chain of one of the TCRs or functional variant thereof described herein. In this regard, the inventive polypeptide can comprise an amino acid sequence of (i) any one of SEQ ID NOs: 12, 13, 20, 22, 26, 27, 29, 30; (ii) SEQ ID NOs: 9, 24, and 27; (iii) SEQ ID NOs: 9, 17, and 20; or (iv) SEQ ID NOs: 9, 10, 16, and 18. SEQ ID NOs: 16 and 18 may be substituted as described herein with respect to other aspects of the invention.

Alternatively, the polypeptide of the invention can comprise α and β chains of the TCRs or functional variants thereof described herein. For example, the inventive polypeptide can comprise the amino acid sequences of both SEQ ID NOs: 12 and 13; both SEQ ID NOs: 20 and 22; both SEQ ID NOs: 26 and 27; all of SEQ ID NOs: 9, 24, and 27; all of SEQ ID NOs: 9, 17, and 20; or all of SEQ ID NOs: 9, 10, 16, and 18. Preferably, the polypeptide comprises the amino acid sequences of both SEQ ID NOs: 12 and 13; both SEQ ID NOs: 20 and 22; both SEQ ID NOs: 26 and 27; all of SEQ ID NOs: 9, 24, and 27; all of SEQ ID NOs: 9, 17, and 20; or all of SEQ ID NOs: 9, 10, 16, and 18. SEQ ID NOs: 16 and 18 may be substituted as described herein with respect to other aspects of the invention. In an embodiment, the polypeptide comprising the amino acid sequence of one or both of SEQ ID NOs: 12 and 13 is isolated or purified.

The invention further provides a protein comprising at least one of the polypeptides described herein. By "protein" is meant a molecule comprising one or more polypeptide chains. In an embodiment, the protein comprising (a) one or both of the amino acid sequences of SEQ ID NO: 9 and SEQ ID NO: 10, wherein X at position 2 of SEQ ID NO: 10 is Gly, or (b) one or both of SEQ ID NO: 12 and 13 is isolated or purified.

In an embodiment, the protein of the invention can comprise a first polypeptide chain comprising the amino acid sequences of SEQ ID NOs: 3-5 and a second polypeptide chain comprising the amino acid sequence of SEQ ID NOs: 6-8. Alternatively or additionally, the protein of the invention can comprise a first polypeptide chain comprising the amino acid sequence of SEQ ID NO: 9 and a second polypeptide chain comprising the amino acid sequence of SEQ ID NO: 10, wherein (i) X at position 2 of SEQ ID NO: 10 is Ala or Gly, and (ii) the protein comprising SEQ ID NOs: 9 and 10, wherein X at position 2 of SEQ ID NO: 10 is Gly, is isolated or purified. The protein can, for example, comprise a first polypeptide chain comprising the amino acid sequence of (i) SEQ ID NO: 12, (ii) SEQ ID NO: 22, (iii) SEQ ID NO: 26, (iv) SEQ ID NO: 9 and 16, (v) SEQ ID NO: 9 and 17, or (vi) SEQ ID NO: 9 and 24 and a second polypeptide chain comprising the amino acid sequence of (i) SEQ ID NO: 10 and 18, or (ii) any one of SEQ ID NOs: 13, 20, and 27, wherein the protein comprising SEQ ID NO: 12 and 13 is isolated or purified, and SEQ ID NOs: 16 and 18 are substituted as described herein with respect to other aspects of the invention. In this instance, the protein of the invention can be a TCR. Alternatively, if, for example, the protein comprises a single polypeptide chain comprising both SEQ ID NOs: 12 and 13, both SEQ ID NO: 20 and 22, SEQ ID NO: 26 and 27, all of SEQ ID NOs: 9, 10, 16, and 18, all of SEQ ID NOs: 9, 17, and 20, all of SEQ ID NOs: 9, 24, and 27, or if the first and/or second polypeptide chain(s) of the protein further comprise(s) other amino acid sequences, e.g., an amino acid sequence encoding an immunoglobulin or a portion thereof, then the inventive protein can be a fusion protein. In this regard, the invention also provides a fusion protein comprising at least one of the inventive polypeptides described herein along with at least one other polypeptide. The other polypeptide can exist as a separate polypeptide of the fusion protein, or can exist as a polypeptide, which is expressed in frame (in tandem) with one of the inventive polypeptides described herein. The other polypeptide can encode any peptidic or proteinaceous molecule, or a portion thereof, including, but not limited to an immunoglobulin, CD3, CD4, CD8, an MHC molecule, a CD1 molecule, e.g., CD1a, CD1b, CD1c, CD1d, etc.

The fusion protein can comprise one or more copies of the inventive polypeptide and/or one or more copies of the other polypeptide. For instance, the fusion protein can comprise 1, 2, 3, 4, 5, or more, copies of the inventive polypeptide and/or of the other polypeptide. Suitable methods of making fusion proteins are known in the art, and include, for example, recombinant methods. See, for instance, Choi et al., *Mol. Biotechnol.* 31: 193-202 (2005).

In some embodiments of the invention, the TCRs (and functional portions and functional variants thereof), polypeptides, and proteins of the invention may be expressed as a single protein comprising a linker peptide linking the α chain and the β chain. In this regard, the TCRs (and functional variants and functional portions thereof), polypeptides, and proteins of the invention comprising both SEQ ID NOs: 12 and 13, both SEQ ID NO: 20 and 22, SEQ ID NO: 26 and 27, all of SEQ ID NOs: 9, 10, 16, and 18, all of SEQ ID NOs: 9, 17, and 20, all of SEQ ID NOs: 9, 24, and 27 may further comprise a linker peptide. The linker peptide may advantageously facilitate the expression of a recombinant TCR (including functional portions and functional variants thereof), polypeptide, and/or protein in a host cell. The linker peptide may comprise any suitable amino acid sequence. For example, the linker peptide may comprise SEQ ID NO: 28. In an embodiment of the invention, the protein comprising an alpha chain, beta chain, and a linker may comprise SEQ ID NO: 29 (LVL-modified, chimeric TCR) or SEQ ID NO: 30 (Cys-substituted, LVL-modified, chimeric TCR). Upon expression of the construct including the linker peptide by a host cell, the linker peptide may be cleaved, resulting in separated α and β chains.

The protein of the invention can be a recombinant antibody comprising at least one of the inventive polypeptides described herein. As used herein, "recombinant antibody" refers to a recombinant (e.g., genetically engineered) protein comprising at least one of the polypeptides of the invention and a polypeptide chain of an antibody, or a portion thereof. The polypeptide of an antibody, or portion thereof, can be a heavy chain, a light chain, a variable or constant region of a heavy or light chain, a single chain variable fragment (scFv), or an Fc, Fab, or F(ab)₂' fragment of an antibody, etc. The polypeptide chain of an antibody, or portion thereof, can exist as a separate polypeptide of the recombinant antibody. Alternatively, the polypeptide chain of an antibody, or portion thereof, can exist as a polypeptide, which is expressed in frame (in tandem) with the polypeptide of the invention. The polypeptide of an antibody, or portion thereof, can be a polypeptide of any antibody or any antibody fragment, including any of the antibodies and antibody fragments described herein.

The TCRs, polypeptides, and proteins of the invention (including functional variants thereof) can be of any length, i.e., can comprise any number of amino acids, provided that the TCRs, polypeptides, or proteins (or functional variants thereof) retain their biological activity, e.g., the ability to specifically bind to HPV 16 E7; detect cancer, HPV 16 infection, or HPV-positive premalignancy in a mammal; or treat or prevent cancer, HPV 16 infection, or HPV-positive premalignancy in a mammal, etc. For example, the polypeptide can be in the range of from about 50 to about 5000 amino acids long, such as 50, 70, 75, 100, 125, 150, 175, 200, 300, 400, 500, 600, 700, 800, 900, 1000 or more amino acids in length. In this regard, the polypeptides of the invention also include oligopeptides.

The TCRs, polypeptides, and proteins of the invention (including functional variants thereof) of the invention can comprise synthetic amino acids in place of one or more naturally-occurring amino acids. Such synthetic amino acids are known in the art, and include, for example, aminocyclohexane carboxylic acid, norleucine, α-amino n-decanoic acid, homoserine, S-acetylaminomethyl-cysteine, trans-3- and trans-4-hydroxyproline, 4-aminophenylalanine, 4-nitrophenylalanine, 4-chlorophenylalanine, 4-carboxyphenylalanine, β-phenylserine β-hydroxyphenylalanine, phenylglycine, α-naphthylalanine, cyclohexylalanine, cyclohexylglycine, indoline-2-carboxylic acid, 1,2,3,4-tetrahydroisoquinoline-3-carboxylic acid, aminomalonic acid, aminomalonic acid monoamide, N'-benzyl-N'-methyl-lysine, N',N'-dibenzyl-lysine, 6-hydroxylysine, ornithine, α-aminocyclopentane carboxylic acid, α-aminocyclohexane carboxylic acid, α-aminocycloheptane carboxylic acid, α-(2-amino-2-norbomane)-carboxylic acid, α,γ-diaminobutyric acid, α,β-diaminopropionic acid, homophenylalanine, and α-tert-butylglycine.

The TCRs, polypeptides, and proteins of the invention (including functional variants thereof) can be glycosylated, amidated, carboxylated, phosphorylated, esterified, N-acylated, cyclized via, e.g., a disulfide bridge, or converted into an acid addition salt and/or optionally dimerized or polymerized, or conjugated.

The TCR, polypeptide, and/or protein of the invention (including functional variants thereof) can be obtained by methods known in the art. Suitable methods of de novo synthesizing polypeptides and proteins are described in references, such as Chan et al., Fmoc Solid Phase Peptide Synthesis, *Oxford University Press, Oxford, United Kingdom*, 2005; Peptide and Protein Drug Analysis, ed. Reid, R., Marcel Dekker, Inc., 2000; Epitope Mapping, ed. Westwood et al., *Oxford University Press, Oxford, United Kingdom*, 2000; and U.S. Pat. No. 5,449,752. Also, polypeptides and proteins can be recombinantly produced using the nucleic acids described herein using standard recombinant methods. See, for instance, Green and Sambrook, *Molecular Cloning: A Laboratory Manual*, 4th ed., Cold Spring Harbor Press, Cold Spring Harbor, NY 2012; and Ausubel et al., *Current Protocols in Molecular Biology*, Greene Publishing Associates and John Wiley & Sons, N Y, 1994. Further, some of the TCRs, polypeptides, and proteins of the invention (including functional variants thereof) can be isolated and/or purified from a source, such as a plant, a bacterium, an insect, a mammal, e.g., a rat, a human, etc. Methods of isolation and purification are well-known in the art. Alternatively, the TCRs, polypeptides, and/or proteins described herein (including functional variants thereof) can be commercially synthesized by companies, such as Synpep (Dublin, CA), Peptide Technologies Corp. (Gaithersburg, MD), and Multiple Peptide Systems (San Diego, CA). In this respect, the inventive TCRs (including functional variants thereof), polypeptides, and proteins can be synthetic, recombinant, isolated, and/or purified.

Included in the scope of the invention are conjugates, e.g., bioconjugates, comprising any of the inventive TCRs, polypeptides, or proteins (including any of the functional variants thereof), nucleic acids, recombinant expression vectors, host cells, populations of host cells, or antibodies, or antigen binding portions thereof. Conjugates, as well as methods of synthesizing conjugates in general, are known in the art (See, for instance, Hudecz, F., *Methods Mol. Biol.* 298: 209-223 (2005) and Kirin et al., *Inorg Chem.* 44(15): 5405-5415 (2005)).

An embodiment of the invention provides a nucleic acid sequence comprising a nucleotide sequence encoding any of the TCRs (including functional portions and functional variants thereof, polypeptides, or proteins described herein. By "nucleic acid" as used herein includes "polynucleotide," "oligonucleotide," and "nucleic acid molecule," and generally means a polymer of DNA or RNA, which can be single-stranded or double-stranded, synthesized or obtained (e.g., isolated and/or purified) from natural sources, which can contain natural, non-natural or altered nucleotides, and which can contain a natural, non-natural or altered internucleotide linkage, such as a phosphoroamidate linkage or a phosphorothioate linkage, instead of the phosphodiester found between the nucleotides of an unmodified oligonucleotide. In an embodiment, the nucleic acid comprises complementary DNA (cDNA). It is generally preferred that the nucleic acid does not comprise any insertions, deletions, inversions, and/or substitutions. However, it may be suitable in some instances, as discussed herein, for the nucleic acid to comprise one or more insertions, deletions, inversions, and/or substitutions.

Preferably, the nucleic acids of the invention are recombinant. As used herein, the term "recombinant" refers to (i) molecules that are constructed outside living cells by joining natural or synthetic nucleic acid segments to nucleic acid molecules that can replicate in a living cell, or (ii) molecules that result from the replication of those described in (i) above. For purposes herein, the replication can be in vitro replication or in vivo replication.

The nucleic acids can be constructed based on chemical synthesis and/or enzymatic ligation reactions using procedures known in the art. See, for example, Green and Sambrook et al., supra, and Ausubel et al., supra. For example, a nucleic acid can be chemically synthesized using naturally occurring nucleotides or variously modified nucleotides designed to increase the biological stability of the molecules or to increase the physical stability of the duplex formed upon hybridization (e.g., phosphorothioate derivatives and acridine substituted nucleotides). Examples of modified nucleotides that can be used to generate the nucleic acids include, but are not limited to, 5-fluorouracil, 5-bromouracil, 5-chlorouracil, 5-iodouracil, hypoxanthine, xanthine, 4-acetylcytosine, 5-(carboxyhydroxymethyl) uracil, 5-carboxymethylaminomethyl-2-thiouridine, 5-carboxymethylaminomethyluracil, dihydrouracil, beta-D-galactosylqueosine, inosine, $N^6$-isopentenyladenine, 1-methylguanine, 1-methylinosine, 2,2-dimethylguanine, 2-methyladenine, 2-methylguanine, 3-methylcytosine, 5-methylcytosine, $N^6$-substituted adenine, 7-methylguanine, 5-methylaminomethyluracil, 5-methoxyaminomethyl-2-thiouracil, beta-D-mannosylqueosine, 5'-methoxycarboxymethyluracil, 5-methoxyuracil, 2-methylthio-$N^6$-isopentenyladenine, uracil-5-oxyacetic acid (v), wybutoxosine, pseudouracil, queosine, 2-thiocytosine, 5-methyl-2-thiouracil, 2-thiouracil, 4-thiouracil, 5-methyluracil, uracil-5-oxyacetic acid methylester, 3-(3-amino-3-N-2-carboxypropyl) uracil, and 2,6-diaminopurine. Alternatively, one or more of the nucleic acids of the invention can be purchased from companies, such as Macromolecular Resources (Fort Collins, CO) and Synthegen (Houston, TX).

The nucleic acid can comprise any nucleotide sequence which encodes any of the TCRs, polypeptides, proteins, or functional variants thereof described herein. In an embodiment of the invention, the nucleotide sequence may comprise, consist, or consist essentially of any one of SEQ ID NO: 31 (alpha chain of human, wild-type TCR), SEQ ID NO: 32 (beta chain of human, wild-type TCR), SEQ ID NO: 33 (alpha chain of LVL-modified, chimeric TCR), SEQ ID NO: 34 (beta chain of chimeric TCR), SEQ ID NO: 35 (alpha chain of Cys-substituted, LVL-modified, chimeric TCR), SEQ ID NO: 36 (beta chain of Cys-substituted, chimeric TCR), both SEQ ID NOs: 31 and 32, both SEQ ID NOs: 33 and 34, or both SEQ ID NOs: 35 and 36.

In an embodiment of the invention, the nucleic acid comprises a non-natural nucleotide sequence. A nucleotide sequence may be considered to be "non-natural" if the nucleotide sequence is not found in nature. In some embodiments, the nucleotide sequence may be codon-optimized. Without being bound to a particular theory or mechanism, it is believed that codon optimization of the nucleotide sequence increases the translation efficiency of the mRNA transcripts. Codon optimization of the nucleotide sequence may involve substituting a native codon for another codon that encodes the same amino acid, but can be translated by tRNA that is more readily available within a cell, thus increasing translation efficiency. Optimization of the nucleotide sequence may also reduce secondary mRNA structures that would interfere with translation, thus increasing translation efficiency. In an embodiment of the invention, the codon-optimized nucleotide sequence may comprise, consist, or consist essentially of any one of SEQ ID NOs: 33-36, both of SEQ ID NOs: 33 and 34, or both of SEQ ID NOs: 35 and 36.

The invention also provides a nucleic acid comprising a nucleotide sequence which is complementary to the nucleotide sequence of any of the nucleic acids described herein or a nucleotide sequence which hybridizes under stringent conditions to the nucleotide sequence of any of the nucleic acids described herein.

The nucleotide sequence which hybridizes under stringent conditions preferably hybridizes under high stringency conditions. By "high stringency conditions" is meant that the nucleotide sequence specifically hybridizes to a target sequence (the nucleotide sequence of any of the nucleic acids described herein) in an amount that is detectably stronger than non-specific hybridization. High stringency conditions include conditions which would distinguish a polynucleotide with an exact complementary sequence, or one containing only a few scattered mismatches from a random sequence that happened to have a few small regions (e.g., 3-10 bases) that matched the nucleotide sequence. Such small regions of complementarity are more easily melted than a full-length complement of 14-17 or more bases, and high stringency hybridization makes them easily distinguishable. Relatively high stringency conditions would include, for example, low salt and/or high temperature conditions, such as provided by about 0.02-0.1 M NaCl or the equivalent, at temperatures of about 50-70° C. Such high stringency conditions tolerate little, if any, mismatch between the nucleotide sequence and the template or target strand, and are particularly suitable for detecting expression of any of the inventive TCRs (including functional portions and functional variants thereof). It is generally appreciated that conditions can be rendered more stringent by the addition of increasing amounts of formamide.

The invention also provides a nucleic acid comprising a nucleotide sequence that is at least about 70% or more, e.g., about 80%, about 90%, about 91%, about 92%, about 93%, about 94%, about 95%, about 96%, about 97%, about 98%, or about 99% identical to any of the nucleic acids described herein.

The nucleic acids of the invention can be incorporated into a recombinant expression vector. In this regard, the invention provides recombinant expression vectors comprising any of the nucleic acids of the invention. In an embodiment of the invention, the recombinant expression vector comprises a nucleotide sequence encoding the α chain, the β chain, and linker peptide. For example, in an embodiment, the recombinant expression vector comprises a codon-optimized nucleotide sequence comprising SEQ ID NO: 39 (encoding chimeric α and β chains SEQ ID NOs: 20 and 22 with a linker positioned between them, wherein the nucleotide sequence encoding the beta chain is positioned 5' of the nucleotide sequence encoding the alpha chain) or SEQ ID NO: 40 (encoding chimeric α and β chains SEQ ID NOs: 26 and 27 with a linker positioned between them, wherein the nucleotide sequence encoding the beta chain is positioned 5' of the nucleotide sequence encoding the alpha chain).

For purposes herein, the term "recombinant expression vector" means a genetically-modified oligonucleotide or polynucleotide construct that permits the expression of an mRNA, protein, polypeptide, or peptide by a host cell, when the construct comprises a nucleotide sequence encoding the mRNA, protein, polypeptide, or peptide, and the vector is contacted with the cell under conditions sufficient to have the mRNA, protein, polypeptide, or peptide expressed within the cell. The vectors of the invention are not naturally-occurring as a whole. However, parts of the vectors can be naturally-occurring. The inventive recombinant expression vectors can comprise any type of nucleotides, including, but not limited to DNA and RNA, which can be single-stranded or double-stranded, synthesized or obtained in part from natural sources, and which can contain natural, non-natural or altered nucleotides. The recombinant expression vectors can comprise naturally-occurring, non-naturally-occurring internucleotide linkages, or both types of linkages. Preferably, the non-naturally occurring or altered nucleotides or internucleotide linkages does not hinder the transcription or replication of the vector.

The recombinant expression vector of the invention can be any suitable recombinant expression vector, and can be used to transform or transfect any suitable host cell. Suitable vectors include those designed for propagation and expansion or for expression or both, such as plasmids and viruses. The vector can be selected from the group consisting of the pUC series (Fermentas Life Sciences), the pBluescript series (Stratagene, LaJolla, CA), the pET series (Novagen, Madison, WI), the pGEX series (Pharmacia Biotech, Uppsala, Sweden), and the pEX series (Clontech, Palo Alto, CA). Bacteriophage vectors, such as λGT10, λGT11, λZapII (Stratagene), λEMBL4, and λNM1149, also can be used. Examples of plant expression vectors include pBI01, pBI101.2, pBI101.3, pBI121 and pBIN19 (Clontech). Examples of animal expression vectors include pEUK-Cl, pMAM and pMAMneo (Clontech). Preferably, the recombinant expression vector is a viral vector, e.g., a retroviral vector. In an especially preferred embodiment, the recombinant expression vector is an MSGV1 vector.

In a preferred embodiment, the recombinant expression vector comprises a nucleotide sequence encoding an alpha chain and a beta chain of any of the TCRs (including functional portions and functional variants thereof) described herein, wherein the nucleotide sequence encoding the beta chain is positioned 5' of the nucleotide sequence encoding the alpha chain. In this regard, the nucleotide sequence encoding the alpha chain may be positioned 3' of the nucleotide sequence encoding the beta chain. Without being bound by a particular theory or mechanism, it is believed that a nucleotide sequence encoding a beta chain that is positioned 5' of the nucleotide sequence encoding the alpha chain may provide any one or more of increased recognition of HPV 16 $E7^+$ targets, increased expression by a host cell, and increased anti-tumor activity as compared to a nucleotide sequence encoding a beta chain that is positioned 3' of the nucleotide sequence encoding the alpha chain. In a less preferred embodiment, the nucleotide sequence encoding the beta chain is positioned 3' of the nucleotide sequence encoding the alpha chain. In this regard, the nucleotide sequence encoding the alpha chain may be positioned 5' of the nucleotide sequence encoding the beta chain. In an embodiment, an MSGV1 vector comprising a codon-optimized nucleotide sequence encoding an LVL-modified, chimeric TCR comprising SEQ ID NOs: 20 and 22 of the invention, wherein the nucleotide sequence encoding the beta chain is positioned 5' of the nucleotide sequence encoding the alpha chain, comprises SEQ ID NO: 37. In another embodiment, an MSGV1 vector comprising a codon-optimized nucleotide sequence encoding a Cys-substituted, LVL-modified, chimeric TCR comprising SEQ ID NOs: 26 and 27 of the invention, wherein the nucleotide sequence encoding the beta chain is positioned 5' of the nucleotide sequence encoding the alpha chain, comprises SEQ ID NO: 38.

The recombinant expression vectors of the invention can be prepared using standard recombinant DNA techniques described in, for example, Green and Sambrook et al., supra, and Ausubel et al., supra. Constructs of expression vectors, which are circular or linear, can be prepared to contain a replication system functional in a prokaryotic or eukaryotic host cell. Replication systems can be derived, e.g., from ColE1, 2 μplasmid, λ, SV40, bovine papillomavirus, and the like.

Desirably, the recombinant expression vector comprises regulatory sequences, such as transcription and translation initiation and termination codons, which are specific to the type of host cell (e.g., bacterium, fungus, plant, or animal) into which the vector is to be introduced, as appropriate and taking into consideration whether the vector is DNA- or RNA-based.

The recombinant expression vector can include one or more marker genes, which allow for selection of transformed or transfected host cells. Marker genes include biocide resistance, e.g., resistance to antibiotics, heavy metals, etc., complementation in an auxotrophic host cell to provide prototrophy, and the like. Suitable marker genes for the inventive expression vectors include, for instance, neomycin/G418 resistance genes, hygromycin resistance genes, histidinol resistance genes, tetracycline resistance genes, and ampicillin resistance genes.

The recombinant expression vector can comprise a native or nonnative promoter operably linked to the nucleotide sequence encoding the TCR, polypeptide, or protein (including functional variants thereof), or to the nucleotide sequence which is complementary to or which hybridizes to the nucleotide sequence encoding the TCR, polypeptide, or protein (including functional variants thereof). The selection of promoters, e.g., strong, weak, inducible, tissue-specific and developmental-specific, is within the ordinary skill of the artisan. Similarly, the combining of a nucleotide sequence with a promoter is also within the skill of the artisan. The promoter can be a non-viral promoter or a viral promoter, e.g., a cytomegalovirus (CMV) promoter, an SV40 promoter, an RSV promoter, and a promoter found in the long-terminal repeat of the murine stem cell virus.

The inventive recombinant expression vectors can be designed for either transient expression, for stable expression, or for both. Also, the recombinant expression vectors can be made for constitutive expression or for inducible expression. Further, the recombinant expression vectors can be made to include a suicide gene.

As used herein, the term "suicide gene" refers to a gene that causes the cell expressing the suicide gene to die. The suicide gene can be a gene that confers sensitivity to an agent, e.g., a drug, upon the cell in which the gene is expressed, and causes the cell to die when the cell is contacted with or exposed to the agent. Suicide genes are known in the art (see, for example, *Suicide Gene Therapy: Methods and Reviews*, Springer, Caroline J. (Cancer Research UK Centre for Cancer Therapeutics at the Institute of Cancer Research, Sutton, Surrey, UK), Humana Press, 2004) and include, for example, the Herpes Simplex Virus (HSV) thymidine kinase (TK) gene, cytosine daminase, purine nucleoside phosphorylase, and nitroreductase.

Another embodiment of the invention further provides a host cell comprising any of the recombinant expression vectors described herein. As used herein, the term "host cell" refers to any type of cell that can contain the inventive recombinant expression vector. The host cell can be a eukaryotic cell, e.g., plant, animal, fungi, or algae, or can be a prokaryotic cell, e.g., bacteria or protozoa. The host cell can be a cultured cell or a primary cell, i.e., isolated directly from an organism, e.g., a human. The host cell can be an adherent cell or a suspended cell, i.e., a cell that grows in suspension. Suitable host cells are known in the art and include, for instance, DH5a *E. coli* cells, Chinese hamster ovarian cells, monkey VERO cells, COS cells, HEK293 cells, and the like. For purposes of amplifying or replicating the recombinant expression vector, the host cell is preferably a prokaryotic cell, e.g., a DH5a cell. For purposes of producing a recombinant TCR, polypeptide, or protein, the host cell is preferably a mammalian cell. Most preferably, the host cell is a human cell. While the host cell can be of any cell type, can originate from any type of tissue, and can be of any developmental stage, the host cell preferably is a peripheral blood lymphocyte (PBL) or a peripheral blood mononuclear cell (PBMC). More preferably, the host cell is a T cell.

For purposes herein, the T cell can be any T cell, such as a cultured T cell, e.g., a primary T cell, or a T cell from a cultured T cell line, e.g., Jurkat, SupT1, etc., or a T cell obtained from a mammal. If obtained from a mammal, the T cell can be obtained from numerous sources, including but not limited to blood, bone marrow, lymph node, the thymus, or other tissues or fluids. T cells can also be enriched for or purified. Preferably, the T cell is a human T cell. More preferably, the T cell is a T cell isolated from a human. The T cell can be any type of T cell and can be of any developmental stage, including but not limited to, CD4+/CD8+ double positive T cells, CD4+ helper T cells, e.g., Th$_1$ and Th$_2$ cells, CD4+ T cells, CD8+ T cells (e.g., cytotoxic T cells), tumor infiltrating lymphocytes (TILs), memory T cells (e.g., central memory T cells and effector memory T cells), naïve T cells, and the like.

Also provided by the invention is a population of cells comprising at least one host cell described herein. The population of cells can be a heterogeneous population comprising the host cell comprising any of the recombinant expression vectors described, in addition to at least one other cell, e.g., a host cell (e.g., a T cell), which does not comprise any of the recombinant expression vectors, or a cell other than a T cell, e.g., a B cell, a macrophage, a neutrophil, an erythrocyte, a hepatocyte, an endothelial cell, an epithelial cells, a muscle cell, a brain cell, etc. Alternatively, the population of cells can be a substantially homogeneous population, in which the population comprises mainly of host cells (e.g., consisting essentially of) comprising the recombinant expression vector. The population also can be a clonal population of cells, in which all cells of the population are clones of a single host cell comprising a recombinant expression vector, such that all cells of the population comprise the recombinant expression vector. In one embodiment of the invention, the population of cells is a clonal population comprising host cells comprising a recombinant expression vector as described herein.

In an embodiment of the invention, the numbers of cells in the population may be rapidly expanded. Expansion of the numbers of T cells can be accomplished by any of a number of methods as are known in the art as described in, for example, U.S. Pat. Nos. 8,034,334; 8,383,099; U.S. Patent Application Publication No. 2012/0244133; Dudley et al., *J. Immunother.*, 26:332-42 (2003); and Riddell et al., *J. Immunol. Methods*, 128:189-201 (1990).

The invention further provides an antibody, or antigen binding portion thereof, which specifically binds to a functional portion of any of the TCRs (or functional variant thereof) described herein. Preferably, the functional portion specifically binds to the cancer antigen, e.g., the functional portion comprising the amino acid sequence SEQ ID NO: 3 (CDR1 of α chain), 4 (CDR2 of α chain), 5 (CDR3 of α chain), 6 (CDR1 of β chain), 7 (CDR2 of β chain), 8 (CDR3 of β chain), SEQ ID NO: 9 (variable region of α chain), SEQ ID NO: 10 (variable region of β chain), SEQ ID NO: 11 (variable region of β chain), or a combination thereof, e.g., 3-5; 6-8; 3-8; 9; 10; 11; 9-10; or 9 and 11. More preferably, the functional portion comprises the amino acid sequences of SEQ ID NOs: 3-8; SEQ ID NOs: 9 and 10; or SEQ ID NOs: 9 and 11. In a preferred embodiment, the antibody, or antigen binding portion thereof, binds to an epitope which is formed by all 6 CDRs (CDR1-3 of the alpha chain and CDR1-3 of the beta chain). The antibody can be any type of immunoglobulin that is known in the art. For instance, the antibody can be of any isotype, e.g., IgA, IgD, IgE, IgG, IgM, etc. The antibody can be monoclonal or polyclonal. The antibody can be a naturally-occurring antibody, e.g., an antibody isolated and/or purified from a mammal, e.g., mouse, rabbit, goat, horse, chicken, hamster, human, etc. Alternatively, the antibody can be a genetically-engineered antibody, e.g., a humanized antibody or a chimeric antibody. The antibody can be in monomeric or polymeric form. Also, the antibody can have any level of affinity or avidity for the functional portion of the inventive TCR (or functional variant thereof). Desirably, the antibody is specific for the functional portion of the inventive TCR (or functional variants thereof), such that there is minimal cross-reaction with other peptides or proteins.

Methods of testing antibodies for the ability to bind to any functional portion or functional variant of the inventive TCR are known in the art and include any antibody-antigen binding assay, such as, for example, radioimmunoassay (RIA), ELISA, Western blot, immunoprecipitation, and competitive inhibition assays (see, e.g., Janeway et al., infra, and U.S. Patent Application Publication No. 2002/0197266 A1).

Suitable methods of making antibodies are known in the art. For instance, standard hybridoma methods are described in, e.g., Köhler and Milstein, *Eur. J. Immunol.*, 5, 511-519 (1976), Harlow and Lane (eds.), *Antibodies: A Laboratory Manual*, CSH Press (1988), and C. A. Janeway et al. (eds.), *Immunobiology*, 8$^{th}$ Ed., Garland Publishing, New York, NY (2011)). Alternatively, other methods, such as EBV-hybridoma methods (Haskard and Archer, *J Immunol. Methods*, 74(2), 361-67 (1984), and Roder et al., *Methods Enzymol.*, 121, 140-67 (1986)), and bacteriophage vector expression systems (see, e.g., Huse et al., *Science*, 246, 1275-81 (1989)) are known in the art. Further, methods of producing antibodies in non-human animals are described in, e.g., U.S. Pat. Nos. 5,545,806, 5,569,825, and 5,714,352, and U.S. Patent Application Publication No. 2002/0197266 A1.

Phage display furthermore can be used to generate the antibody of the invention. In this regard, phage libraries encoding antigen-binding variable (V) domains of antibodies can be generated using standard molecular biology and recombinant DNA techniques (see, e.g., Green and Sambrook et al. (eds.), *Molecular Cloning, A Laboratory Manual*, 4$^{th}$ Edition, Cold Spring Harbor Laboratory Press, New York (2012)). Phage encoding a variable region with the desired specificity are selected for specific binding to the desired antigen, and a complete or partial antibody is reconstituted comprising the selected variable domain. Nucleic acid sequences encoding the reconstituted antibody are introduced into a suitable cell line, such as a myeloma cell used for hybridoma production, such that antibodies having the characteristics of monoclonal antibodies are secreted by the cell (see, e.g., Janeway et al., supra, Huse et al., supra, and U.S. Pat. No. 6,265,150).

Antibodies can be produced by transgenic mice that are transgenic for specific heavy and light chain immunoglobulin genes. Such methods are known in the art and described in, for example U.S. Pat. Nos. 5,545,806 and 5,569,825, and Janeway et al., supra.

Methods for generating humanized antibodies are well known in the art and are described in detail in, for example, Janeway et al., supra, U.S. Pat. Nos. 5,225,539, 5,585,089 and 5,693,761, European Patent No. 0239400 B1, and United Kingdom Patent No. 2188638. Humanized antibodies can also be generated using the antibody resurfacing technology described in, for example, U.S. Pat. No. 5,639,641 and Pedersen et al., *J Mol. Biol.*, 235, 959-973 (1994).

The invention also provides antigen binding portions of any of the antibodies described herein. The antigen binding portion can be any portion that has at least one antigen binding site, such as Fab, F(ab')$_2$, dsFv, sFv, diabodies, and triabodies.

A single-chain variable region fragment (sFv) antibody fragment, which consists of a truncated Fab fragment comprising the variable (V) domain of an antibody heavy chain linked to a V domain of a light antibody chain via a synthetic peptide, can be generated using routine recombinant DNA technology techniques (see, e.g., Janeway et al., supra).

Similarly, disulfide-stabilized variable region fragments (dsFv) can be prepared by recombinant DNA technology (see, e.g., Reiter et al., *Protein Engineering*, 7, 697-704 (1994)). Antibody fragments of the invention, however, are not limited to these exemplary types of antibody fragments.

Also, the antibody, or antigen binding portion thereof, can be modified to comprise a detectable label, such as, for instance, a radioisotope, a fluorophore (e.g., fluorescein isothiocyanate (FITC), phycoerythrin (PE)), an enzyme (e.g., alkaline phosphatase, horseradish peroxidase), and element particles (e.g., gold particles).

The inventive TCRs, polypeptides, proteins, (including functional variants thereof), nucleic acids, recombinant expression vectors, host cells (including populations thereof), and antibodies (including antigen binding portions thereof), can be isolated and/or purified. The term "isolated" as used herein means having been removed from its natural environment. The term "purified" as used herein means having been increased in purity, wherein "purity" is a relative term, and not to be necessarily construed as absolute purity. For example, the purity can be at least about 50%, can be greater than 60%, 70%, 80%, 90%, 95%, or can be 100%.

The inventive TCRs, polypeptides, proteins (including functional variants thereof), nucleic acids, recombinant expression vectors, host cells (including populations thereof), and antibodies (including antigen binding portions thereof), all of which are collectively referred to as "inventive TCR materials" hereinafter, can be formulated into a composition, such as a pharmaceutical composition. In this regard, the invention provides a pharmaceutical composition comprising any of the TCRs, polypeptides, proteins, functional portions, functional variants, nucleic acids, expression vectors, host cells (including populations thereof), and antibodies (including antigen binding portions thereof) described herein, and a pharmaceutically acceptable carrier. The inventive pharmaceutical compositions containing any of the inventive TCR materials can comprise more than one inventive TCR material, e.g., a polypeptide and a nucleic acid, or two or more different TCRs (including functional portions and functional variants thereof). Alternatively, the pharmaceutical composition can comprise an inventive TCR material in combination with another pharmaceutically active agent(s) or drug(s), such as a chemotherapeutic agents, e.g., asparaginase, busulfan, carboplatin, cisplatin, daunorubicin, doxorubicin, fluorouracil, gemcitabine, hydroxyurea, methotrexate, paclitaxel, rituximab, vinblastine, vincristine, etc.

Preferably, the carrier is a pharmaceutically acceptable carrier. With respect to pharmaceutical compositions, the carrier can be any of those conventionally used for the particular inventive TCR material under consideration. Such pharmaceutically acceptable carriers are well-known to those skilled in the art and are readily available to the public. It is preferred that the pharmaceutically acceptable carrier be one which has no detrimental side effects or toxicity under the conditions of use.

The choice of carrier will be determined in part by the particular inventive TCR material, as well as by the particular method used to administer the inventive TCR material. Accordingly, there are a variety of suitable formulations of the pharmaceutical composition of the invention. Suitable formulations may include any of those for oral, parenteral, subcutaneous, intravenous, intramuscular, intraarterial, intrathecal, or interperitoneal administration. More than one route can be used to administer the inventive TCR materials, and in certain instances, a particular route can provide a more immediate and more effective response than another route.

Preferably, the inventive TCR material is administered by injection, e.g., intravenously. When the inventive TCR material is a host cell expressing the inventive TCR (or functional variant thereof), the pharmaceutically acceptable carrier for the cells for injection may include any isotonic carrier such as, for example, normal saline (about 0.90% w/v of NaCl in water, about 300 mOsm/L NaCl in water, or about 9.0 g NaCl per liter of water), NORMOSOL R electrolyte solution (Abbott, Chicago, IL), PLASMA-LYTE A (Baxter, Deerfield, IL), about 5% dextrose in water, or Ringer's lactate. In an embodiment, the pharmaceutically acceptable carrier is supplemented with human serum albumen.

For purposes of the invention, the amount or dose (e.g., numbers of cells when the inventive TCR material is one or more cells) of the inventive TCR material administered should be sufficient to effect, e.g., a therapeutic or prophylactic response, in the subject or animal over a reasonable time frame. For example, the dose of the inventive TCR material should be sufficient to bind to a cancer antigen, or detect, treat or prevent cancer in a period of from about 2 hours or longer, e.g., 12 to 24 or more hours, from the time of administration. In certain embodiments, the time period could be even longer. The dose will be determined by the efficacy of the particular inventive TCR material and the condition of the animal (e.g., human), as well as the body weight of the animal (e.g., human) to be treated.

Many assays for determining an administered dose are known in the art. For purposes of the invention, an assay, which comprises comparing the extent to which target cells are lysed or IFN-γ is secreted by T cells expressing the inventive TCR (or functional variant or functional portion thereof), polypeptide, or protein upon administration of a given dose of such T cells to a mammal among a set of mammals of which is each given a different dose of the T cells, could be used to determine a starting dose to be administered to a mammal. The extent to which target cells are lysed or IFN-γ is secreted upon administration of a certain dose can be assayed by methods known in the art.

The dose of the inventive TCR material also will be determined by the existence, nature and extent of any adverse side effects that might accompany the administration of a particular inventive TCR material. Typically, the attending physician will decide the dosage of the inventive TCR material with which to treat each individual patient, taking into consideration a variety of factors, such as age, body weight, general health, diet, sex, inventive TCR material to be administered, route of administration, and the severity of the condition being treated. In an embodiment in which the inventive TCR material is a population of cells, the number of cells administered per infusion may vary, e.g., from about $1 \times 10^6$ to about $1 \times 10^{12}$ cells or more. In certain embodiments, fewer than $1 \times 10^6$ cells may be administered.

One of ordinary skill in the art will readily appreciate that the inventive TCR materials of the invention can be modified in any number of ways, such that the therapeutic or prophylactic efficacy of the inventive TCR materials is increased through the modification. For instance, the inventive TCR materials can be conjugated either directly or indirectly through a bridge to a targeting moiety. The practice of conjugating compounds, e.g., inventive TCR materials, to targeting moieties is known in the art. See, for instance, Wadwa et al., *J Drug Targeting* 3: 111 (1995) and U.S. Pat. No. 5,087,616. The term "targeting moiety" as used herein, refers to any molecule or agent that specifically recognizes and binds to a cell-surface receptor, such that the targeting moiety directs the delivery of the inventive TCR materials to a population of cells on which surface the receptor is expressed. Targeting moieties include, but are not limited to, antibodies, or fragments thereof, peptides, hormones, growth factors, cytokines, and any other natural or non-natural ligands, which bind to cell surface receptors (e.g., Epithelial Growth Factor Receptor (EGFR), T cell receptor (TCR), B-cell receptor (BCR), CD28, Platelet-derived Growth Factor Receptor (PDGF), nicotinic acetylcholine receptor (nAChR), etc.). The term "bridge" as used herein, refers to any agent or molecule that links the inventive TCR materials to the targeting moiety. One of ordinary skill in the art recognizes that sites on the inventive TCR materials, which are not necessary for the function of the inventive TCR materials, are ideal sites for attaching a bridge and/or a targeting moiety, provided that the bridge and/or targeting moiety, once attached to the inventive TCR materials, do(es) not interfere with the function of the inventive TCR materials, i.e., the ability to bind to HPV 16 E7; or to detect, treat, or prevent cancer, HPV 16 infection, or HPV-positive premalignancy.

It is contemplated that the inventive pharmaceutical compositions, TCRs (including functional variants thereof), polypeptides, proteins, nucleic acids, recombinant expression vectors, host cells, or populations of cells can be used in methods of treating or preventing cancer, HPV 16 infection, or HPV-positive premalignancy. Without being bound to a particular theory, the inventive TCRs (and functional variants thereof) are believed to bind specifically to HPV 16 E7, such that the TCR (or related inventive polypeptide or protein and functional variants thereof), when expressed by a cell, is able to mediate an immune response against a target cell expressing HPV 16 E7. In this regard, the invention provides a method of treating or preventing a condition in a mammal, comprising administering to the mammal any of the pharmaceutical compositions, TCRs (and functional variants thereof), polypeptides, or proteins described herein, any nucleic acid or recombinant expression vector comprising a nucleotide sequence encoding any of the TCRs (and functional variants thereof), polypeptides, proteins described herein, or any host cell or population of cells comprising a recombinant vector which encodes any of the TCRs (and functional variants thereof), polypeptides, or proteins described herein, in an amount effective to treat or prevent the condition in the mammal, wherein the condition is cancer, HPV 16 infection, or HPV-positive premalignancy.

The terms "treat," and "prevent" as well as words stemming therefrom, as used herein, do not necessarily imply 100% or complete treatment or prevention. Rather, there are varying degrees of treatment or prevention of which one of ordinary skill in the art recognizes as having a potential benefit or therapeutic effect. In this respect, the inventive methods can provide any amount of any level of treatment or prevention of a condition in a mammal. Furthermore, the treatment or prevention provided by the inventive method can include treatment or prevention of one or more conditions or symptoms of the condition, e.g., cancer, being treated or prevented. For example, treatment or prevention can include promoting the regression of a tumor. Also, for purposes herein, "prevention" can encompass delaying the onset of the condition, or a symptom or condition thereof.

Also provided is a method of detecting the presence of a condition in a mammal. The method comprises (i) contacting a sample comprising one or more cells from the mammal with any of the inventive TCRs (and functional variants thereof), polypeptides, proteins, nucleic acids, recombinant expression vectors, host cells, populations of cells, antibodies, or antigen binding portions thereof, or pharmaceutical compositions described herein, thereby forming a complex, and detecting the complex, wherein detection of the complex is indicative of the presence of the condition in the mammal, wherein the condition is cancer, HPV 16 infection, or HPV-positive premalignancy.

With respect to the inventive method of detecting a condition in a mammal, the sample of cells can be a sample comprising whole cells, lysates thereof, or a fraction of the whole cell lysates, e.g., a nuclear or cytoplasmic fraction, a whole protein fraction, or a nucleic acid fraction.

For purposes of the inventive detecting method, the contacting can take place in vitro or in vivo with respect to the mammal. Preferably, the contacting is in vitro.

Also, detection of the complex can occur through any number of ways known in the art. For instance, the inventive TCRs (and functional variants thereof), polypeptides, proteins, nucleic acids, recombinant expression vectors, host cells, populations of cells, or antibodies, or antigen binding portions thereof, described herein, can be labeled with a detectable label such as, for instance, a radioisotope, a fluorophore (e.g., fluorescein isothiocyanate (FITC), phycoerythrin (PE)), an enzyme (e.g., alkaline phosphatase, horseradish peroxidase), and element particles (e.g., gold particles).

For purposes of the inventive methods, wherein host cells or populations of cells are administered, the cells can be cells that are allogeneic or autologous to the mammal. Preferably, the cells are autologous to the mammal.

With respect to the inventive methods, the cancer can be any cancer, including any of acute lymphocytic cancer, acute myeloid leukemia, alveolar rhabdomyosarcoma, bone cancer, brain cancer, breast cancer, cancer of the anus, anal canal, or anorectum, cancer of the eye, cancer of the intrahepatic bile duct, cancer of the joints, cancer of the neck, gallbladder, or pleura, cancer of the nose, nasal cavity, or middle ear, cancer of the oral cavity, cancer of the vagina, cancer of the vulva, chronic lymphocytic leukemia, chronic myeloid cancer, colon cancer, esophageal cancer, uterine cervical cancer, gastrointestinal carcinoid tumor, glioma, Hodgkin lymphoma, hypopharynx cancer, kidney cancer, larynx cancer, liver cancer, lung cancer, malignant mesothelioma, melanoma, multiple myeloma, nasopharynx cancer, non-Hodgkin lymphoma, cancer of the oropharynx, ovarian cancer, cancer of the penis, pancreatic cancer, peritoneum, omentum, and mesentery cancer, pharynx cancer, prostate cancer, rectal cancer, renal cancer, skin cancer, small intestine cancer, soft tissue cancer, stomach cancer, testicular cancer, thyroid cancer, cancer of the uterus, ureter cancer, and urinary bladder cancer. A preferred cancer is cancer is cancer of the uterine cervix, oropharynx, anus, anal canal, anorectum, vagina, vulva, or penis. A particularly preferred cancer is HPV 16-positive cancer. While the cancers most commonly associated with HPV 16 infection include cancer is cancer of the uterine cervix, oropharynx, anus, anal canal, anorectum, vagina, vulva, and penis, the inventive methods may be used to treat any HPV 16-positive cancer, including those that occur at other anatomical areas.

The mammal referred to in the inventive methods can be any mammal. As used herein, the term "mammal" refers to any mammal, including, but not limited to, mammals of the order Rodentia, such as mice and hamsters, and mammals of the order Logomorpha, such as rabbits. It is preferred that the mammals are from the order Carnivora, including Felines (cats) and Canines (dogs). It is more preferred that the mammals are from the order Artiodactyla, including Bovines (cows) and Swines (pigs) or of the order Perssodactyla, including Equines (horses). It is most preferred that the mammals are of the order Primates, Ceboids, or Simoids (monkeys) or of the order Anthropoids (humans and apes). An especially preferred mammal is the human.

The following examples further illustrate the invention but, of course, should not be construed as in any way limiting its scope.

Example 1

This example demonstrates the isolation of a human anti-HPV 16 E7 TCR from neoplasia.

Samples of lymphocytes from HPV 16-positive cervical intraepithelial neoplasia (CIN) II/III were obtained from fourteen patients. The patients had previously received various vaccines targeting HPV 16 E7. Numbers of cervix infiltrating lymphocytes (CIL) were expanded using the Rapid Expansion Protocol (REP) as previously described (Dudley et al. *J Immunother.* 26:332-42 (2003) and Riddell et al. *J Immunol. Methods* 128:189-201 (1990)). Briefly, TIL were cultured with irradiated (40 Gy) allogeneic peripheral blood mononuclear "feeder" cells in complete medium (CM) with 30 ng/mL anti-CD3 antibody and 6000 IU/mL IL-2. The expanded numbers of CIL were screened for HPV 16 E7 reactivity by measuring interferon (IFN)-γ secretion following co-culture with autologous dendritic cells (DCs) pulsed with gp100 peptide, a pool of 15-mer E6 peptides that overlap by 11 amino acid residues and which span the whole length of HPV 16 E6, a pool of 15-mer E7 peptides that overlap by 11 amino acid residues and which span the whole length of HPV 16 E7, or OKT3. The $CD8^+$ CIL of one patient (5048) were identified as having HPV 16 E7 reactivity. The patient 5048 was also found to express HLA-A*02:01.

A tetramer of HLA-A*02:01/$E7_{11-19}$ was used to determine the presence of T cells from patient 5048 targeting the epitope HPV 16 $E7_{11-19}$. Tetramer-binding cells were isolated using magnetic bead separation using anti-PE antibody and limiting dilution cloning was performed. T cells clones were screened for tetramer binding and a high-binding clone was identified.

The variable regions of the alpha and beta chains of the TCR of the clone that bound the HLA-A2/$E7_{11-19}$ tetramer was isolated and sequenced using 5' Rapid Amplification of cDNA Ends (RACE) polymerase chain reaction (PCR). A nucleotide sequence comprising cDNA encoding the variable region of a wild-type human α chain comprising SEQ ID NO: 9 was obtained from TRAV1-2*01/TRAJ7*01. A nucleotide sequence comprising cDNA encoding the variable region of a wild-type human β chain comprising SEQ ID NO: 11 was obtained from TRBV5-6*01/TRBJ2-1/TRBD2.

Example 2

This example demonstrates that peripheral blood T cells transduced to express a chimeric anti-HPV 16 E7 TCR comprising a human variable region and a mouse constant region displayed CD8-independent binding to HLA-A2/$E7_{11-19}$ tetramer and recognized HLA-A2$^+$ HPV-16$^+$ tumor lines.

An MSGV1 recombinant expression vector comprising nucleotide sequences encoding a chimeric anti-HPV 16 E7 TCR comprising a human variable region derived from the wild-type, human TCR of Example 1 and a mouse constant region was prepared as follows. The nucleotide sequences in the recombinant expression vector encoded the variable region of the α chain and the variable region of the β chain of the TCR of Example 1, with the exception that an alanine was substituted for the native glycine in the second position of the variable region of the β chain (the leader sequence) in order to provide a NcoI restriction site and Kozak sequence in the recombinant expression vector. Nucleotide sequences encoding a murine constant region of the α and β chains (SEQ ID NOs: 17 and 19, respectively) were inserted into the vector in place of the respective human constant regions to provide a nucleotide sequence encoding a chimeric TCR. A codon-optimized nucleotide sequence encoding a picomavirus 2A peptide (SEQ ID NO: 28) was positioned between the α and β chains. The nucleotide sequence encoding the chimeric α and β chains and linker were codon-optimized for expression in human tissues.

Peripheral blood cells were transduced with retrovirus from the MSGV1 recombinant expression vector encoding the chimeric TCR or a vector encoding a fully murine, anti-HPV 16 E7 TCR. Untransduced cells were used as a negative control. The transduced cells were labeled with anti-CD8 and anti-TRBC (mouse constant region) antibodies and tested for binding to HLA-A2/$E7_{11-19}$ tetramer by flow cytometry. Untransduced cells (both $CD8^+$ and $CD8^-$) and cells transduced to express a control mouse anti-HPV 16 E7 TCR that was identified in prior experiments (both $CD8^+$ and $CD8^-$) did not bind the tetramer. Both $CD8^+$ and $CD8^-$ cells transduced with the chimeric HPV-16 E7 TCR bound the tetramer. Accordingly, PBL transduced with the chimeric TCR bound HLA-A2/$E7_{11-19}$ tetramer in a CD8-independent manner. It was also observed that about 50% of the transduced T cells expressing the β chain of the chimeric TCR did not bind to tetramer.

In a separate experiment, peripheral blood lymphocytes (PBL) were transduced with the MSGV1 recombinant expression vector encoding the chimeric TCR with approximately 50% transduction efficiency. HLA-A2/$E7_{11-19}$ tetramer binding was measured by fluorescence-activated cell sorting (FACS), and 25% of the cells were found to bind tetramer on day 8 after stimulation. Transduced cells were co-cultured with target 293-A2 cells pulsed with HPV 16 $E6_{29-38}$ peptide (control), 293-A2 cells pulsed with HPV 16 $E7_{11-19}$ peptide, 624 cells transduced with a plasmid encoding HPV 16 E6, 624 cells transduced with a plasmid encoding HPV 16 E7, SCC152 cells, SCC90 cells, CaSki cells, Alb cells, Panc1 cells, or SiHa cells 10 days after stimulation. Untransduced cells were used as a control. IFN-γ was measured. The results are shown in FIG. 1. As shown in FIG. 1, PBL transduced with the MSGV1 recombinant expression vector encoding the chimeric TCR specifically recognized HPV 16 E7-positive tumor cell lines and other HLA-A2$^+$HPV16 E7$^+$ targets in an HLA-A2-restricted manner. Results obtained with the cells of a second donor were similar.

Example 3

This example demonstrates a method of making a chimeric anti-HPV 16 E7 TCR comprising a human variable region and a mouse constant region, wherein three native amino acid residues in the transmembrane (TM) region of the constant region of the α chain of the TCR are each substituted with a hydrophobic amino acid residue.

A nucleotide sequence encoding a chimeric TCR comprising a human variable region and a mouse constant region, wherein three native amino acid residues in the transmembrane (TM) region of the constant region of the α chain of the TCR are each substituted with a hydrophobic amino acid residue, was prepared as follows. The nucleotide sequences encoding the α and β chains of the chimeric TCR of Example 2 were cloned into a single nucleotide sequence with the nucleotide sequence encoding the β chain positioned 5' of the nucleotide sequence encoding the alpha chain and a nucleotide sequence encoding a picornavirus 2A peptide (SEQ ID NO: 28) positioned between the α and β chains. With reference to the wild-type α chain mouse constant region SEQ ID NO: 17, three native amino acid residues in the TM region of the α chain (namely, the Ser, Met, and Gly at positions 112, 114, and 115, respectively, were substituted with a Leu, Ile, and Val, respectively. The combined nucleotide sequence was codon-optimized for expression in human tissues to provide a vector insert (SEQ ID NO: 39). The vector insert was cloned into an MSGV1 expression vector resulting in SEQ ID NO: 37. The TCR encoded by the vector comprised an α chain comprising an amino acid sequence comprising SEQ ID NO: 22 and a β chain comprising an amino acid sequence comprising SEQ ID NO: 20 ("LVL-modified TCR" or "LVL TCR").

Example 4

This example demonstrates a method of making chimeric anti-HPV 16 E7 TCRs comprising a human variable region and a mouse constant region, wherein a native amino acid residue in the β and α chains are each substituted with a cysteine residue.

The TCR of Example 2 was modified to include a Cys substitution in the constant region of each of the α and β chains as follows. The nucleotide sequence encoding the constant region of the α chain of the TCR of Example 2 (amino acid SEQ ID NO: 17) was modified to substitute the native Thr at position 48 with Cys. The nucleotide sequence encoding the constant region of the β chain of the TCR of Example 2 (SEQ ID NO: 19) was modified to substitute the native Ser at position 56 with Cys. The nucleotide sequences encoding the α and β chains were cloned into a single nucleotide sequence with the nucleotide sequence encoding the β chain positioned 5' of the nucleotide sequence encoding the α chain and a nucleotide sequence encoding a picornavirus 2A peptide (SEQ ID NO: 28) positioned between the α and β chains. The combined nucleotide sequence was codon-optimized for expression in human tissues to provide a vector insert. The vector insert was cloned into an MSGV1 expression vector. The TCR encoded by the vector comprised an α chain comprising an amino acid sequence comprising SEQ ID NOs: 9 and 24 and a β chain comprising an amino acid sequence comprising SEQ ID NO: 27 ("Cys-modified TCR" or "Cys TCR").

The TCR of Example 3 (LVL-modified TCR) was further modified to include a Cys substitution in the constant region of each of the α and β chains as follows. The nucleotide sequence encoding the constant region of the α chain of the LVL-modified TCR of Example 3 (amino acid SEQ ID NO: 21) was modified to substitute the native Thr at position 48 with Cys. The nucleotide sequence encoding the constant region of the β chain of the LVL-modified TCR of Example 3 (SEQ ID NO: 19) was modified to substitute the native Ser at position 56 with Cys. The nucleotide sequences encoding the α and β chains were cloned into a single nucleotide sequence with the nucleotide sequence encoding the β chain positioned 5' of the nucleotide sequence encoding the α chain and a nucleotide sequence encoding a picornavirus 2A peptide (SEQ ID NO: 28) positioned between the α and β chains. The combined nucleotide sequence was codon-optimized for expression in human tissues to provide a vector insert (SEQ ID NO: 40). The vector insert was cloned into an MSGV1 expression vector resulting in SEQ ID NO: 38. The TCR encoded by the vector comprised an α chain comprising an amino acid sequence comprising SEQ ID NO: 26 and a β chain comprising an amino acid sequence comprising SEQ ID NO: 27 ("LVL-Cys-modified TCR" or "LVL-Cys TCR").

Example 5

This example demonstrates that modification of the recombinant expression vector encoding the chimeric anti-HPV 16 E7 TCR of Example 2 improved HPV 16 $E7_{11-19}$ tetramer binding and improved recognition of HPV 16+ tumor cell lines.

PBL from two donors were transduced with one of the recombinant expression vectors set forth in Table 1.

TABLE 1

| TCR | amino acid SEQ ID NOs of TCR | Position of α and β chain in vector |
| --- | --- | --- |
| chimeric anti-HPV 16 E7 TCR (Example 2) | 9, 10, 17, and 19, wherein X at position 2 of SEQ ID NO: 10 is Ala | alpha chain is positioned 5' of beta chain ("α/β") |
| Cys-modified TCR | 9, 24, 27 | α/β |
| LVL-modified TCR | 20, 22 | α/β |
| LVL-Cys-modified TCR | 26, 27 | α/β |
| chimeric anti-HPV 16 E7 TCR (Example 2) | 9, 10, 17, and 19, wherein X at position 2 of SEQ ID NO: 10 is Ala | beta chain is positioned 5' of alpha chain ("β/α") |
| Cys-modified TCR | 9, 24, 27 | β/α |
| LVL-modified TCR | 20, 22 | β/α |
| LVL-Cys-modified TCR | 26, 27 | β/α |

Transduced PBL from two normal donors were tested for HPV 16 $E7_{11-19}$ tetramer binding by flow cytometry using anti-HPV 16 $E7_{11-19}$ tetramer and anti-mouse(m)TRBC antibodies on day 8 after stimulation. Untransduced cells were used as a negative control. The results are shown in FIGS. 2A-2R. The percentage of stained cells detected in each quadrant is given above each graph. As shown in FIGS. 2A-2R, cells transduced with a recombinant expression vector in which the β chain was positioned 5' of the α chain demonstrated improved tetramer binding as compared to cells transduced with a recombinant expression vector in which the α chain was positioned 5' of the β chain. As also shown in FIGS. 2A-2R, cells transduced with a Cys-modified TCR, a LVL-modified TCR, or a LVL-Cys-modified TCR each demonstrated improved tetramer binding as compared to cells transduced with the TCR of Example 2.

Figure 3A:
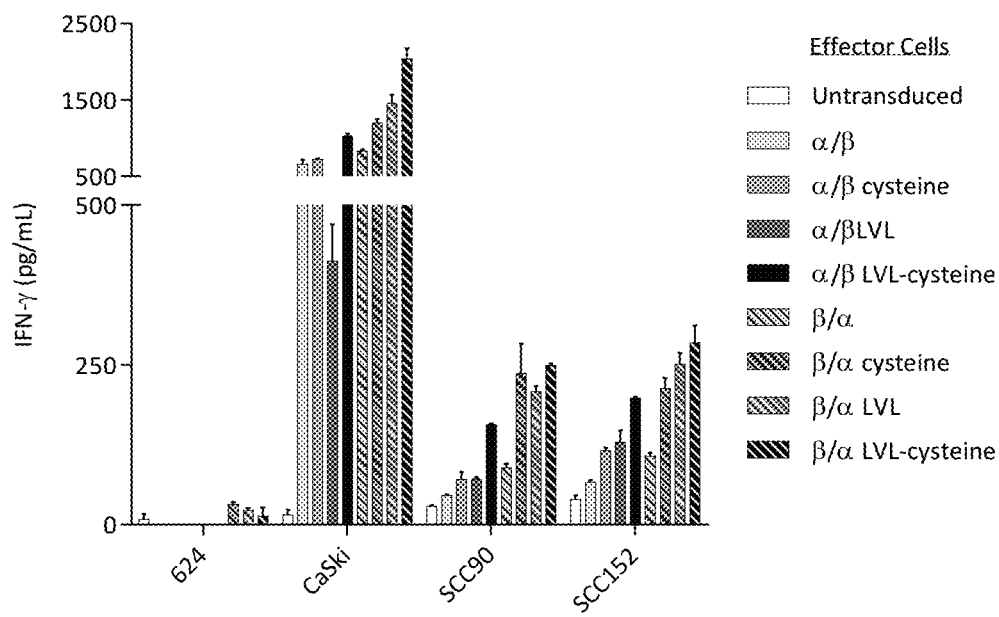
FIGS. 3A and 3B are graphs showing IFN-γ secretion by effector cells from Donor 1 (A) or Donor 2 (B) that were transduced with one of the recombinant expression vectors set forth in Table 1 upon co-culture with target 624, CaSki, SCC90, or SCC152 cells. For each target cell line, the shaded bars (from left to right) correspond to effector cells transduced with the following vector: chimeric anti-HPV 16 E7 TCR (α/β), Cys-modified TCR (α/β), LVL-modified TCR (α/β), LVL-Cys-modified TCR (α/β), chimeric anti-HPV 16 E7 TCR (β/α), Cys-modified TCR (β/α), LVL-modified TCR (β/α), or LVL-Cys-modified TCR (β/α). Untransduced cells (unshaded bars) were used as a negative control.
Figure 3B:
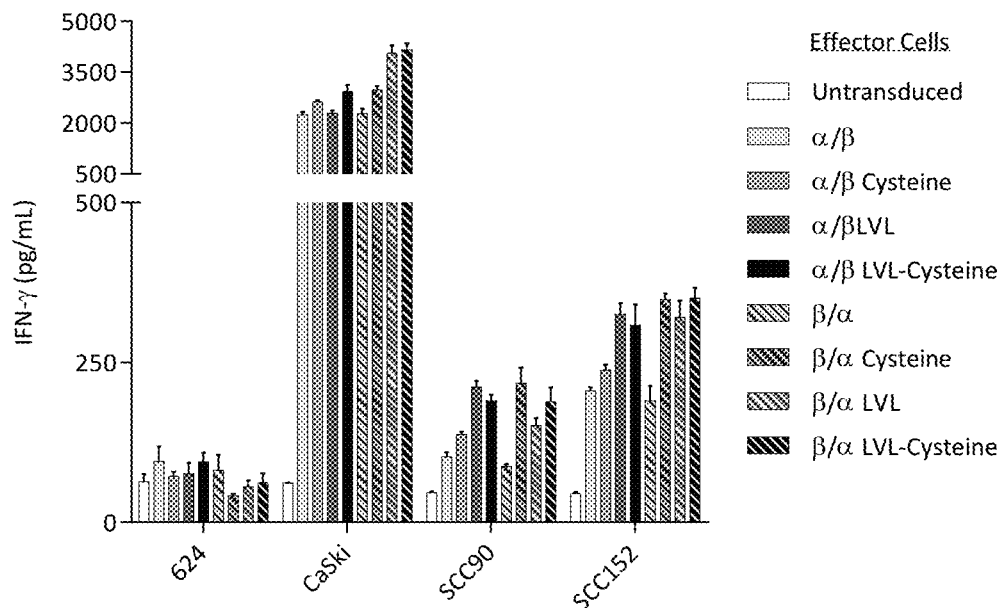

In a separate experiment, transduced cells were co-cultured with 624 cells, CaSki cells, Scc90 cells, or Scc152 cells 11 days after stimulation, and IFN-γ secretion was measured. Untransduced cells were used as a negative control. The results are shown in FIGS. 3A and 3B. As shown in FIGS. 3A and 3B, cells transduced with a Cys-modified TCR, a LVL-modified TCR, or a LVL-Cys-modified TCR each demonstrated improved recognition of HPV 16+ tumor lines as compared to cells transduced with the TCR of Example 2. As also shown in FIGS. 3A-3B, cells transduced with a recombinant expression vector in which the β chain was positioned 5' of the α chain generally demonstrated improved recognition of HPV 16+ tumor lines as compared to cells transduced with a recombinant expression vector in which the α chain was positioned 5' of the β chain.

Cells transduced with a recombinant expression vector in which the β chain was positioned 5' of the α chain also demonstrated improved expression as compared to cells transduced with a recombinant expression vector in which the α chain was positioned 5' of the β chain, as measured by flow cytometry.

Example 6

This example demonstrates that T cells transduced with a recombinant expression vector encoding the LVL-Cys-modified TCR (β/α) demonstrated CD8-independent binding of HPV-16 E7$_{11-19}$ tetramer.

Peripheral blood cells were transduced with the MSGV1 recombinant expression vector encoding the LVL-Cys-modified TCR (β/α) of Example 4. The transduced cells were labeled with anti-CD8, anti-TRBC (mouse constant region) antibodies, and HLA-A2/E7$_{11-19}$ tetramer and analyzed by flow cytometry. The CD8+ transduced cells and the CD8-transduced cells from both donors both bound the tetramer, which demonstrated CD8-independent binding.

Example 7

This example demonstrates that peripheral blood T cells transduced to express the LVL-modified TCR (β/α) specifically recognize HPV 16 E7$_{11-19}$ peptide and HPV 16+ tumor cell lines.

Figure 4:
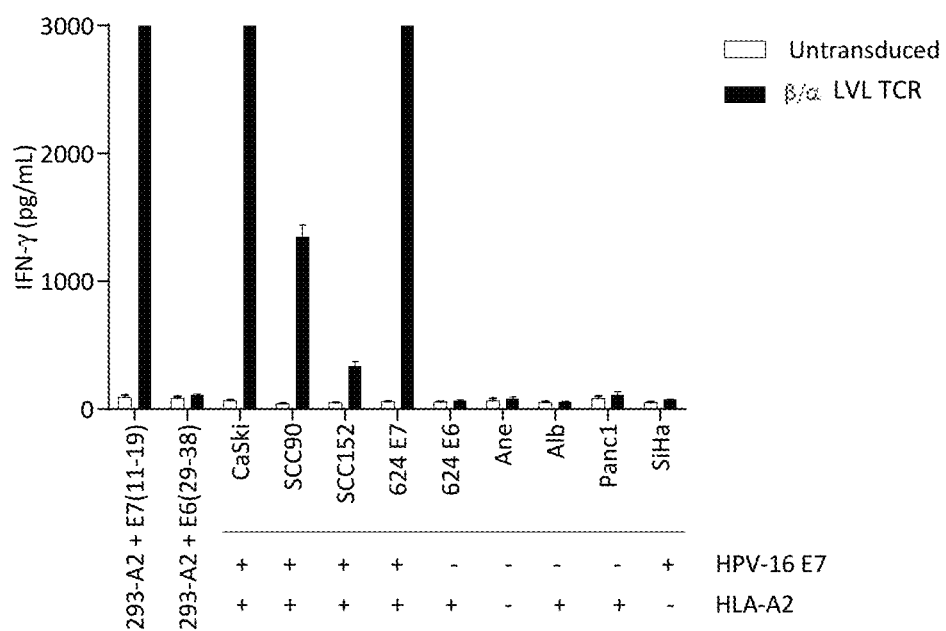
FIG. 4 is a graph showing IFN-γ (pg/mL) secreted by PBL that were transduced with a retroviral vector encoding the LVL-modified TCR (β/α) (SEQ ID NO: 37) (shaded bars) upon co-culture with target 293-A2 cells pulsed with HPV 16 E6$_{29-38}$ peptide, 293-A2 cells pulsed with HPV 16 E7$_{11-19}$ peptide, 624 cells transduced with a plasmid encoding HPV 16 E6, 624 cells transduced with a plasmid encoding HPV 16 E7, SCC152 cells, SCC90 cells, CaSki cells, Ane cells, Alb cells, Panc1 cells, or SiHa cells. HLA-A2 and HPV-16 E7 expression by each target cell is indicated in the bottom of FIG. 4 ("+" indicates positive for expression and "−" indicates negative for expression). Untransduced cells (unshaded bars) were used as a negative control.

PBL were transduced with a recombinant expression vector encoding the LVL-modified TCR (β/α) (SEQ ID NO: 37) of Example 3. Rapid expansion of the numbers of cells was performed using the Rapid Expansion Protocol (REP) as previously described (Dudley et al. *J Immunother.* 26:332-42 (2003) and Riddell et al. *J Immunol. Methods* 128:189-201 (1990)). Briefly, TIL were cultured with irradiated (40 Gy) allogeneic peripheral blood mononuclear "feeder" cells in complete medium (CM) with 30 ng/mL anti-CD3 antibody and 6000 IU/mL IL-2. The expanded, transduced cells were co-cultured with target 293-A2 cells pulsed with HPV 16 E6$_{29-38}$ peptide (control), 293-A2 cells pulsed with HPV 16 E7$_{11-19}$ peptide, 624 cells transduced with a plasmid encoding HPV 16 E6, 624 cells transduced with a plasmid encoding HPV 16 E7, SCC152 cells, SCC90 cells, CaSki cells, Alb cells, Panc1 cells, Ane cells or SiHa cells. IFN-γ was measured. The results are shown in FIG. 4. As shown in FIG. 4, PBL transduced with a recombinant expression vector encoding the LVL-modified TCR (β/α) specifically recognized HPV 16 E7-positive tumor cell lines and other HLA-A2+HPV16 E7+ targets in an HLA-A2-restricted manner. Results obtained with the cells of a second donor were similar.

Example 8

This example demonstrates that peripheral blood T cells transduced to express the LVL-Cys-modified TCR (β/α) specifically recognize HPV 16+ tumor cell lines and that this recognition is blocked by anti-MHC Class I antibodies. This example also demonstrates these transduced T cells specifically kill HPV 16+ HLA-A2+ tumor cell lines.

Figure 5:
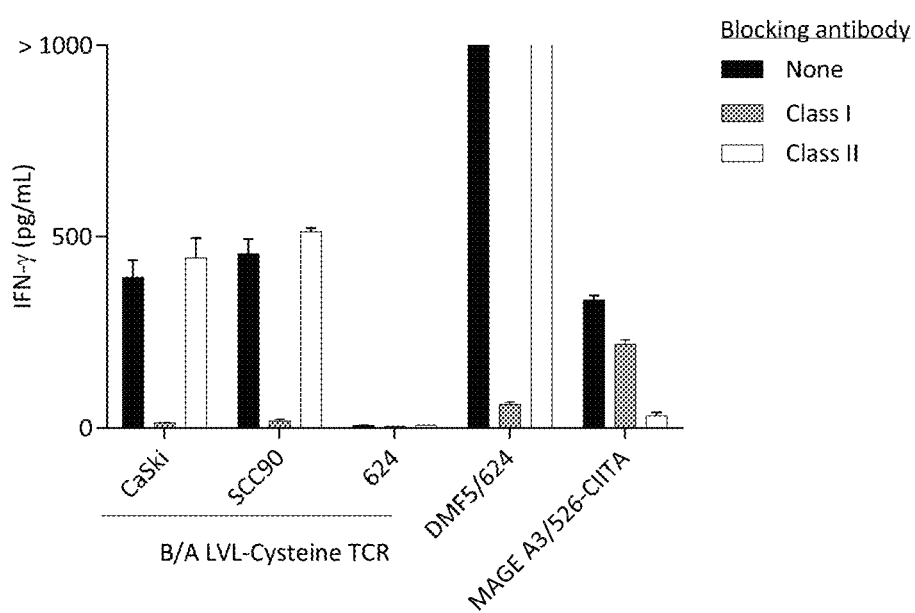
FIG. 5 is a graph showing IFN-γ (pg/mL) secreted by PBL that were transduced with a retroviral vector encoding the LVL-Cys-modified TCR (β/α) (SEQ ID NO: 38) upon co-culture with target 624 cells, SCC90 cells, or CaSki cells without antibodies (black bars) or in the presence of anti-MHC Class I (grey bars) or anti-MHC Class II antibodies (unshaded bars). As controls, PBL were transduced with DMF5 TCR and co-cultured with 624 cells or transduced with anti-MAGE A3 TCR and co-cultured with 526-CIITA cells without antibodies or in the presence of anti-MHC Class I or anti-MHC Class II antibodies.
Figures 6A, 6B, 6C, 6D:
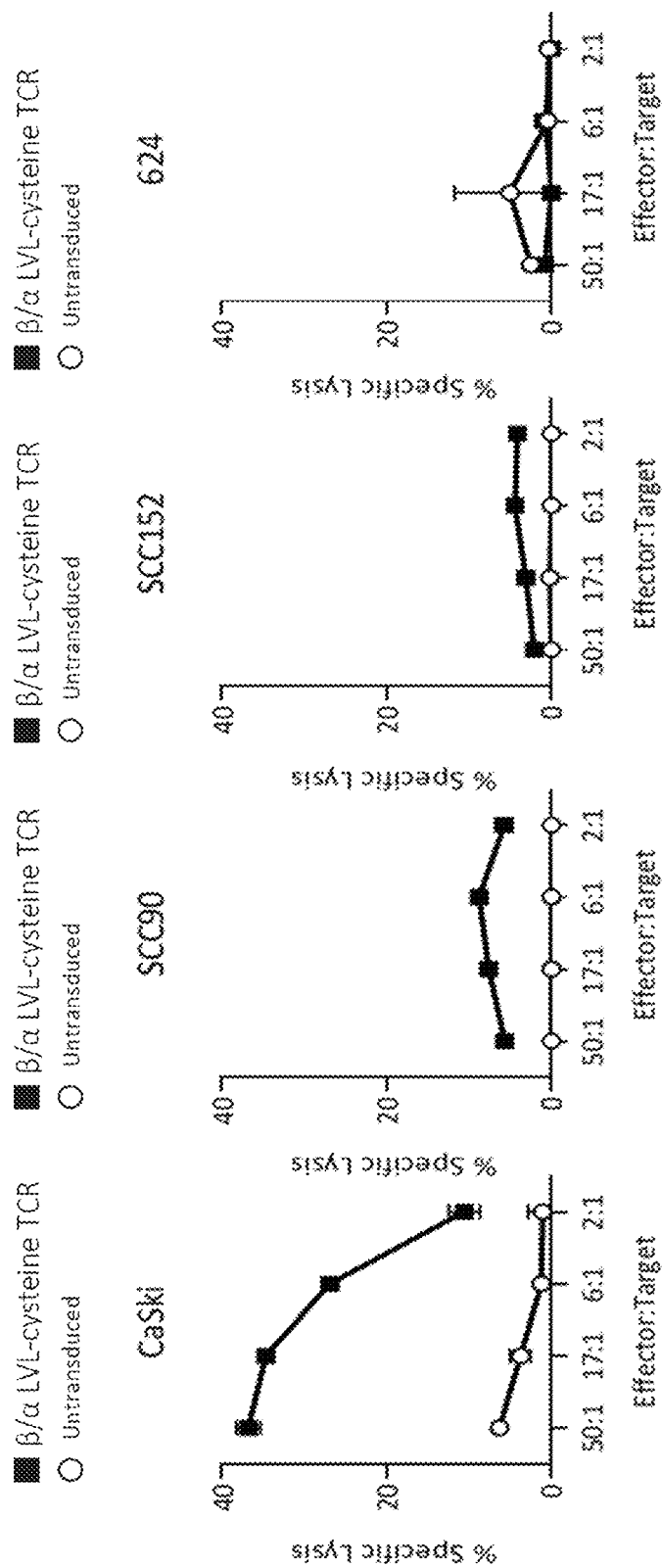
FIGS. 6A-6D are graphs showing specific lysis (%) of target cells CaSki (A), SCC90 (B), SCC152 (C), or 624 cells (D) co-cultured with effector cells transduced with a retroviral vector encoding the LVL-Cys-modified TCR (β/α) (SEQ ID NO: 38) (squares) at various effector:target ratios. Untransduced cells (circles) were used as a negative control.

PBL were transduced with a recombinant expression vector encoding the LVL-Cys-modified TCR (β/α) (SEQ ID NO: 38). Rapid expansion of the numbers of cells was performed using REP as described in Example 7. Transduced cells were co-cultured with target 624 cells, SCC90 cells, or CaSki cells without antibodies (black bars) or in the presence of anti-MHC Class I (grey bars) or anti-MHC Class II antibodies (unshaded bars). As controls, PBL were transduced with DMF5 TCR and co-cultured with 624 cells or transduced with anti-MAGE A3 TCR and co-cultured with 526-CIITA cells without antibodies or in the presence of anti-MHC Class I or anti-MHC Class II antibodies. IFN-γ was measured. The results are shown in FIG. 5. As shown in FIG. 5, peripheral blood T cells transduced to express the LVL-Cys-modified TCR (β/α) specifically recognized HPV 16+ tumor cell lines and this recognition was blocked by anti-MHC Class I antibodies.

In a separate experiment, transduced effector cells were co-cultured with target CaSki cells, SCC90 cells, SCC152 cells, or 624 cells at various effector:target ratios. Untransduced effector cells were used as a negative control. The results are shown in FIGS. 6A-6D. As shown in FIGS. 6A-6D, PBL transduced with a recombinant expression vector encoding the LVL-Cys-modified TCR (β/α) (SEQ ID NO: 38) demonstrated specific killing of HPV 16+ HLA-A2+ tumor lines.

Example 9

This example demonstrates that peripheral blood T cells transduced to express the LVL-Cys-modified TCR (β/α) have functional avidity similar to the anti-HPV 16 E6 TCR DCA2E6. This example also demonstrates that peripheral blood T cells transduced to express the LVL-Cys-modified TCR (β/α) demonstrated greater IFN-γ production upon co-culture with CaSki and SCC152 cells but not SCC90 cells as compared to cells transduced with the DCA2E6 TCR.

Figure 7A:
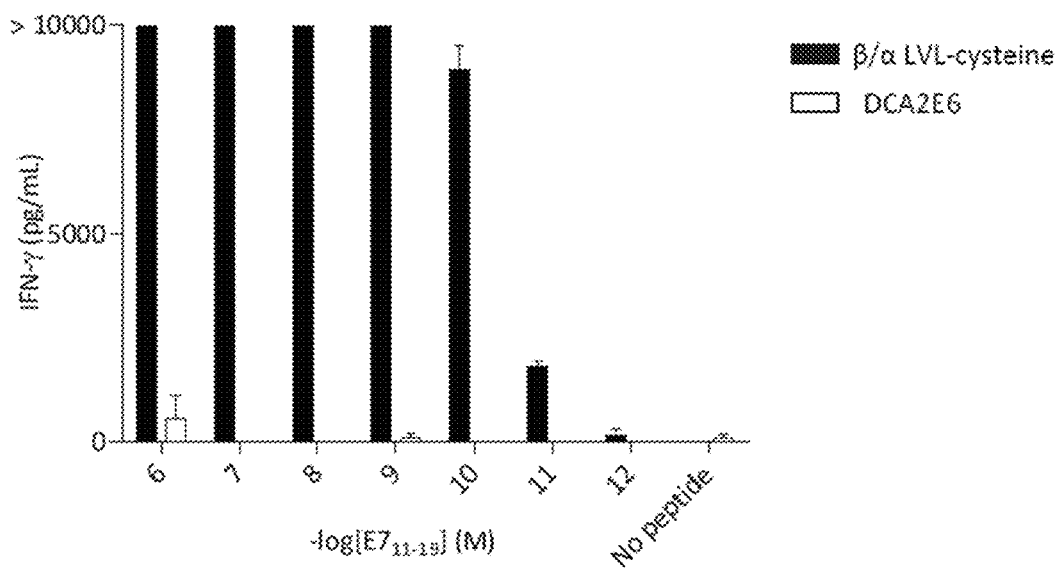
FIGS. 7A and 7B are graphs showing IFN-γ (pg/mL) secreted by PBL that were transduced with a retroviral vector encoding the LVL-Cys-modified TCR (β/α) (SEQ ID NO: 38) (shaded bars) or the anti-HPV 16 E6 TCR DCA2E6 (unshaded bars) upon co-culture with target cells pulsed with various concentrations of HPV 16 E7$_{11-19}$ peptide (A) or HPV 16 E6$_{29}$-38 peptide (B).
Figure 7B:
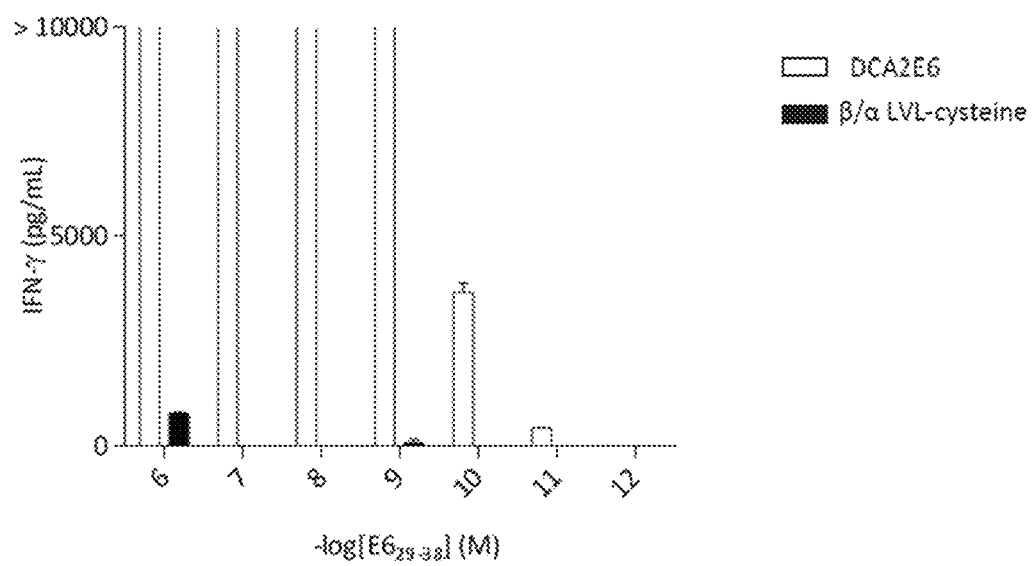

PBL were transduced with a recombinant expression vector encoding the LVL-Cys-modified TCR (β/α) (SEQ ID NO: 38) or DCA2E6. Transduced cells were co-cultured with T2 cells pulsed with no peptide or concentrations of HPV 16 E7$_{11-19}$ peptide or HPV 16 E6$_{29-38}$ peptide ranging from 1 μM to 1 pM. IFN-γ was measured. The results are shown in FIGS. 7A and 7B. As shown in FIGS. 7A and 7B, PBL transduced to express the LVL-Cys-modified TCR (β/α) have functional avidity similar to the anti-HPV 16 E6 TCR DCA2E6. Results obtained with the cells from a second donor were similar.

Figure 8A:
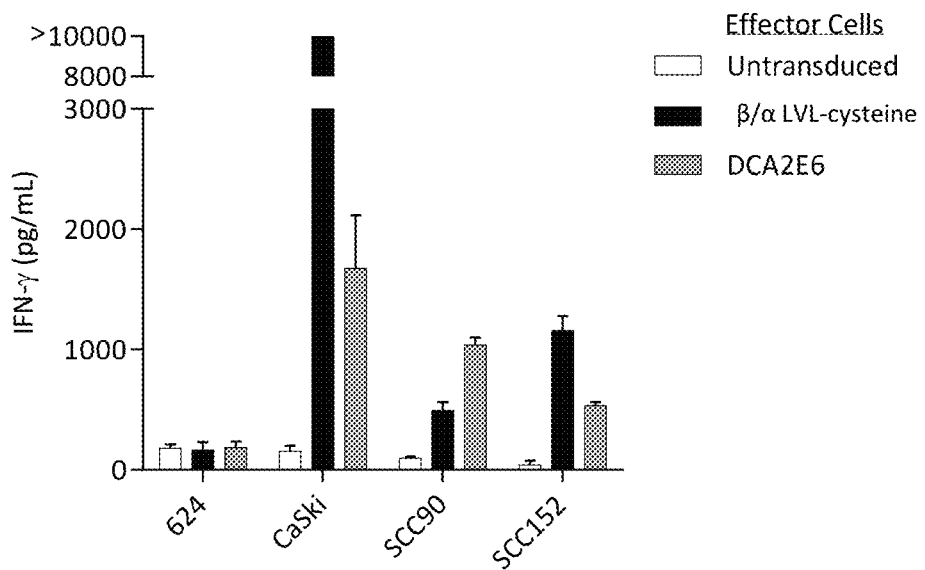
FIG. 8A is a graph showing IFN-γ (pg/mL) secreted by PBL that were transduced with a retroviral vector encoding the LVL-Cys-modified TCR (β/α) (SEQ ID NO: 38) (black bars) or the DCA2E6 TCR (grey bars) upon co-culture with target 624 cells, Caski cells, SCC90 cells, or SCC152 cells. Untransduced cells (unshaded bars) were used as a negative control.

In a separate experiment, PBL were transduced to express the LVL-Cys-modified TCR (β/α) (SEQ ID NO: 38) or DCA2E6. Untransduced cells were used as a negative control. Cells were co-cultured with target 624 cells, Caski cells, SCC90 cells, or SCC152 cells. IFN-γ was measured. The results are shown in FIG. 8A. As shown in FIG. 8A, peripheral blood T cells transduced to express the LVL-Cys-modified TCR (β/α) demonstrated greater IFN-γ production upon co-culture with CaSki and SCC152 cells but not SCC90 cells as compared to cells transduced with the DCA2E6 TCR.

Figure 8B:
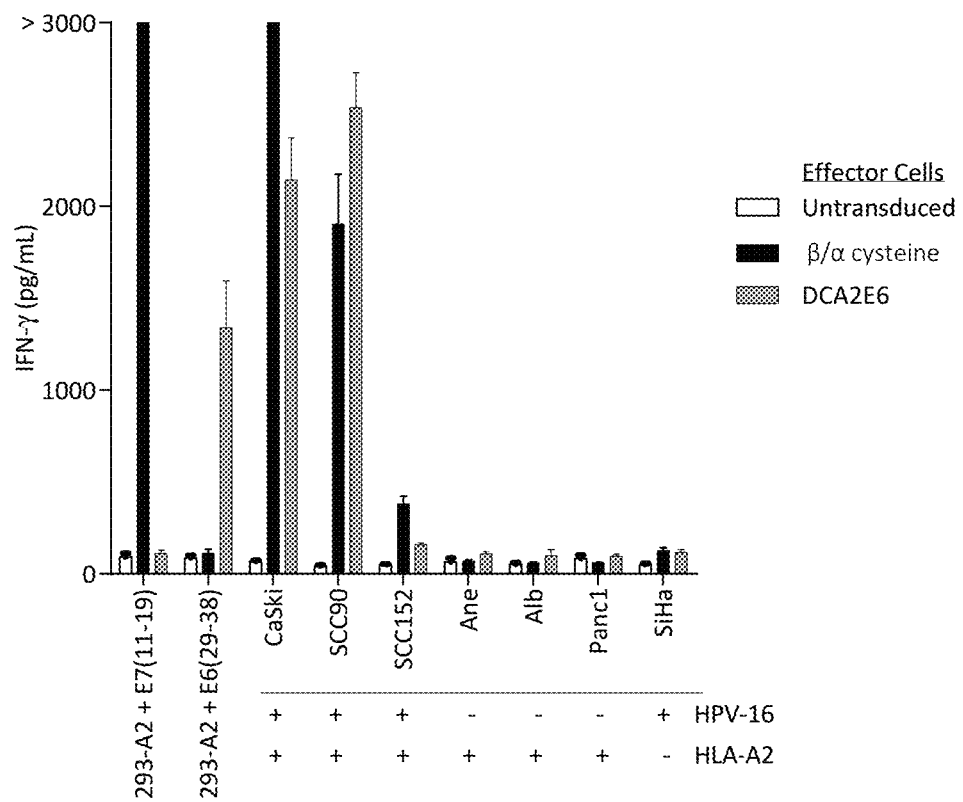
FIG. 8B is a graph showing IFN-γ (pg/mL) secreted by PBL that were transduced with a retroviral vector encoding the Cys-modified TCR (β/α) (black bars) or the DCA2E6 TCR (grey bars) upon co-culture with target 293-A2 cells pulsed with HPV 16 E6$_{29-38}$ peptide, 293-A2 cells pulsed with HPV 16 E7$_{11-19}$ peptide, SCC152 cells, SCC90 cells, CaSki cells, Ane cells, Alb cells, Panc1 cells, or SiHa cells. Untransduced cells (unshaded bars) were used as a negative control.

In a separate experiment, PBL were transduced to express the Cys-modified TCR (β/α) (SEQ ID NOs: 9, 24, and 27) or DCA2E6. Untransduced cells were used as a negative control. Cells were co-cultured with target 293-A2 cells pulsed with HPV 16 E6$_{29-38}$ peptide (control), 293-A2 cells pulsed with HPV 16 E7$_{11-19}$ peptide, SCC152 cells, SCC90 cells, CaSki cells, Alb cells, Ane cells, Panc1 cells, or SiHa cells. IFN-γ was measured. The results are shown in FIG. 8B. As shown in FIG. 8B, peripheral blood T cells transduced to express the Cys-modified TCR (β/α) demonstrated greater IFN-γ production upon co-culture with CaSki and SCC152 cells but not SCC90 cells as compared to cells transduced with the DCA2E6 TCR.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method of producing an engineered population of human peripheral blood lymphocytes (PBLs), the method comprising:

introducing a recombinant expression vector to an isolated population of human PBLs, wherein the recombinant expression vector comprises a nucleotide sequence encoding a T cell receptor (TCR) comprising an alpha chain complementarity determining region (CDR) 1 amino acid sequence of SEQ ID NO: 3, an alpha chain CDR2 amino acid sequence of SEQ ID NO: 4, an alpha chain CDR3 amino acid sequence of SEQ ID NO: 5, a beta chain CDR1 amino acid sequence of SEQ ID NO: 6, a beta chain CDR2 amino acid sequence of SEQ ID NO: 7, and a beta chain CDR3 amino acid sequence of SEQ ID NO: 8, and wherein the TCR has antigenic specificity for human papillomavirus (HPV) 16 $E7_{11\text{-}19}$.

2. The method of claim 1, wherein the TCR comprises the amino acid sequences of:
   (a) SEQ ID NO: 9 and
   (b) SEQ ID NO: 10, wherein X at position 2 is Ala or Gly.

3. The method of claim 1, wherein the TCR further comprises the amino acid sequences of:
   (a) SEQ ID NO: 16, wherein
      (i) X at position 48 is Thr or Cys;
      (ii) X at position 112 is Ser, Gly, Ala, Val, Leu, Ile, Pro, Phe, Met, or Trp;
      (iii) X at position 114 is Met, Gly, Ala, Val, Leu, Ile, Pro, Phe, Met, or Trp; and
      (iv) X at position 115 is Gly, Ala, Val, Leu, Ile, Pro, Phe, Met, or Trp; and
   (b) SEQ ID NO: 18, wherein X at position 56 is Ser or Cys.

4. The method of claim 1, wherein the TCR further comprises the amino acid sequences of:
   (a) any one of SEQ ID NOs: 14, 17, 21, 24, and 25; and
   (b) any one of SEQ ID NOs: 15, 19, and 23.

5. The method of claim 1, wherein the TCR comprises the amino acid sequences of:
   (a) (i) SEQ ID NO: 12, (ii) SEQ ID NO: 22, (iii) SEQ ID NO: 26, (iv) SEQ ID NO: 9 and 24, (v) SEQ ID NO: 9 and 16, or (vi) SEQ ID NOs: 9 and 17; and
   (b) (i) SEQ ID NOs: 10 and 18 or (ii) any one of SEQ ID NOs: 13, 20, and 27.

6. The method of claim 1, wherein the TCR comprises a human variable region and a murine constant region.

7. The method of claim 1, wherein the isolated population of human PBLs is an isolated population of human CD8$^+$ T cells.

8. The method of claim 1, wherein the recombinant expression vector is a viral vector.

9. The method of claim 1, wherein the recombinant expression vector is a retroviral vector.

10. A method of producing an engineered population of human cells, the method comprising:
   introducing a recombinant expression vector to an isolated population of human cells, wherein the recombinant expression vector comprises a nucleotide sequence encoding a polypeptide comprising a functional portion of a TCR, and wherein the functional portion has antigenic specificity for human papillomavirus (HPV) 16 E7$_{11-19}$ and comprises an alpha chain complementarity determining region (CDR) 1 amino acid sequence of SEQ ID NO: 3, an alpha chain CDR2 amino acid sequence of SEQ ID NO: 4, an alpha chain CDR3 amino acid sequence of SEQ ID NO: 5, a beta chain CDR1 amino acid sequence of SEQ ID NO: 6, a beta chain CDR2 amino acid sequence of SEQ ID NO: 7, and a beta chain CDR3 amino acid sequence of SEQ ID NO: 8.

11. The method of claim 10, wherein the functional portion comprises the amino acid sequence of:
   (a) SEQ ID NO: 9;
   (b) SEQ ID NO: 10;
   (c) SEQ ID NOs: 9 and 10;
   (d) (i) SEQ ID NOs: 9 and 24; (ii) SEQ ID NOs: 9 and 17; (iii) SEQ ID NO: 9 and 16; (iv) SEQ ID NO: 10 and 18; or (v) any one of SEQ ID NOs: 12, 13, 20, 22, 26, 27, 29 and 30;
   (e) SEQ ID NOs: 12 and 13;
   (f) SEQ ID NOs: 20 and 22;
   (g) SEQ ID NOs: 26 and 27;
   (h) SEQ ID NOs: 9, 24, and 27;
   (i) SEQ ID NOs: 9, 17, and 20; or
   (j) SEQ ID NOs: 9, 10, 16, and 18.

12. The method of claim 10, wherein the functional portion further comprises the amino acid sequences of:
   (a) SEQ ID NO: 16, wherein
      (i) X at position 48 is Thr or Cys;
      (ii) X at position 112 is Ser, Gly, Ala, Val, Leu, Ile, Pro, Phe, Met, or Trp;
      (iii) X at position 114 is Met, Gly, Ala, Val, Leu, Ile, Pro, Phe, Met, or Trp; and
      (iv) X at position 115 is Gly, Ala, Val, Leu, Ile, Pro, Phe, Met, or Trp; and
   (b) SEQ ID NO: 18, wherein X at position 56 is Ser or Cys.

13. The method of claim 10, wherein the functional portion further comprises the amino acid sequences of:
   (a) any one of SEQ ID NOs: 14, 17, 21, 24, and 25; and
   (b) any one of SEQ ID NOs: 15, 19, and 23.

14. The method of claim 10, wherein the recombinant expression vector is a viral vector.

15. The method of claim 10, wherein the recombinant expression vector is a retroviral vector.

16. A method of producing an engineered population of human cells, the method comprising:
   introducing a recombinant expression vector to an isolated population of human cells, wherein the recombinant expression vector comprises a nucleotide sequence encoding a protein having antigenic specificity for human papillomavirus (HPV) 16 E7$_{11-19}$ and comprising a first polypeptide chain comprising an alpha chain complementarity determining region (CDR) 1 amino acid sequence of SEQ ID NO: 3, an alpha chain CDR2 amino acid sequence of SEQ ID NO: 4, and an alpha chain CDR3 amino acid sequence of SEQ ID NO: 5 and a second polypeptide chain comprising a beta chain CDR1 amino acid sequence of SEQ ID NO: 6, a beta chain CDR2 amino acid sequence of SEQ ID NO: 7, and a beta chain CDR3 amino acid sequence of SEQ ID NO: 8.

17. The method of claim 16, wherein:
   the first polypeptide chain comprises the amino acid sequence of SEQ ID NO: 9 and
   the second polypeptide chain comprises the amino acid sequence of SEQ ID NO: 10, wherein X at position 2 of SEQ ID NO: 10 is Ala or Gly.

18. The method of claim 16, wherein:
   the first polypeptide chain further comprises the amino acid sequence of SEQ ID NO: 16, wherein:
      (i) X at position 48 is Thr or Cys;
      (ii) X at position 112 is Ser, Gly, Ala, Val, Leu, Ile, Pro, Phe, Met, or Trp;
      (iii) X at position 114 is Met, Gly, Ala, Val, Leu, Ile, Pro, Phe, Met, or Trp; and
      (iv) X at position 115 is Gly, Ala, Val, Leu, Ile, Pro, Phe, Met, or Trp; and
   the second polypeptide chain further comprises the amino acid sequence of SEQ ID NO: 18, wherein X at position 56 is Ser or Cys.

19. The method of claim 16, wherein:
   the first polypeptide chain further comprises the amino acid sequence of any one of SEQ ID NOs: 14, 17, 21, 24, and 25; and
   the first polypeptide chain further comprises the amino acid sequence of any one of any one of SEQ ID NOs: 15, 19, and 23.

20. The method of claim 16, wherein:
   the first polypeptide chain comprises the amino acid sequence of (i) SEQ ID NO: 12, (ii) SEQ ID NO: 22, (iii) SEQ ID NO: 26, (iv) SEQ ID NO: 9 and 16, (v) SEQ ID NO: 9 and 17, or (vi) SEQ ID NO: 9 and 24 and
   the second polypeptide chain comprises the amino acid sequence of (i) SEQ ID NO: 10 and 18 or (ii) any one of SEQ ID NOs: 13, 20, and 27.

* * * * *

SEQUENCE LISTING

```
Sequence total quantity: 40
SEQ ID NO: 1            moltype = AA  length = 98
FEATURE                 Location/Qualifiers
REGION                  1..98
                        note = Synthetic
source                  1..98
                        mol_type = protein
                        organism = synthetic construct
SEQUENCE: 1
MHGDTPTLHE YMLDLQPETT DLYCYEQLND SSEEEDEIDG PAGQAEPDRA HYNIVTFCCK    60
CDSTLRLCVQ STHVDIRTLE DLLMGTLGIV CPICSQKP                           98

SEQ ID NO: 2            moltype = AA  length = 9
FEATURE                 Location/Qualifiers
REGION                  1..9
                        note = Synthetic
source                  1..9
                        mol_type = protein
                        organism = synthetic construct
SEQUENCE: 2
YMLDLQPET                                                            9

SEQ ID NO: 3            moltype = AA  length = 6
FEATURE                 Location/Qualifiers
REGION                  1..6
                        note = Synthetic
source                  1..6
                        mol_type = protein
                        organism = synthetic construct
SEQUENCE: 3
TSGFNG                                                               6

SEQ ID NO: 4            moltype = AA  length = 6
FEATURE                 Location/Qualifiers
REGION                  1..6
                        note = Synthetic
```

```
source                  1..6
                        mol_type = protein
                        organism = synthetic construct
SEQUENCE: 4
NVLDGL                                                                    6

SEQ ID NO: 5            moltype = AA  length = 10
FEATURE                 Location/Qualifiers
REGION                  1..10
                        note = Synthetic
source                  1..10
                        mol_type = protein
                        organism = synthetic construct
SEQUENCE: 5
ASVDGNNRLA                                                               10

SEQ ID NO: 6            moltype = AA  length = 5
FEATURE                 Location/Qualifiers
REGION                  1..5
                        note = Synthetic
source                  1..5
                        mol_type = protein
                        organism = synthetic construct
SEQUENCE: 6
SGHDT                                                                     5

SEQ ID NO: 7            moltype = AA  length = 6
FEATURE                 Location/Qualifiers
REGION                  1..6
                        note = Synthetic
source                  1..6
                        mol_type = protein
                        organism = synthetic construct
SEQUENCE: 7
YYEEEE                                                                    6

SEQ ID NO: 8            moltype = AA  length = 15
FEATURE                 Location/Qualifiers
REGION                  1..15
                        note = Synthetic
source                  1..15
                        mol_type = protein
                        organism = synthetic construct
SEQUENCE: 8
ASSLGWRGGR YNEQF                                                         15

SEQ ID NO: 9            moltype = AA  length = 126
FEATURE                 Location/Qualifiers
REGION                  1..126
                        note = Synthetic
source                  1..126
                        mol_type = protein
                        organism = synthetic construct
SEQUENCE: 9
MWGVFLLYVS MKMGGTTGQN IDQPTEMTAT EGAIVQINCT YQTSGFNGLF WYQQHAGEAP         60
TFLSYNVLDG LEEKGRFSSF LSRSKGYSYL LLKELQMKDS ASYLCASVDG NNRLAFGKGN        120
QVVVIP                                                                  126

SEQ ID NO: 10           moltype = AA  length = 135
FEATURE                 Location/Qualifiers
REGION                  1..135
                        note = Synthetic
SITE                    2
                        note = MISC_FEATURE - X is Ala or Gly
source                  1..135
                        mol_type = protein
                        organism = synthetic construct
SEQUENCE: 10
MXPGLLCWAL LCLLGAGLVD AGVTQSPTHL IKTRGQQVTL RCSPKSGHDT VSWYQQALGQ         60
GPQFIFQYYE EEERQRGNFP DRFSGHQFPN YSSELNVNAL LLGDSALYLC ASSLGWRGGR        120
YNEQFFGPGT RLTVL                                                        135

SEQ ID NO: 11           moltype = AA  length = 135
FEATURE                 Location/Qualifiers
REGION                  1..135
                        note = Synthetic
source                  1..135
                        mol_type = protein
                        organism = synthetic construct
```

```
SEQUENCE: 11
MGPGLLCWAL  LCLLGAGLVD  AGVTQSPTHL  IKTRGQQVTL  RCSPKSGHDT  VSWYQQALGQ   60
GPQFIFQYYE  EEERQRGNFP  DRFSGHQFPN  YSSELNVNAL  LLGDSALYLC  ASSLGWRGGR  120
YNEQFFGPGT  RLTVL                                                       135

SEQ ID NO: 12           moltype = AA   length = 267
FEATURE                 Location/Qualifiers
REGION                  1..267
                        note = Synthetic
source                  1..267
                        mol_type = protein
                        organism = synthetic construct
SEQUENCE: 12
MWGVFLLYVS  MKMGGTTGQN  IDQPTEMTAT  EGAIVQINCT  YQTSGFNGLF  WYQQHAGEAP   60
TFLSYNVLDG  LEEKGRFSSF  LSRSKGYSYL  LLKELQMKDS  ASYLCASVDG  NNRLAFGKGN  120
QVVVIPNIQN  PDPAVYQLRD  SKSSDKSVCL  FTDFDSQTNV  SQSKDSDVYI  TDKTVLDMRS  180
MDFKSNSAVA  WSNKSDFACA  NAFNNSIIPE  DTFFPSPESS  CDVKLVEKSF  ETDTNLNFQN  240
LSVIGFRILL  LKVAGFNLLM  TLRLWSS                                         267

SEQ ID NO: 13           moltype = AA   length = 314
FEATURE                 Location/Qualifiers
REGION                  1..314
                        note = Synthetic
source                  1..314
                        mol_type = protein
                        organism = synthetic construct
SEQUENCE: 13
MGPGLLCWAL  LCLLGAGLVD  AGVTQSPTHL  IKTRGQQVTL  RCSPKSGHDT  VSWYQQALGQ   60
GPQFIFQYYE  EEERQRGNFP  DRFSGHQFPN  YSSELNVNAL  LLGDSALYLC  ASSLGWRGGR  120
YNEQFFGPGT  RLTVLEDLKN  VFPPEVAVFE  PSEAEISHTQ  KATLVCLATG  FYPDHVELSW  180
WVNGKEVHSG  VSTDPQPLKE  QPALNDSRYC  LSSRLRVSAT  FWQNPRNHFR  CQVQFYGLSE  240
NDEWTQDRAK  PVTQIVSAEA  WGRADCGFTS  ESYQQGVLSA  TILYEILLGK  ATLYAVLVSA  300
LVLMAMVKRK  DSRG                                                        314

SEQ ID NO: 14           moltype = AA   length = 141
FEATURE                 Location/Qualifiers
REGION                  1..141
                        note = Synthetic
source                  1..141
                        mol_type = protein
                        organism = synthetic construct
SEQUENCE: 14
NIQNPDPAVY  QLRDSKSSDK  SVCLFTDFDS  QTNVSQSKDS  DVYITDKTVL  DMRSMDFKSN   60
SAVAWSNKSD  FACANAFNNS  IIPEDTFFPS  PESSCDVKLV  EKSFETDTNL  NFQNLSVIGF  120
RILLLKVAGF  NLLMTLRLWS  S                                               141

SEQ ID NO: 15           moltype = AA   length = 179
FEATURE                 Location/Qualifiers
REGION                  1..179
                        note = Synthetic
source                  1..179
                        mol_type = protein
                        organism = synthetic construct
SEQUENCE: 15
EDLKNVFPPE  VAVFEPSEAE  ISHTQKATLV  CLATGFYPDH  VELSWWVNGK  EVHSGVSTDP   60
QPLKEQPALN  DSRYCLSSRL  RVSATFWQNP  RNHFRCQVQF  YGLSENDEWT  QDRAKPVTQI  120
VSAEAWGRAD  CGFTSESYQQ  GVLSATILYE  ILLGKATLYA  VLVSALVLMA  MVKRKDSRG   179

SEQ ID NO: 16           moltype = AA   length = 137
FEATURE                 Location/Qualifiers
REGION                  1..137
                        note = Synthetic
SITE                    48
                        note = MISC_FEATURE - X is Thr or Cys
SITE                    112
                        note = MISC_FEATURE - X is Ser, Gly, Ala, Val, Leu, Ile,
                         Pro, Phe, Met, or Trp
SITE                    114
                        note = MISC_FEATURE - X is Met, Gly, Ala, Val, Leu, Ile,
                         Pro, Phe, Met, or Trp
SITE                    115
                        note = MISC_FEATURE - X is Gly, Ala, Val, Leu, Ile, Pro,
                         Phe, Met, or Trp
source                  1..137
                        mol_type = protein
                        organism = synthetic construct
```

```
SEQUENCE: 16
NIQNPEPAVY QLKDPRSQDS TLCLFTDFDS QINVPKTMES GTFITDKXVL DMKAMDSKSN    60
GAIAWSNQTS FTCQDIFKET NATYPSSDVP CDATLTEKSF ETDMNLNFQN LXVXXLRILL   120
LKVAGFNLLM TLRLWSS                                                  137

SEQ ID NO: 17           moltype = AA  length = 137
FEATURE                 Location/Qualifiers
REGION                  1..137
                        note = Synthetic
source                  1..137
                        mol_type = protein
                        organism = synthetic construct
SEQUENCE: 17
NIQNPEPAVY QLKDPRSQDS TLCLFTDFDS QINVPKTMES GTFITDKTVL DMKAMDSKSN    60
GAIAWSNQTS FTCQDIFKET NATYPSSDVP CDATLTEKSF ETDMNLNFQN LSVMGLRILL   120
LKVAGFNLLM TLRLWSS                                                  137

SEQ ID NO: 18           moltype = AA  length = 173
FEATURE                 Location/Qualifiers
REGION                  1..173
                        note = Synthetic
SITE                    57
                        note = MISC_FEATURE - X is Ser or Cys
source                  1..173
                        mol_type = protein
                        organism = synthetic construct
SEQUENCE: 18
EDLRNVTPPK VSLFEPSKAE IANKQKATLV CLARGFFPDH VELSWWVNGK EVHSGVXTDP    60
QAYKESNYSY CLSSRLRVSA TFWHNPRNHF RCQVQFHGLS EEDKWPEGSP KPVTQNISAE   120
AWGRADCGIT SASYQQGVLS ATILYEILLG KATLYAVLVS TLVVMAMVKR KNS          173

SEQ ID NO: 19           moltype = AA  length = 173
FEATURE                 Location/Qualifiers
REGION                  1..173
                        note = Synthetic
source                  1..173
                        mol_type = protein
                        organism = synthetic construct
SEQUENCE: 19
EDLRNVTPPK VSLFEPSKAE IANKQKATLV CLARGFFPDH VELSWWVNGK EVHSGVSTDP    60
QAYKESNYSY CLSSRLRVSA TFWHNPRNHF RCQVQFHGLS EEDKWPEGSP KPVTQNISAE   120
AWGRADCGIT SASYQQGVLS ATILYEILLG KATLYAVLVS TLVVMAMVKR KNS          173

SEQ ID NO: 20           moltype = AA  length = 308
FEATURE                 Location/Qualifiers
REGION                  1..308
                        note = Synthetic
source                  1..308
                        mol_type = protein
                        organism = synthetic construct
SEQUENCE: 20
MAPGLLCWAL LCLLGAGLVD AGVTQSPTHL IKTRGQQVTL RCSPKSGHDT VSWYQQALGQ    60
GPQFIFQYYE EEERQRGNFP DRFSGHQFPN YSSELNVNAL LLGDSALYLC ASSLGWRGGR   120
YNEQFFGPGT RLTVLEDLRN VTPPKVSLFE PSKAEIANKQ KATLVCLARG FFPDHVELSW   180
WVNGKEVHSG VSTDPQAYKE SNYSYCLSSR LRVSATFWHN PRNHFRCQVQ FHGLSEEDKW   240
PEGSPKPVTQ NISAEAWGRA DCGITSASYQ QGVLSATILY EILLGKATLY AVLVSTLVVM   300
AMVKRKNS                                                            308

SEQ ID NO: 21           moltype = AA  length = 137
FEATURE                 Location/Qualifiers
REGION                  1..137
                        note = Synthetic
source                  1..137
                        mol_type = protein
                        organism = synthetic construct
SEQUENCE: 21
NIQNPEPAVY QLKDPRSQDS TLCLFTDFDS QINVPKTMES GTFITDKTVL DMKAMDSKSN    60
GAIAWSNQTS FTCQDIFKET NATYPSSDVP CDATLTEKSF ETDMNLNFQN LLVIVLRILL   120
LKVAGFNLLM TLRLWSS                                                  137

SEQ ID NO: 22           moltype = AA  length = 263
FEATURE                 Location/Qualifiers
REGION                  1..263
                        note = Synthetic
source                  1..263
                        mol_type = protein
                        organism = synthetic construct
```

```
SEQUENCE: 22
MWGVFLLYVS MKMGGTTGQN IDQPTEMTAT EGAIVQINCT YQTSGFNGLF WYQQHAGEAP    60
TFLSYNVLDG LEEKGRFSSF LSRSKGYSYL LLKELQMKDS ASYLCASVDG NNRLAFGKGN   120
QVVVIPNIQN PEPAVYQLKD PRSQDSTLCL FTDFDSQINV PKTMESGTFI TDKTVLDMKA   180
MDSKSNGAIA WSNQTSFTCQ DIFKETNATY PSSDVPCDAT LTEKSFETDM NLNFQNLLVI   240
VLRILLLKVA GFNLLMTLRL WSS                                          263

SEQ ID NO: 23           moltype = AA  length = 173
FEATURE                 Location/Qualifiers
REGION                  1..173
                        note = Synthetic
source                  1..173
                        mol_type = protein
                        organism = synthetic construct
SEQUENCE: 23
EDLRNVTPPK VSLFEPSKAE IANKQKATLV CLARGFFPDH VELSWWVNGK EVHSGVCTDP    60
QAYKESNYSY CLSSRLRVSA TFWHNPRNHF RCQVQFHGLS EEDKWPEGSP KPVTQNISAE   120
AWGRADCGIT SASYQQGVLS ATILYEILLG KATLYAVLVS TLVVMAMVKR KNS          173

SEQ ID NO: 24           moltype = AA  length = 137
FEATURE                 Location/Qualifiers
REGION                  1..137
                        note = Synthetic
source                  1..137
                        mol_type = protein
                        organism = synthetic construct
SEQUENCE: 24
NIQNPEPAVY QLKDPRSQDS TLCLFTDFDS QINVPKTMES GTFITDKCVL DMKAMDSKSN    60
GAIAWSNQTS FTCQDIFKET NATYPSSDVP CDATLTEKSF ETDMNLNFQN LSVMGLRILL   120
LKVAGFNLLM TLRLWSS                                                 137

SEQ ID NO: 25           moltype = AA  length = 137
FEATURE                 Location/Qualifiers
REGION                  1..137
                        note = Synthetic
source                  1..137
                        mol_type = protein
                        organism = synthetic construct
SEQUENCE: 25
NIQNPEPAVY QLKDPRSQDS TLCLFTDFDS QINVPKTMES GTFITDKCVL DMKAMDSKSN    60
GAIAWSNQTS FTCQDIFKET NATYPSSDVP CDATLTEKSF ETDMNLNFQN LLVIVLRILL   120
LKVAGFNLLM TLRLWSS                                                 137

SEQ ID NO: 26           moltype = AA  length = 263
FEATURE                 Location/Qualifiers
REGION                  1..263
                        note = Synthetic
source                  1..263
                        mol_type = protein
                        organism = synthetic construct
SEQUENCE: 26
MWGVFLLYVS MKMGGTTGQN IDQPTEMTAT EGAIVQINCT YQTSGFNGLF WYQQHAGEAP    60
TFLSYNVLDG LEEKGRFSSF LSRSKGYSYL LLKELQMKDS ASYLCASVDG NNRLAFGKGN   120
QVVVIPNIQN PEPAVYQLKD PRSQDSTLCL FTDFDSQINV PKTMESGTFI TDKCVLDMKA   180
MDSKSNGAIA WSNQTSFTCQ DIFKETNATY PSSDVPCDAT LTEKSFETDM NLNFQNLLVI   240
VLRILLLKVA GFNLLMTLRL WSS                                          263

SEQ ID NO: 27           moltype = AA  length = 308
FEATURE                 Location/Qualifiers
REGION                  1..308
                        note = Synthetic
source                  1..308
                        mol_type = protein
                        organism = synthetic construct
SEQUENCE: 27
MAPGLLCWAL LCLLGAGLVD AGVTQSPTHL IKTRGQQVTL RCSPKSGHDT VSWYQQALGQ    60
GPQFIFQYYE EEERQRGNFP DRFSGHQFPN YSSELNVNAL LLGDSALYLC ASSLGWRGGR   120
YNEQFFGPGT RLTVLEDLRN VTPPKVSLFE PSKAEIANKQ KATLVCLARG FFPDHVELSW   180
WVNGKEVHSG VCTDPQAYKE SNYSYCLSSR LRVSATFWHN PRNHFRCQVQ FHGLSEEDKW   240
PEGSPKPVTQ NISAEAWGRA DCGITSASYQ QGVLSATILY EILLGKATLY AVLVSTLVVM   300
AMVKRKNS                                                           308

SEQ ID NO: 28           moltype = AA  length = 27
FEATURE                 Location/Qualifiers
REGION                  1..27
                        note = Synthetic
source                  1..27
                        mol_type = protein
                        organism = synthetic construct
```

```
SEQUENCE: 28
RAKRSGSGAT NFSLLKQAGD VEENPGP                                           27

SEQ ID NO: 29            moltype = AA   length = 598
FEATURE                  Location/Qualifiers
REGION                   1..598
                         note = Synthetic
source                   1..598
                         mol_type = protein
                         organism = synthetic construct
SEQUENCE: 29
MAPGLLCWAL LCLLGAGLVD AGVTQSPTHL IKTRGQQVTL RCSPKSGHDT VSWYQQALGQ    60
GPQFIFQYYE EEERQRGNFP DRFSGHQFPN YSSELNVNAL LLGDSALYLC ASSLGWRGGR   120
YNEQFFGPGT RLTVLEDLRN VTPPKVSLFE PSKAEIANKQ KATLVCLARG FFPDHVELSW   180
WVNGKEVHSG VSTDPQAYKE SNYSYCLSSR LRVSATFWHN PRNHFRCQVQ PHGLSEEDKW   240
PEGSPKPVTQ NISAEAWGRA DCGITSASYQ QGVLSATILY EILLGKATLY AVLVSTLVVM   300
AMVKRKNSRA KRSGSGATNF SLLKQAGDVE ENPGPMWGVF LLYVSMKMGG TTGQNIDQPT   360
EMTATEGAIV QINCTYQTSG FNGLFWYQQH AGEAPTFLSY NVLDGLEEKG RFSSFLSRSK   420
GYSYLLLKEL QMKDSASYLC ASVDGNNRLA FGKGNQVVVI PNIQNPEPAV YQLKDPRSQD   480
STLCLFTDFD SQINVPKTME SGTFITDKTV LDMKAMDSKS NGAIAWSNQT SFTCQDIFKE   540
TNATYPSSDV PCDATLTEKS FETDMNLNFQ NLLVIVLRIL LLKVAGFNLL MTLRLWSS    598

SEQ ID NO: 30            moltype = AA   length = 598
FEATURE                  Location/Qualifiers
REGION                   1..598
                         note = Synthetic
source                   1..598
                         mol_type = protein
                         organism = synthetic construct
SEQUENCE: 30
MAPGLLCWAL LCLLGAGLVD AGVTQSPTHL IKTRGQQVTL RCSPKSGHDT VSWYQQALGQ    60
GPQFIFQYYE EEERQRGNFP DRFSGHQFPN YSSELNVNAL LLGDSALYLC ASSLGWRGGR   120
YNEQFFGPGT RLTVLEDLRN VTPPKVSLFE PSKAEIANKQ KATLVCLARG FFPDHVELSW   180
WVNGKEVHSG VCTDPQAYKE SNYSYCLSSR LRVSATFWHN PRNHFRCQVQ PHGLSEEDKW   240
PEGSPKPVTQ NISAEAWGRA DCGITSASYQ QGVLSATILY EILLGKATLY AVLVSTLVVM   300
AMVKRKNSRA KRSGSGATNF SLLKQAGDVE ENPGPMWGVF LLYVSMKMGG TTGQNIDQPT   360
EMTATEGAIV QINCTYQTSG FNGLFWYQQH AGEAPTFLSY NVLDGLEEKG RFSSFLSRSK   420
GYSYLLLKEL QMKDSASYLC ASVDGNNRLA FGKGNQVVVI PNIQNPEPAV YQLKDPRSQD   480
STLCLFTDFD SQINVPKTME SGTFITDKCV LDMKAMDSKS NGAIAWSNQT SFTCQDIFKE   540
TNATYPSSDV PCDATLTEKS FETDMNLNFQ NLLVIVLRIL LLKVAGFNLL MTLRLWSS    598

SEQ ID NO: 31            moltype = DNA   length = 804
FEATURE                  Location/Qualifiers
misc_feature             1..804
                         note = Synthetic
source                   1..804
                         mol_type = other DNA
                         organism = synthetic construct
SEQUENCE: 31
atgtggggag ttttccttct ttatgtttcc atgaagatgg gaggcactac aggacaaaac    60
attgaccagc ccactgagat gacagctacg gaaggtgcca ttgtccagat caactgcacg   120
taccagacat ctgggttcaa cgggctgttc tggtaccagc aacatgctgg cgaagcaccc   180
acatttctgt cttacaatgt tctggatggt ttggaggaga aggtcgtttt tcttcattc    240
cttagtcggt ctaaagggta cagttacctc cttttgaagg agctccagat gaaagactct   300
gcctcttacc tctgtgcttc cgtagatggg aacaacagac tcgcttttgg gaaggggaac   360
caagtggtgg tcataccaaa tatccagaac cctgacccg ccgtgtacca gctgagagac   420
tctaaatcca gtgacaagtc tgtctgccta ttcaccgatt ttgattctca acaaatgtg    480
tcacaaagta aggattctga tgtgtatatc acagacaaaa ctgtgctaga catgaggtct   540
atggacttca agagcaacag tgctgtggcc tggagcaaca aatctgactt tgcatgtgca   600
aacgccttca caacagcat tattccagaa gacaccttct tccccagccc agaaagttcc   660
tgtgatgtca agctggtcga gaaaagcttt gaaacagata cgaacctaaa cttctcaaaac   720
ctgtcagtga ttgggttccg aatcctcctc ctgaaagtgg ccgggtttaa tctgctcatg   780
acgctgcggc tgtggtccag ctga                                          804

SEQ ID NO: 32            moltype = DNA   length = 945
FEATURE                  Location/Qualifiers
misc_feature             1..945
                         note = Synthetic
source                   1..945
                         mol_type = other DNA
                         organism = synthetic construct
SEQUENCE: 32
atgggccccg ggctcctctg ctgggcactg ctttgtctcc tgggagcagg cttagtggac    60
gctggagtca cccaaagtcc cacacacctg atcaaaacga gaggacagca agtgactctg   120
agatgctctc ctaagtctgg gcatgacact gtgtcctggt accaacaggc cctgggtcag   180
gggcccagt ttatctttca gtattatgag gaggaagaga cagagagg caactttccct    240
gatcgattct caggtcacca gttccctaac tatagctctg agctgaatgt gaacgccttg   300
ttgctggggg actcggccct ctatctctgt gccagcagct gggatggcg ggggggccgt   360
tacaatgagc agttcttcgg gccagggaca cggctcaccg tgctagagga cctgaaaaac   420
```

```
gtgttcccac ccgaggtcgc tgtgtttgag ccatcagaag cagagatctc ccacacccaa   480
aaggccacac tggtgtgcct ggccacaggc ttctacccg accacgtgga gctgagctgg    540
tgggtgaatg ggaaggaggt gcacagtggg gtcagcacag acccgcagcc cctcaaggag   600
cagcccgccc tcaatgactc cagatactgc ctgagcagcc gctgagggt ctcggccacc    660
ttctggcaga accccgcaa ccacttccgc tgtcaagtcc agttctacgg gctctcggaa    720
aatgacgagt ggacccagga tagggccaaa cctgtcaccc agatcgtcag cgccgaggcc   780
tggggtagag cagactgtgg cttcacctcc gagtcttacc agcaaggggg cctgtctgcc   840
accatcctct atgagatctt gctagggaag gccaccttgt atgccgtgct ggtcagtgcc   900
ctcgtgctga tggccatggt caagagaaag gattccagag gctag                   945

SEQ ID NO: 33          moltype = DNA  length = 795
FEATURE                Location/Qualifiers
misc_feature           1..795
                       note = Synthetic
source                 1..795
                       mol_type = other DNA
                       organism = synthetic construct
SEQUENCE: 33
atgtggggtg tcttcctttt gtacgtcagc atgaagatgg gaggcactac tgggcaaaac   60
atagatcagc ctaccgaaat gactgctacc gagggagcca ttgtccaaat caactgcacc   120
tatcagacta gcggcttcaa tggactcttc tggtaccaac agcatgcggg cgaagcacct   180
accttcttgt cctataatgt cttggatggt ctcgaagaga aggcagatt ctccagtttc    240
ctcagccgga gcaagggata tcatatcctt ctcctgaaag agcttcagat gaaggattcc   300
gcatcctatc tctgtgcttc agtcgatggc aataaccgac tcgcctttgg aaaagggaat   360
caagtggtcg tcataccgaa tattcagaac cccgaaccag ccgtatatca gttgaaggac   420
ccaagatctc aggatagtac actctgtttg tttacggact tgactcaca aatcaacgtc    480
ccgaagacta tggaaagtgg tacgttcatc acagataaga cggttctgga catgaaggct   540
atggactcaa agagcaacgg ggcaattgct tggtccaacc agacaagctt tacctgtcag   600
gacattttta aggagactaa tgctacttat ccctccagcg acgttccgtg tgatgcgact   660
cttaccgaga agtcttttga accgatatgc atctcaact tccagaatct gctggtgatc    720
gttctgcgga tcctgcttct gaaggttgca ggattcaatc ttcttatgac tctccggctc   780
tggtcttcat gataa                                                    795

SEQ ID NO: 34          moltype = DNA  length = 924
FEATURE                Location/Qualifiers
misc_feature           1..924
                       note = Synthetic
source                 1..924
                       mol_type = other DNA
                       organism = synthetic construct
SEQUENCE: 34
atggccccgg ggcttttgtg ttgggccttg ctttgtttgc ttggggcagg cttggtggat   60
gctggagtca cacagtcacc cacacacctc attaaaacca ggggacaaca agtcactctg   120
cgctgcagtc ctaagtcagg ccatgacaca gtttcctggt atcaacaggc tctggggcag   180
ggcccctcagt tcatttttcca atattacgag gaagaggaac gccaacgcgg taatttccc    240
gatcggttct ctgggcacca gttcccaaac tactcaagtg agttgaacgt aaatgctctc   300
ctcctcggag actccgccct ctacttgtgt gccagttctc ttggttggcg gggcggccga   360
tacaatgaac aatttttttgg acctggtact cggctgaccg tgctagagga cctgcgcaac   420
gtcacccccac caaaggtcag tttgtttgag ccatcaaagg cggagatcgc caacaaacag   480
aaagctacgc tcgtgtgttt ggctcgggc ttcttcccag accacgtaga actttcctgg   540
tgggtcaatg gaaaggaggt tcattccgga gtgtccacta atcccaagc gtacaaggaa   600
tccaactata gctactgtct ctcatctcgg ctccgggtga gtgcgacatt ctggcataat   660
cctcggaacc actttcgatg ccaagtgcag tttcatgggt tgagcgagga agacaagtgg   720
cccgagggca gtcctaaacc agtcactcaa aacataagcg ccgaggcatg gggtagagcc   780
gattgtggga ttactagcgc ttcataccaa caaggggtat tgagcgctac aattctttac   840
gaaattctcc tcggcaaggc gacgctctac gccgtactgg tgtctactct cgtggttatg   900
gcaatggtga acggaaaaa cagc                                            924

SEQ ID NO: 35          moltype = DNA  length = 795
FEATURE                Location/Qualifiers
misc_feature           1..795
                       note = Synthetic
source                 1..795
                       mol_type = other DNA
                       organism = synthetic construct
SEQUENCE: 35
atgtggggtg tcttcctttt gtacgtcagc atgaagatgg gaggcactac tgggcaaaac   60
atagatcagc ctaccgaaat gactgctacc gagggagcca ttgtccaaat caactgcacc   120
tatcagacta gcggcttcaa tggactcttc tggtaccaac agcatgcggg cgaagcacct   180
accttcttgt cctataatgt cttggatggt ctcgaagaga aggcagatt ctccagtttc    240
ctcagccgga gcaagggata tcatatcctt ctcctgaaag agcttcagat gaaggattct   300
gcatcctatc tctgtgcttc agtcgatggc aataaccgac tcgcctttgg aaaagggaat   360
caagtggtcg tcataccgaa tattcagaac cccgaaccag ccgtatatca gttgaaggac   420
ccaagatctc aggatagtac actctgtttg tttacggact tgactcaca aatcaacgtc    480
ccgaagacta tggaaagtgg tacgttcatc acagataagt cgttctgga catgaaggct    540
atggactcaa agagcaacgg ggcaattgct tggtccaacc agacaagctt tacctgtcag   600
gacattttta aggagactaa tgctacttat ccctccagcg acgttccgtg tgatgcgact   660
```

```
cttaccgaga agtcttttga gaccgatatg aatctcaact tccagaatct gctggtgatc   720
gttctgcgga tcctgcttct gaaggttgca ggattcaatc ttcttatgac tctccggctc   780
tggtcttcat gataa                                                    795

SEQ ID NO: 36          moltype = DNA   length = 924
FEATURE                Location/Qualifiers
misc_feature           1..924
                       note = Synthetic
source                 1..924
                       mol_type = other DNA
                       organism = synthetic construct
SEQUENCE: 36
atggcccggg ggcttttgtg ttgggccttg ctttgtttgc ttggggcagg cttggtggat    60
gctggagtca cacagtcacc cacacacctc attaaaacca ggggacaaca agtcactctg   120
cgctgcagtc ctaagtcagg ccatgacaca gtttcctggt atcaacaggc tctggggcag   180
ggccctcagt tcattttcca atattacgag gaagaggaac gccaacgcgg taatttcccc   240
gatcggttct ctgggcacca gttcccaaac tactcaagtg agttgaacgt aaatgctctc   300
ctcctcggag actccgccct ctacttgtgt gccagttctc ttggttggcg ggggggccga   360
tacaatgaac aattttttgg acctggtact cggctgaccg tgctagagga cctgcgcaac   420
gtcaccccac caaaggtcag tttgtttgag ccatcaaagg cggagatcgc caacaaacag   480
aaagctacgc tcgtgtgttt ggctcggggc ttcttcccag accacgtaga actttcctgg   540
tgggtcaatg gaaaggaggt tcattccgga gtgtgcactg atccccaagc gtacaaggaa   600
tccaactata gctactgtct ctcatctcgg ctccgggtga gtgcgacatt ctggcataat   660
cctcggaacc actttcgatg ccaagtgcag tttcatgggt tgagcgagga agacaagtgg   720
cccgagggca gtcctaaacc agtcactcaa aacataagcg ccgaggcatg gggtagagcc   780
gattgtggga ttactagcgc ttcataccaa caaggggtat tgagcgctac aattcttac   840
gaaattctcc tcggcaaggc gacgctctac gccgtactgg tgtctactct cgtggttatg   900
gcaatggtga aacggaaaaa cagc                                          924

SEQ ID NO: 37          moltype = DNA   length = 7310
FEATURE                Location/Qualifiers
misc_feature           1..7310
                       note = Synthetic
source                 1..7310
                       mol_type = other DNA
                       organism = synthetic construct
SEQUENCE: 37
ccatggcccc ggggcttttg tgttgggcct tgctttgttt gcttggggca ggcttggtgg    60
atgctggagt cacacagtca cccacacacc tcattaaaac caggggacaa caagtcactc   120
tgcgctgcag tcctaagtca ggccatgaca cagtttcctg gtatcaacag gctctggggc   180
agggccctca gttcattttc caatattacg aggaagagga acgccaacgc ggtaatttcc   240
ccgatcggtt ctctgggcac cagttcccaa actactcaag tgagttgaac gtaaatgctc   300
tcctcctcgg agactccgcc ctctacttgt gtgccagttc tcttggttgg cgggggggcc   360
gatacaatga acaattttt ggacctggta ctcggctgac cgtgctagag gacctgcgca   420
acgtcacccc accaaaggtc agtttgtttg agccatcaaa ggcggagatc gccaacaaac   480
agaaagctac gctcgtgtgt ttggctcggg gcttcttccc agaccacgta gaactttcct   540
ggtgggtcaa tggaaaggag gttcattccg gagtgtccaa gcgtacaagg   600
aatccaacta tagctactgt ctctcatctc ggctccgggt gagtgcgaca ttctggcata   660
atcctcggaa ccactttcga tgccaagtgc agtttcatgg gttgagcgag gaagacaagt   720
ggcccgaggg cagtcctaaa ccagtcactc aaaacataag cgccgaggca tggggtagag   780
ccgattgtgg gattactagc gcttcatacc aacaaggggt attgagcgct acaattctta   840
cgaaattct cctcggcaag gcgacgctct acgccgtact ggtgtctact ctcgtggtta   900
tggcaatggt gaaacggaaa aacagcagag ccaaaagaag tggttctggc gcgacgaatt   960
tagtttgct taagcaagcc ggagatgtgg aggaaaatcc tggaccgatg tggggtgtct  1020
tcctttgta cgtcagcatg aagatgggag gcactactgg gcaaaacata gatcagccta  1080
ccgaaatgac tgctaccgag ggagccattg tccaaatcaa ctgcacctat cagactagcg  1140
gcttcaatgg actcttctgg taccaacagc atgcgggcga agcacctacc ttcttgtcct  1200
ataatgtctt ggatggtctc aagagaaag gcagattctc cagtttcctc agccggagca  1260
agggatactc atatcttctc ctgaaagagc ttcagatgaa ggattctgca tcctatctct  1320
gtgcttcagt cgatggcaat aaccgactcg cctttgaaaa agggaatcaa gtggtcgtca  1380
taccgaatat tcagaacccc gaaccagccg tatatcagtt gaaggaccca agatctcagg  1440
atagtacact ctgtttgttt acggactttg actcacaaat caacgtcccg aagactatgg  1500
aaagtggtac gttcatcaca gataagacgg ttctggacat gaaggctatg gactcaaaga  1560
gcaacgggc aattgcttgg tccaaccaga caagctttac ctgtcaggac attttttaagg  1620
agactaatgc tacttatccc tccagcgacg ttccgtgtga tgcgactctt accgagaagt  1680
cttttgagac cgatatgaat ctcaacttcc agaatctgct ggtgatcgtt ctgcggatcc  1740
tgcttctgaa ggttgcagga ttcaatcttc ttatgactct ccggctctgg tcttcatgat  1800
aagaattctg cagtcgacgg taccgcgggc ccgggatccg ataaaataaa agattttatt  1860
tagtctccag aaaaagggggg gaatgaaaga ccccacctgt aggtttggca agctagctta  1920
agtaacgcca ttttgcaagg catggaaaat acataactga atagagaaa gttcagatca  1980
aggttaggaa cagagagaca gcagaatatg gccaaacag gatatctgtg gtaagcagtt  2040
cctgccccgg ctcagggcca agaacagatg gtccccagat gcggtccgc cctcagcagt  2100
ttctagagaa ccatcagatg tttccagggt gccccaagga cctgaaaatg accctgtgcc  2160
ttatttgaac taaccaatca gttcgcttct cgcttctgtt cgcgcgcttc tgctcccccga  2220
gctcaataaa agagcccaca ccccttcact cggcgcgcca gtcctccgat agactcgcgtc  2280
gcccgggtac ccgtgtatcc aataaaccct cttgcagttg catccgactt gtggtctcgc  2340
tgttccttgg gagggtctcc tctgagtgat tgactacccg tcagcggggg ctttcatgg  2400
gtaacagttt cttgaagttg gagaacaaca ttctgagggt aggagtcgaa tattaagtaa  2460
tcctgactca attagccact gttttgaatc cacatactcc aatactcctg aaatccatcg  2520
```

```
atggagttca ttatggacag cgcagaaaga gctggggaga attgtgaaat tgttatccgc   2580
tcacaattcc acacaacata cgagccgaaa gcataaagtg taaagcctgg ggtgcctaat   2640
gagtgagcta actcacatta attgcgttgc gctcactgcc cgctttccag tcgggaaacc   2700
tgtcgtgcca gctgcattaa tgaatcggcc aacgcgcggg gagaggcggt ttgcgtattg   2760
ggcgctcttc cgcttcctcg ctcactgact cgctgcgctc ggtcgttcgg ctgcggcgag   2820
cggtatcagc tcactcaaag gcggtaatac ggttatccac agaatcaggg gataacgcag   2880
gaaagaacat gtgagcaaaa ggccagcaaa aggccaggaa ccgtaaaaag gccgcgttgc   2940
tggcgttttt ccataggctc cgcccccctg acgagcatca aaaaatcga cgctcaagtc   3000
agaggtggcg aaacccgaca ggactataaa gataccaggc gtttccccct ggaagctccc   3060
tcgtgcgctc tcctgttccg accctgccgc ttaccggata cctgtccgcc tttctccctt   3120
cgggaagcgt ggcgctttct catagctcac gctgtaggta tctcagttcg gtgtaggtcg   3180
ttcgctccaa gctgggctgt gtgcacgaac cccccgttca gcccgaccgc tgcgccttat   3240
ccggtaacta tcgtcttgag tccaacccgg taagacacga cttatcgcca ctggcagcag   3300
ccactggtaa caggattagc agagcgaggt atgtaggcgg tgctacagag ttcttgaagt   3360
ggtggcctaa ctacggctac actagaagaa cagtatttgg tatctgcgct ctgctgaagc   3420
cagttacctt cggaaaaaga gttggtagct cttgatccgg caaacaaacc accgctggta   3480
gcggtggttt ttttgtttgc aagcagcaga ttacgcgcag aaaaaaagga tctcaagaag   3540
atcctttgat cttttctacg gggtctgacg ctcagtggaa cgaaaactca cgttaaggga   3600
ttttggtcat gagattatca aaaaggatct tcacctagat ccttttaaat taaaaatgaa   3660
gttttaaatc aatctaaagt atatatgagt aaacttggtc tgacagttac caatgcttaa   3720
tcagtgaggc acctatctca gcgatctgtc tatttcgttc atccatagtt gcctgactcc   3780
ccgtcgtgta gataactacg atacgggagg gcttaccatc tggccccagt gctgcaatga   3840
taccgcgaga cccacgctca ccggctccag atttatcagc aataaaccag ccagccgaa   3900
gggccgagcg cagaagtggt cctgcaactt tatccgcctc catccagtct attaattgtt   3960
gccgggaagc tagagtaagt agttcgccag ttaatagttt cgcaacgtt gttgccattg   4020
ctacaggcat cgtggtgtca cgctcgtcgt ttggtatggc ttcattcagc tccggttccc   4080
aacgatcaag gcgagttaca tgatccccca tgttgtgcaa aaaagcggtt agctccttcg   4140
gtcctccgat cgttgtcaga agtaagttgg ccgcagtgtt atcactcatg gttatggcag   4200
cactgcataa ttctcttact gtcatgccat ccgtaagatg cttttctgtg actggtgagt   4260
actcaaccaa gtcattctga atagtgtat gcggcgacc gagttgctct tgcccggcgt   4320
caatacggga taataccgcg ccacatagca gaactttaaa agtgctcatc attggaaaac   4380
gttcttcggg gcgaaaactc tcaaggatct taccgctgtt gagatccagt tcgatgtaac   4440
ccactcgtgc acccaactga tcttcagcat cttttacttt caccagcgtt tctgggtgag   4500
caaaaacagg aaggcaaaat gccgcaaaaa agggaataag ggcgacacgg aaatgttgaa   4560
tactcatact cttccttttt caatattatt gaagcattta tcagggttat tgtctcatga   4620
gcggatacat atttgaatgt atttagaaaa ataaacaaat aggggttccg cgcacatttc   4680
cccgaaaagt gccacctgac gtctaagaaa ccattattat catgacatta acctataaaa   4740
ataggcgtat cacgaggccc tttcgtctcg cgcgtttcgg tgatgacggt gaaaacctct   4800
gacacatgca gctcccggag acggtcacag cttgtctgta gcggatgcc gggagcagac   4860
aagcccgtca gggcgcgtca gcgggtgttg gcgggtgtcg ggctggctt aactatgcgg   4920
catcagagca gattgtactg agagtgcacc atatgcggtg tgaaataccg cacagatgcg   4980
taaggagaaa ataccgcatc aggcgccatt cgccattcag gctgcgcaac tgttgggaag   5040
ggcgatcggt gcgggcctct tcgctattac gccagctggc gaaaggggga tgtgctgcaa   5100
ggcgattaag ttgggtaacg ccagggtttt cccagtcacg acgttgtaaa acgacggcgc   5160
aaggaatggt gcatgcaagg agatggcgcc caacagtccc ccggccacgg ggcctgccac   5220
catcccacg ccgaaacaag cgctcatgag cccgaagtgg tgcccgat cttccccatc   5280
ggtgatgtcg gcgatatagg cgccagcaac cgcacctgtg gcgccggtga tgccggccac   5340
gatgcgtccg gcgtagaggc gattagtcca atttgttaaa gacaggatat cagtggtcca   5400
ggctctagtt ttgactcaac aatatcacca gctgaagcct atagagtacg agccatagat   5460
aaaataaaag atttatttta gtctccagaa aaaggggggga atgaaagacc ccacctgtag   5520
gtttggcaag ctagcttaag taacgccatt ttgcaaggca tggaaaatac ataactggga   5580
atagagaagt tcagatcaag gttaggaaca gagagacagc agaatatggg ccaaacagga   5640
tatctgtggt aagcagttcc tgccccggct caggggcaag aacagatggt ccccagatgc   5700
ggtcccgccc tcagcagttt ctagagaacc atcagatgtt tccagggtgc cccaaggacc   5760
tgaaatgacc ctgtgcctta tttgaactaa ccaatcagtt cgcttctcgc ttctgttcgc   5820
gcgcttctgc tccccgagct caataaaaga gcccacaacc cctcactcgg cgccagtc   5880
ctccgataga ctgcgtcgcc cgggtacccg tattcccaat aaagcctctt gctgtttgca   5940
tccgaatcgt ggactcgctg atccttggga gggtctcctc agattgattg actgccacc   6000
tcggggggtct ttcatttgga ggttccaccg agatttggag accctgccc agggaccacc   6060
gacccccccg ccgggaggta agctggccag cggtcgtttc gtgtctgtct ctgtctttgt   6120
gcgtgttttgt gccggcatct aatgtttgcg cctgcgtctg tactagttag ctaactagct   6180
ctgtatctgg cggacccgtg gtggaactga cgagttcgga acaccggggcc gcaaccctgg   6240
gagacgtccc agggacttcg ggggccgttt ttgtggcccg acctgagtcc taaaatcccg   6300
atcgtttagg actctttggt gcaccccct tagaggaggg atatgtggtt ctggtaggag   6360
acgagaacct aaaacagttc ccgcctccgt ctgaattttt gctttcggtt tgggaccgaa   6420
gccgcgccgc gcgtctcttgtc tgctgcagca tcgttcgtg ttgtctctgt ctgactgtgt   6480
ttctgtattt gtctgaaaat atgggcccgg gctagcctgt taccactcca ttaagttcta   6540
ccttaggtca ctggaaagat gtcgagcgga tcgctcacaa ccagtcggta gatgtcaaga   6600
agagacgttg ggttaccttc tgctctgcag aatggccaac cttaacgtc ggatggccgc   6660
gagacgcac ctttaaccga gacctcatca cccaggttaa gatcaaggtc ttttcacctg   6720
gcccgcatgg acacccagac caggtcccct acatcgtgac ctgggaagcc ttggcttttg   6780
acccccctcc ctggggtcaag ccctttgtac aacctaagcc tccgcctcct cttcctccat   6840
ccgcccgtc tctcccctt gaacctcctc gttcgacccc gcctcgatcc tccctttatc   6900
cagccctcac tccttctcta ggcgcccca tatggccata tgagatctta tatgggcac   6960
ccccgccct tgtaaacttc cctgaccctg acatgacaag agttactaac agcccctctc   7020
tccaagctca cttacaggct ctctacttag tccagcacga agtctggaga cctctggcgg   7080
cagcctacca agaacaactg gaccgaccgg tggtacctca cccttaccga gtcggcgaca   7140
```

```
cagtgtgggt ccgccgacac cagactaaga acctagaacc tcgctggaaa ggaccttaca   7200
cagtcctgct gaccaccccc accgccctca aagtagacgg catcgcagct tggatacacg   7260
ccgcccacgt gaaggctgcc gaccccgggg gtggaccatc ctctagaccg              7310

SEQ ID NO: 38            moltype = DNA    length = 7310
FEATURE                  Location/Qualifiers
misc_feature             1..7310
                         note = Synthetic
source                   1..7310
                         mol_type = other DNA
                         organism = synthetic construct
SEQUENCE: 38
ccatggcccc ggggcttttg tgttgggcct tgctttgttt gcttgggggca ggcttggtgg     60
atgctggagt cacacagtca cccacacacc tcattaaaac cagggggacaa caagtcactc    120
tgcgctgcag tcctaagtca ggccatgaca cagtttcctg gtatcaacag gctctggggc    180
agggccctca gttcattttc caatattacg aggaagagga acgccaacgc ggtaatttcc    240
ccgatcggtt ctctgggcac cagttcccaa actactcaag tgagttgaac gtaaatgctc    300
tcctcctcgg agactccgcc ctctacttgt gtgccagttc tcttggttgg cggggcggcc    360
gatacaatga acaattttt  ggacctggta ctcggctgac cgtgctagag gacctgcgca    420
acgtcacccc accaaaggtc agtttgtttg agccatcaaa ggcggagatc gccaacaaac    480
agaaagctac gctcgtgtgt ttggctcggg gcttcttccc agaccacgta gaactttcct    540
ggtgggtcaa tggaaaggag gttcattccg gagtgtgcac tgatccccaa gcgtacaagg    600
aatccaacta tagctactgt ctctcatctc ggctccgggt gagtgcgaca ttctggcata    660
atcctcggaa ccactttcga tgccaagtgc agtttcatgg gttgagcgag gaagacaagt    720
ggcccgaggg cagtcctaaa ccagtcactc aaaacataag cgccgaggca tggggtagag    780
ccgattgtgg gattactagc gcttcatacc aacaaggggt attgacgcgt acaattcttt    840
acgaaattct cctcggcaag gcgacgctct acgccgtact ggtgtctact ctcgtgggtta   900
tggcaatggt gaaacggaaa aacagcagag ccaaaagaag tggttctggc gcgacgaatt    960
ttagtttgct taagcaagcc ggagatgtgg aggaaaatcc tggaccgatg tggggtgtct   1020
tccttttgta cgtcagcatg aagatgggag gcactactgg gcaaaacata gatcagccta   1080
ccgaaatgac tgctaccgag ggagccattg tccaaatcaa ctgcacctat cagactagcg   1140
gcttcaatgg actcttctgg taccaacagc atgcgggcga agcacctacc ttcttgtcct   1200
ataatgtctt ggatggtctc gaagagaaag gcagattctc cagtttcctc agccggagca   1260
agggatactc atatcttctc ctgaaagagc ttcagatgga ggattctgca tcctatctct   1320
gtgcttcagt cgatggcaat aaccgactcg ccttttggaaa agggaatcaa gtgtcgtca    1380
taccgaatat tcagaacccc gaaccagccg tatatcagtt gaaggaccca agatctcagg   1440
atagtacact ctgtttgttt acggactttg actcacaaat caacgtcccg aagactatgg    1500
aaagtggtac gttcatcaca gataagtgcg ttctggacat gaaggctatg gactcaaaga    1560
gcaacggggc aattgcttgg tccaaccaga caagcttac  ctgtcaggac attttaagg    1620
agactaatgc tacttatccc tccagcgacg ttcgtgtga tgcgactctt accgagaagt    1680
cttttgagac cgatatgaat ctcaacttcc agaatctgct ggtgatcgtt ctgcggatcc    1740
tgcttctgaa ggttgcagga ttcaatcttc ttatgactct ccggctctgg tcttcatgat    1800
aagaattctg cagtcgacgg taccgcgggc ccgggatcca ataaaataaa agattttatt    1860
tagtctccag aaaaagggggg gaatgaaaga ccccacctgt aggtttggca agctagctta    1920
agtaacgcca ttttgcaagg catggaaat  acataactga gaatagagaa gttcagatca    1980
aggttaggaa cagagagaca gcagaatatg gccaaacag  gatatctgtg gtaagcagtt    2040
cctgccccgg ctcagggcca agaacagatg gtccccagat gcggtcccgc cctcagcagt    2100
ttctagagaa ccatcagatg tttccagggt gccccaagga cctgaaaatg accctgtgcc    2160
ttatttgaac taaccaatca gttcgcttct cgcttctgtt cgcgcgcttc tgctccccga    2220
gctcaataaa agagcccaca cccctcact  cggcgcgcca gtcctccgat agactgcgtc    2280
gcccgggtac ccgtgtatcc aataaaccct cttgcagttg catccgactt gtggtctcgc    2340
tgttccttgg gagggtctcc tctgagtgat tgactacccg tcagcggggg tctttcatgg    2400
gtaacagttt cttgaagttg gagaacaaca ttctgagggt aggagtcgaa tattaagtaa    2460
tcctgactca attagccact gttttgaatc cacatactcc aatactcctg aaatccatcg    2520
atggagttca ttatgacag cgcagaaaga gctgggggaa attgtgaaat tgttatccgc    2580
tcacaattcc acacaacata cgagccgaa  gcataaagtg taaagcctgg ggtgcctaat    2640
gagtgagcta actcacatta attgcgttgc gctcactgcc cgctttccag tcgggaaacc    2700
tgtcgtgcca gctgcattaa tgaatcggcc aacgcgcggg gagaggcggt ttgcgtattg    2760
ggcgctcttc cgcttcctcg ctcactgact cgctgcgctc ggtcgttcgg ctgcggcgag    2820
cggtatcagc tcactcaaag gcggtaatac ggttatccac agaatcaggg gataacgcag    2880
gaaagaacat gtgagcaaaa ggccagcaaa aggccaggaa ccgtaaaaag gccgcgttgc    2940
tggcgttttt ccataggctc cgcccccctg acgagcatca caaaaatcga cgctcaagtc    3000
agaggtggcg aaacccgaca ggactataaa gataccaggc gtttccccct ggaagctccc    3060
tcgtgcgctc tcctgttccg accctgccgc ttaccggata cctgtccgcc tttctccctt    3120
cgggaagcgt ggcgctttct catagctcac gctgtaggta tctcagttcg gtgtaggtcg    3180
ttcgctccaa gctgggctgt gtgcacgaac cccccgttca gcccgaccgc tgcgccttat    3240
ccggtaacta tcgtcttgag tccaacccgg taagacacga cttatcgcca ctggcagcag    3300
ccactggtaa caggattagc agagcgaggt atgtaggcgg tgctacagag ttcttgaagt    3360
ggtggcctaa ctacggctac actagaagaa cagtatttgg tatctgcgct ctgctgaagc    3420
cagttacctt cggaaaaaga gttggtagct cttgatccgg caaacaaacc accgctggta    3480
gcggtggttt ttttgtttgc aagcagcaga ttacgcgcag aaaaaaagga tctcaagaag    3540
atcctttgat cttttctacg gggtctgacg ctcagtggaa cgaaaactca cgttaaggga    3600
ttttggtcat gagattatca aaaaggatct tcacctagat ccttttaaat taaaaatgaa    3660
gttttaaatc aatctaaagt atatatgagt aaacttggtc tgacagttac caatgcttaa    3720
tcagtgaggc acctatctca gcgatctgtc tatttcgttc atccatagtt gcctgactcc    3780
ccgtcgtgta gataactacg atacgggagg gcttaccatc tggccccagt gctgcaatga    3840
taccgcgaga cccacgctca ccggctccag atttatcagc aataaaccag ccagccgaa   3900
gggccgagcg cagaagtggt cctgcaactt tatccgcctc catccagtct attaattgtt    3960
gccgggaagc tagagtaagt agttcgccag ttaatagttt gcgcaacgtt gttgccattg    4020
```

```
ctacaggcat cgtggtgtca cgctcgtcgt ttggtatggc ttcattcagc tccggttccc   4080
aacgatcaag gcgagttaca tgatccccca tgttgtgcaa aaaagcggtt agctccttcg   4140
gtcctccgat cgttgtcaga agtaagttgg ccgcagtgtt atcactcatg gttatggcag   4200
cactgcataa ttctcttact gtcatgccat ccgtaagatg cttttctgtg actggtgagt   4260
actcaaccaa gtcattctga gaatagtgta tgcggcgacc gagttgctct tgcccggcgt   4320
caatacggga taataccgcg ccacatagca gaactttaaa agtgctcatc attggaaaac   4380
gttcttcggg gcgaaaactc tcaaggatct taccgctgtt gagatccagt tcgatgtaac   4440
ccactcgtgc acccaactga tcttcagcat ctttacttt caccagcgtt tctgggtgag   4500
caaaaacagg aaggcaaaat gccgcaaaaa agggaataag ggcgacacgg aaatgttgaa   4560
tactcatact cttcctttt caatattatt gaagcattta tcagggttat tgtctcatga   4620
gcggatacat atttgaatgt atttagaaaa ataaacaaat aggggttccg cgcacatttc   4680
cccgaaaagt gccacctgac gtctaagaaa ccattattat catgacatta acctataaaa   4740
ataggcgtat cacgaggccc tttcgtctcg cgcgtttcgg tgatgacggt gaaaacctct   4800
gacacatgca gctcccggag acggtcacag cttgtctgta acggatgcc gggagcagac   4860
aagcccgtca gggcgcgtca gcgggtgttg gcgggtgtcg gggctggctt aactatgcgg   4920
catcagagca gattgtactg agagtgcacc atatgcggtg tgaaataccg cacagatgcg   4980
taaggagaaa ataccgcatc aggcgccatt cgccattcag gctgcgcaac tgttgggaag   5040
ggcgatcggt gcgggcctct tcgctattac gccagctggc gaaaggggga tgtgctgcaa   5100
ggcgattaag ttgggtaacg ccaggggttt cccagtcacg acgttgtaaa acgacggcgc   5160
aaggaatggt gcatgcaagg agatggcgcc caacagtccc ccggccacgg ggcctgccac   5220
catacccacg ccgaaacaag cgctcatgag cccgaagtgg cgagcccgat cttccccatc   5280
ggtgatgtcg gcgatatagg cgccagcaac cgcacctgtg gcgccggtga tgccggccac   5340
gatgcgtccg gcgtagaggc gattagtcca atttgttaaa gacaggatat cagtggtcca   5400
ggctctagtt ttgactcaac aatatcacca gctgaagcct atagagtacg agccatagat   5460
aaaataaaag atttattta gtctccagaa aaggggggga atgaaagacc ccacctgtag   5520
gtttggcaag ctagcttaag taacgccatt ttgcaaggca tggaaaatac ataactgaga   5580
atagagaagt tcagatcaag gttaggaaca gagagacagc agaatatggg ccaaacagga   5640
tatctgtggt aagcagttcc tgccccggct cagggccaag aacagatggt ccccagatgc   5700
ggtcccgccc tcagcagttt ctagagaacc atcagatgtt tccagggtgc cccaaggacc   5760
tgaaatgacc ctgtgcctta tttgaactaa ccaatcagtt cgcttctcgc ttctgttcgc   5820
gcgcttctgc tccccgagct caataaaaga gcccacaacc cctcactcgg cgcgccagtc   5880
ctccgataga ctgcgtcgcc cgggtacccg tattcccaat aaagcctctt gctgtttgca   5940
tccgaatcgt ggactcgctg atccttggga gggtctcctc agattgattg actgcccacc   6000
tcgggggtct ttcatttgga ggttccaccg agatttggaa accctgccc agggaccacc   6060
gacccccccg ccgggaggta agctggccag cggtcgtttc gtgtctgtct ctgtctttgt   6120
gcgtgtttgt gccggcatct aatgtttgcg cctgcgtctg tactagttag ctaactagct   6180
ctgtatctgg cggacccgtg gtggaactga cgagttcgga acaccggcc gcaaccctgg   6240
gagacgtccc agggacttcg ggggccgttt ttgtggcccg acctgagtcc taaaatcccg   6300
atcgtttagg actctttggt gcaccccct tagaggaggg atatgtgtt ctggtaggag   6360
acgagaacct aaaacagttc ccgcctccgt ctgaattttt gctttcggtt tgggaccgaa   6420
gccgcgccgc gcgtcttgtc tgctgcagca tcgttctgtg ttgtctctgt ctgactgtgt   6480
ttctgtattt gtctgaaaat atgggcccgg gctagcctgt taccactccc ttaagtttga   6540
ccttaggtca ctggaaagat gtcgagcgga tcgctcacaa ccagtcggta gatgtcaaga   6600
agagacgttg ggttaccttc tgctctgcag aatggccaac ctttaacgtc ggatggccgc   6660
gagacggcac ctttaaccga gacctcatca cccaggttaa gatcaaggtc ttttcacctg   6720
gcccgcatgg acacccagac caggtcccct acatcgtgac ctgggaagcc ttggcttttg   6780
acccccctcc ctgggtcaag ccctttgtac acctaagcc tccgcctcct cttcctccat   6840
ccgcccgtc tctcccccctt gaacctcctc gttcgacccc gcctcgatcc tcccttatc   6900
cagccctcac tccttctcta ggcgcccca tatggccata tgagatctta tatggggcac   6960
ccccgcccct tgtaaacttc cctgaccctg acatgacaag agttactaac agcccctctc   7020
tccaagctca cttacaggct ctctacttag tccagcacga agtctggaga cctctgggca   7080
cagcctacca agaacaactg gaccgaccgg tggtacctca cccttaccga gtcggcgaca   7140
cagtgtgggt ccgccgacac cagactaaga acctagaacc tcgctggaaa ggaccttaca   7200
cagtcctgct gaccacccc accgccctca agtagacgg catcgcagct tggatacacg   7260
ccgcccacgt gaaggctgcc gacccggggg gtggaccatc ctctagaccg              7310
```

SEQ ID NO: 39          moltype = DNA   length = 1800
FEATURE                Location/Qualifiers
misc_feature       1..1800
                      note = Synthetic
source                 1..1800
                      mol_type = other DNA
                      organism = synthetic construct
SEQUENCE: 39

```
atggccccgg ggcttttgtg ttgggccttg ctttgtttgc ttggggcagg cttggtggat    60
gctggagtca cacagtcacc cacacacctc attaaaacca ggggacaaca agtcactctg   120
cgctgcagtc ctaagtcagg ccatgacaca gtttcctgga tcaacaggc tctggggcag   180
ggccctcagt tcatttttcca atattacgag gaagaggaac gccaacgcgg taatttccc   240
gatcggttct ctgggcacca gttcccaaac tactcaagtg agttgaacgt aaatgctctc   300
ctcctcggag actccgccct ctacttgtgt gccagttctc ttggttggcg gggcggccga   360
tacaatgaac aattttttgg acctggtact cggctgaccg tgctagagga cctgcgcaac   420
gtcacccac caaggtcag tttgtttgag ccatcaaagg cggagatcgc caacaaacag   480
aaagctacgc tcgtgtgttt ggctcgggc ttcttcccag accacgtaga actttcctgg   540
tgggtcaatg gaaaggaggt tcattccgga gtgtccactg gtgccaagg gtacaaggaa   600
tccaactata gctactgtct ctcatctcgg ctcggtga tgcgacatt ctggcataat   660
cctcggaacc acttcgatg ccaagtgcag tttcatgggt tgagcgagga agacaagtgg   720
cccgagggca gtcctaaacc agtcactcaa aacataagcg ccgaggcatg gggtagagcc   780
gattgtggga ttactagcgc ttcataccaa caaggggtat tgagcgctac aattctcttac   840
gaaattctcc tcggcaaggc gacgctctac gccgtactgg tgtctactct cgtggttatg   900
```

```
gcaatggtga aacggaaaaa cagcagagcc aaaagaagtg gttctggcgc gacgaatttt    960
agtttgctta agcaagccgg agatgtggag gaaaatcctg gaccgatgtg gggtgtcttc   1020
cttttgtacg tcagcatgaa gatgggaggc actactgggc aaaacataga tcagcctacc   1080
gaaatgactg ctaccgaggg agccattgtc caaatcaact gcacctatca gactagcggc   1140
ttcaatggac tcttctggta ccaacagcat gcgggcgaag cacctacctt cttgtcctat   1200
aatgtcttgg atggtctcga agagaaaggc agattctcca gtttcctcag ccggagcaag   1260
ggatactcat atcttctcct gaaagagctt cagatgaagg attctgcatc ctatctctgt   1320
gcttcagtcg atggcaataa ccgactcgcc tttggaaaag ggaatcaagt ggtcgtcata   1380
ccgaatattc agaacccccga accagccgta tatcagttga aggacccaag atctcaggat   1440
agtacactct gtttgtttac ggactttgac tcacaaatca acgtcccgaa gactatggat   1500
agtggtacgt tcatcacaga taagacggtt ctggacatga aggctatgga ctcaaagagc   1560
aacggggcaa ttgcttggtc caaccagaca agctttacct gtcaggacat ttttaaggag   1620
actaatgcta cttatccctc cagcgacgtt ccgtgtgatg cgactcttac cgagaagtct   1680
tttgagaccg atatgaatct caacttccag aatctgctgg tgatcgttct gcggatcctg   1740
cttctgaagg ttgcaggatt caatcttctt atgactctcc ggctctggtc ttcatgataa   1800

SEQ ID NO: 40          moltype = DNA  length = 1800
FEATURE                Location/Qualifiers
misc_feature           1..1800
                       note = Synthetic
source                 1..1800
                       mol_type = other DNA
                       organism = synthetic construct
SEQUENCE: 40
atggccccgg ggcttttgtg ttgggccttg ctttgtttgc ttggggcagg cttggtggat     60
gctggagtca cacagtcacc cacacacctc attaaaacca gggacaaca agtcactctg    120
cgctgcagtc ctaagtcagg ccatgacaca gtttcctggt atcaacaggc tctggggcag    180
ggccctcagt tcattttcca atattacgag gaagaggaac gccaacgcgg taatttcccc    240
gatcggttct ctgggcacca gttcccaaac tactcaagtg agttgaacgt aaatgctctc    300
ctcctcggag actccgccct ctacttgtgt gccagttctc ttggttggcg gggcggccga    360
tacaatgaac aattttttgg acctggtact cggctgaccg tgctagagga cctgcgcaac    420
gtcaccccac caaaggtcag tttgtttgag ccatcaaagg cggagatcgc caacaaacag    480
aaagctacgc tcgtgtgttt ggctcggggc ttcttcccag accacgtaga actttcctgg    540
tgggtcaatg gaaaggaggt tcattccgga gtgtgcactg atccccaagc gtacaaggaa    600
tccaactata gctactgtct ctcatctcgg ctccgggtga gtgcgacatt ctggcataat    660
cctcggaacc actttcgatg ccaagtgcag tttcatgggt tgagcgagga agacaagtgg    720
cccgagggca gtcctaaacc agtcactcaa aacataagcg ccgaggcatg gggtagagcc    780
gattgtggga ttactagcgc ttcataccaa caaggggtat tgagcgctac aattctttac    840
gaaattctcc tcggcaaggc gacgctctac gccgtactgg tgtctactct cgtggttatg    900
gcaatggtga aacggaaaaa cagcagagcc aaaagaagtg gttctggcgc gacgaatttt    960
agtttgctta agcaagccgg agatgtggag gaaaatcctg gaccgatgtg gggtgtcttc   1020
cttttgtacg tcagcatgaa gatgggaggc actactgggc aaaacataga tcagcctacc   1080
gaaatgactg ctaccgaggg agccattgtc caaatcaact gcacctatca gactagcggc   1140
ttcaatggac tcttctggta ccaacagcat gcgggcgaag cacctacctt cttgtcctat   1200
aatgtcttgg atggtctcga agagaaaggc agattctcca gtttcctcag ccggagcaag   1260
ggatactcat atcttctcct gaaagagctt cagatgaagg attctgcatc ctatctctgt   1320
gcttcagtcg atggcaataa ccgactcgcc tttggaaaag ggaatcaagt ggtcgtcata   1380
ccgaatattc agaacccccga accagccgta tatcagttga aggacccaag atctcaggat   1440
agtacactct gtttgtttac ggactttgac tcacaaatca acgtcccgaa gactatggaa   1500
agtggtacgt tcatcacaga taagtgcgtt ctggacatga aggctatgga ctcaaagagc   1560
aacggggcaa ttgcttggtc caaccagaca agctttacct gtcaggacat ttttaaggag   1620
actaatgcta cttatccctc cagcgacgtt ccgtgtgatg cgactcttac cgagaagtct   1680
tttgagaccg atatgaatct caacttccag aatctgctgg tgatcgttct gcggatcctg   1740
cttctgaagg ttgcaggatt caatcttctt atgactctcc ggctctggtc ttcatgataa   1800
```